US009716893B2

(12) United States Patent
Puri

(10) Patent No.: US 9,716,893 B2
(45) Date of Patent: Jul. 25, 2017

(54) MATCHED FILTERING OF PREDICTION AND RECONSTRUCTION SIGNALS FOR NEXT GENERATION VIDEO

(71) Applicant: Intel Corporation, Santa Clara, CA (US)

(72) Inventor: Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 14/334,131

(22) Filed: Jul. 17, 2014

(65) Prior Publication Data

US 2014/0362911 A1    Dec. 11, 2014

Related U.S. Application Data

(63) Continuation-in-part of application No. PCT/US2013/078114, filed on Dec. 27, 2013, and a
(Continued)

(51) Int. Cl.
| H04N 19/615 | (2014.01) |
| H04N 19/124 | (2014.01) |
| H04N 19/51 | (2014.01) |
| H04N 19/44 | (2014.01) |
| H04N 19/176 | (2014.01) |
| H04N 19/119 | (2014.01) |
| H04N 19/147 | (2014.01) |
| H04N 19/46 | (2014.01) |
| H04N 19/122 | (2014.01) |
| H04N 19/136 | (2014.01) |

(Continued)

(52) U.S. Cl.
CPC .......... *H04N 19/44* (2014.11); *H04N 19/119* (2014.11); *H04N 19/12* (2014.11); *H04N 19/122* (2014.11); *H04N 19/136* (2014.11); *H04N 19/147* (2014.11); *H04N 19/172* (2014.11); *H04N 19/176* (2014.11); *H04N 19/46* (2014.11); *H04N 19/513* (2014.11); *H04N 19/573* (2014.11); *H04N 19/61* (2014.11); *H04N 19/82* (2014.11); *H04N 19/85* (2014.11); *H04N 19/91* (2014.11)

(58) Field of Classification Search
None
See application file for complete search history.

(56) References Cited

U.S. PATENT DOCUMENTS

2002/0044604 A1*  4/2002  Nieweglowski ....... H04N 19/51
                                                    375/240.03
2005/0094729 A1*  5/2005  Yuan ..................... H04N 19/42
                                                    375/240.16
(Continued)

FOREIGN PATENT DOCUMENTS

KR  10-2008-0067363 A   7/2008
KR  10-2012-0120091 A   11/2012

OTHER PUBLICATIONS

International Preliminary Report on Patentability for PCT/US2013/069962, mailed May 28, 2015, 7 pages.

*Primary Examiner* — Christopher S Kelley
*Assistant Examiner* — Kaitlin A Retallick
(74) *Attorney, Agent, or Firm* — Jordan IP Law LLC

(57) ABSTRACT

Techniques related to matched filtering of prediction and reconstruction signals for video coding are described.

24 Claims, 28 Drawing Sheets

Related U.S. Application Data continuation-in-part of application No. PCT/US2013/069960, filed on Nov. 13, 2013.

(60) Provisional application No. 61/758,314, filed on Jan. 30, 2013, provisional application No. 61/725,576, filed on Nov. 13, 2012, provisional application No. 61/758,314, filed on Jan. 30, 2013.

(51) Int. Cl.
*H04N 19/82* (2014.01)
*H04N 19/85* (2014.01)
*H04N 19/12* (2014.01)
*H04N 19/172* (2014.01)
*H04N 19/513* (2014.01)
*H04N 19/61* (2014.01)
*H04N 19/91* (2014.01)
*H04N 19/573* (2014.01)

(56) References Cited

U.S. PATENT DOCUMENTS

| | | | | | |
|---|---|---|---|---|---|
| 2009/0257664 | A1* | 10/2009 | Kao | .................... | H04N 19/159 382/232 |
| 2014/0328400 | A1* | 11/2014 | Puri | .................... | H04N 19/176 375/240.13 |
| 2014/0362922 | A1* | 12/2014 | Puri | .................... | H04N 19/61 375/240.16 |
| 2015/0229948 | A1* | 8/2015 | Puri | .................... | H04N 19/615 375/240.03 |

* cited by examiner

MATCHED FILTERING OF PREDICTION AND RECONSTRUCTION SIGNALS FOR NEXT GENERATION VIDEO

RELATED APPLICATIONS

The present application is a continuation-in-part of international application no. PCT/US2013/078114, filed 27 Dec. 2013, which in turn claims the benefit of U.S. Provisional Application No. 61/758,314 filed 30 Jan. 2013; the present application also is a continuation-in-part of PCT/US13/69960 filed 13 Nov. 2013, which in turn claims the benefit of U.S. Provisional Application No. 61/725,576 filed 13 Nov. 2012 as well as U.S. Provisional Application No. 61/758,314 filed 30 Jan. 2013; the contents of which are expressly incorporated herein in their entirety

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

This disclosure, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
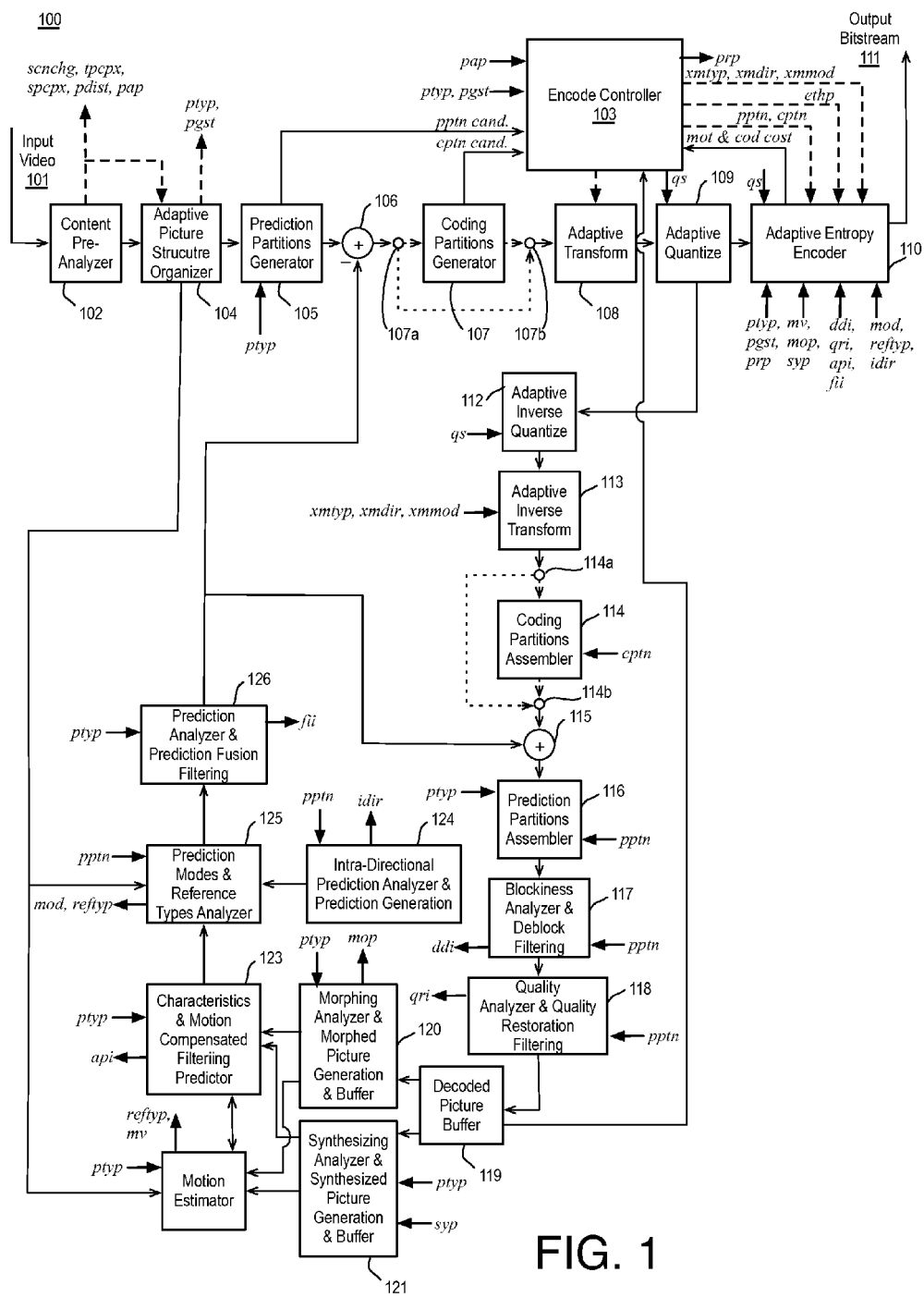
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive matched filtering of prediction and reconstruction signals for video coding.

As discussed above, there are several reasons why HEVC standard's filtering subsystem, while a good step forward, may not be sufficient for getting full gains from filtering. For example, the H.265/HEVC standard may not incorporate an AM-type Filtering Predictor (as will be defined in more detail below) due to their difficulties in coming up with a design that provided good gains and low bit cost of ami-type parameters overhead. Further, the H.265/HEVC standard may lack operations for filtering of prediction signal (e.g., a prediction signal may not be used by HEVC). Additionally, the H.265/HEVC standard may lack operations for AM filtering (dropped from HEVC due to lack of good design). Further, the H.265/HEVC standard may have insufficient quality from LF filtering (single fixed small number of coeftaps, oversimplified in HEVC). Additionally, the H.265/HEVC standard may lack deblocking filtering limitation (deblocking in HEVC does not use other mitigating means).

As will be described in greater detail below, the approach(es) described in this disclosure address the overall video compression efficiency in interframe video coding by improving the compression gains by using a number of matched filters in the coding loop, also referred to as Pred and Recon Filtering subsystem for Coding. The principle idea being that if improved decoded video quality can be achieved through matched filtering in coding loop further, it will not only improve reconstructed video quality experienced by the consumers but also have a feedback effect in improving quality of the prediction signal, reducing the prediction error bit cost, thus improving the video compression efficiency/quality even further. Moreover, if in addition we can improve the prediction signal even further by suitable matched filtering of prediction, this will reduce the prediction error signal further thereby further reducing coding bit cost. Thus, improving the quality of pred(iction) and recon(struction) signal may be a way to get additional gains in compression.

As will be discussed in greater detail below, a number of individual subsystems for filtering of Recon and Pred signals as well as useful combinations of filters can be used to create a flexible highly adaptive system that attempts to maximize bitrate savings over a range of coding conditions as applicable to NGV encoding.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

FIG. 1 illustrates example control signals associated with operation of video encoder 100, where the following abbreviations may represent the associated information:
  scnchg Scene change information
  spcpx Spatial complexity information
  tpcpx Temporal complexity information
  pdist Temporal prediction distance information
  pap Pre Analysis parameters (placeholder for all other pre analysis parameters except scnchg, spcpx, tpcpx, pdist)
  ptyp Picture types information
  pgst Picture group structure information
  pptn cand. Prediction partitioning candidates
  cptn cand. Coding Partitioning Candidates
  Prp Preprocessing
  xmtyp Transform type information
  xmdir Transform direction information
  xmmod Transform mode
  ethp One eighth (⅛th) pel motion prediction
  pptn Prediction Partitioning
  cptn Coding Partitioning
  mot&cod cost Motion and Coding Cost
  qs quantizer information set (includes Quantizer parameter (Qp), Quantizer matrix (QM) choice)
  mv Motion vectors
  mop Morphing Paramters
  syp Synthesizing Parameters
  ddi Deblock and dither information
  qri Quality Restoration filtering index/information
  api Adaptive Precision filtering index/information
  fiu Fusion Filtering index/information
  mod Mode information
  reftyp Reference type information
  idir Intra Prediction Direction The various signals and data items that may need to be sent to the decoder, ie, pgst, ptyp, prp, pptn, cptn, modes, reftype, ethp, xmtyp, xmdir, xmmod, idir, my, qs, mop, syp, ddi, qri, api, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
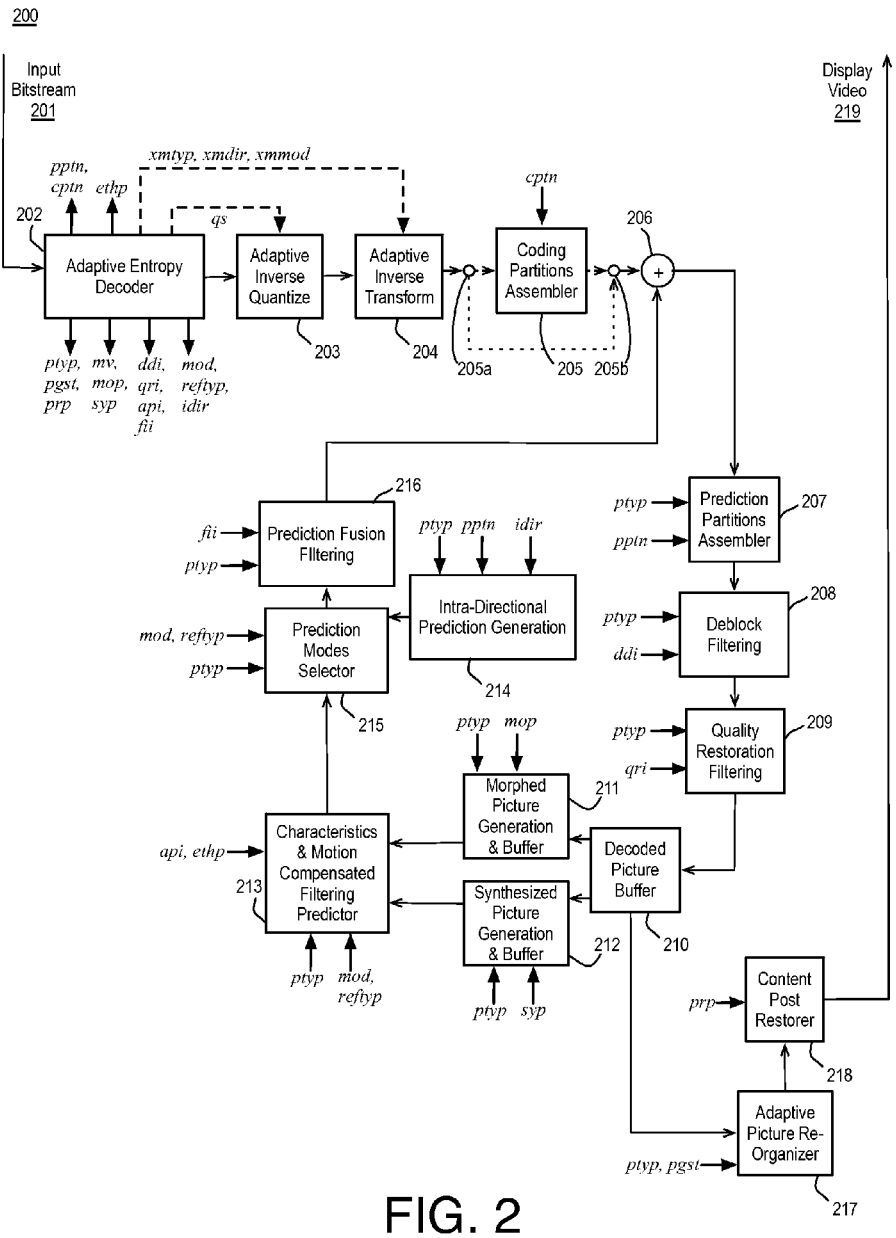
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 4, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
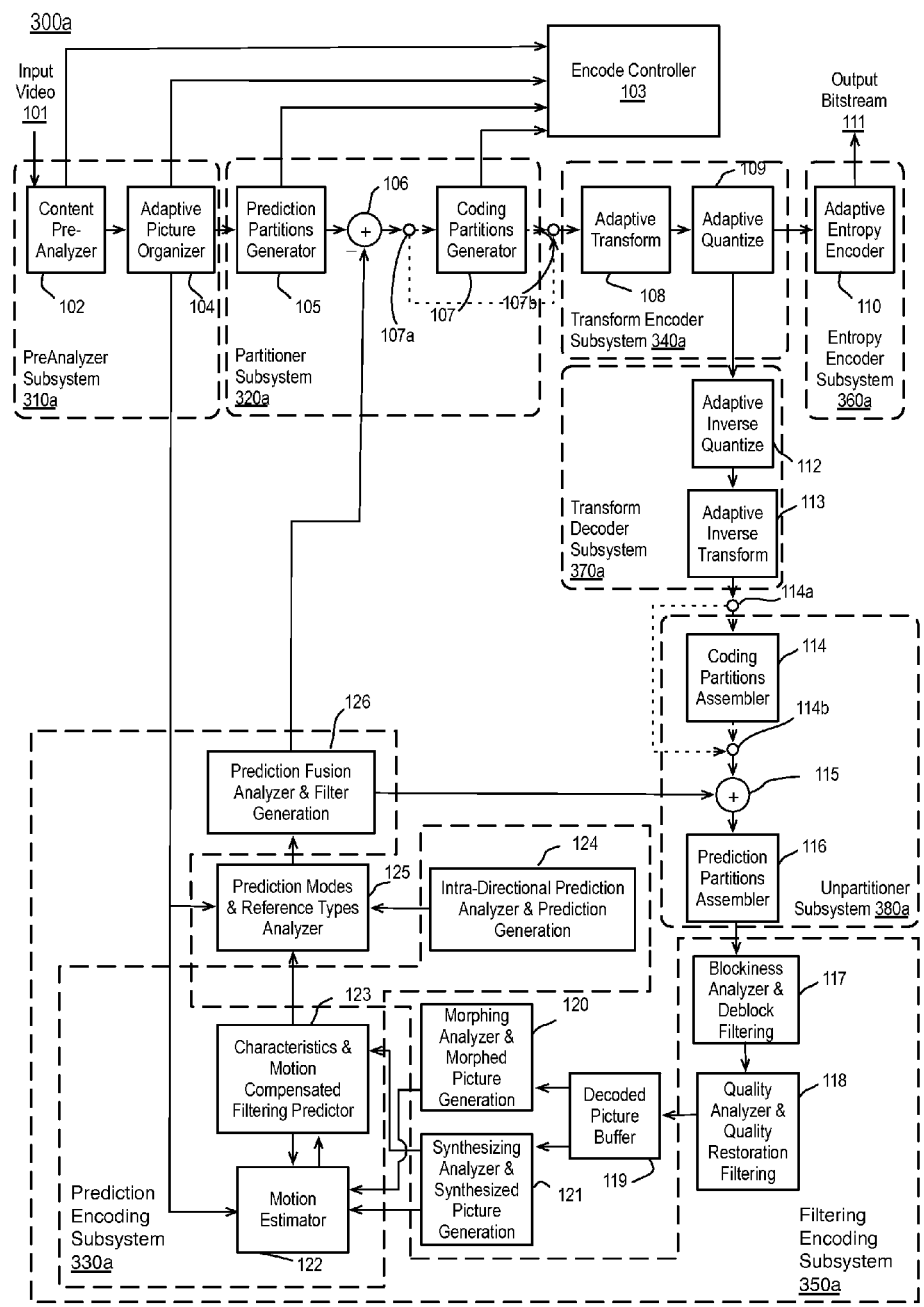
FIG. 3(a) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include preanalyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartioner subsystem 380a. Preanalyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyper-threading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
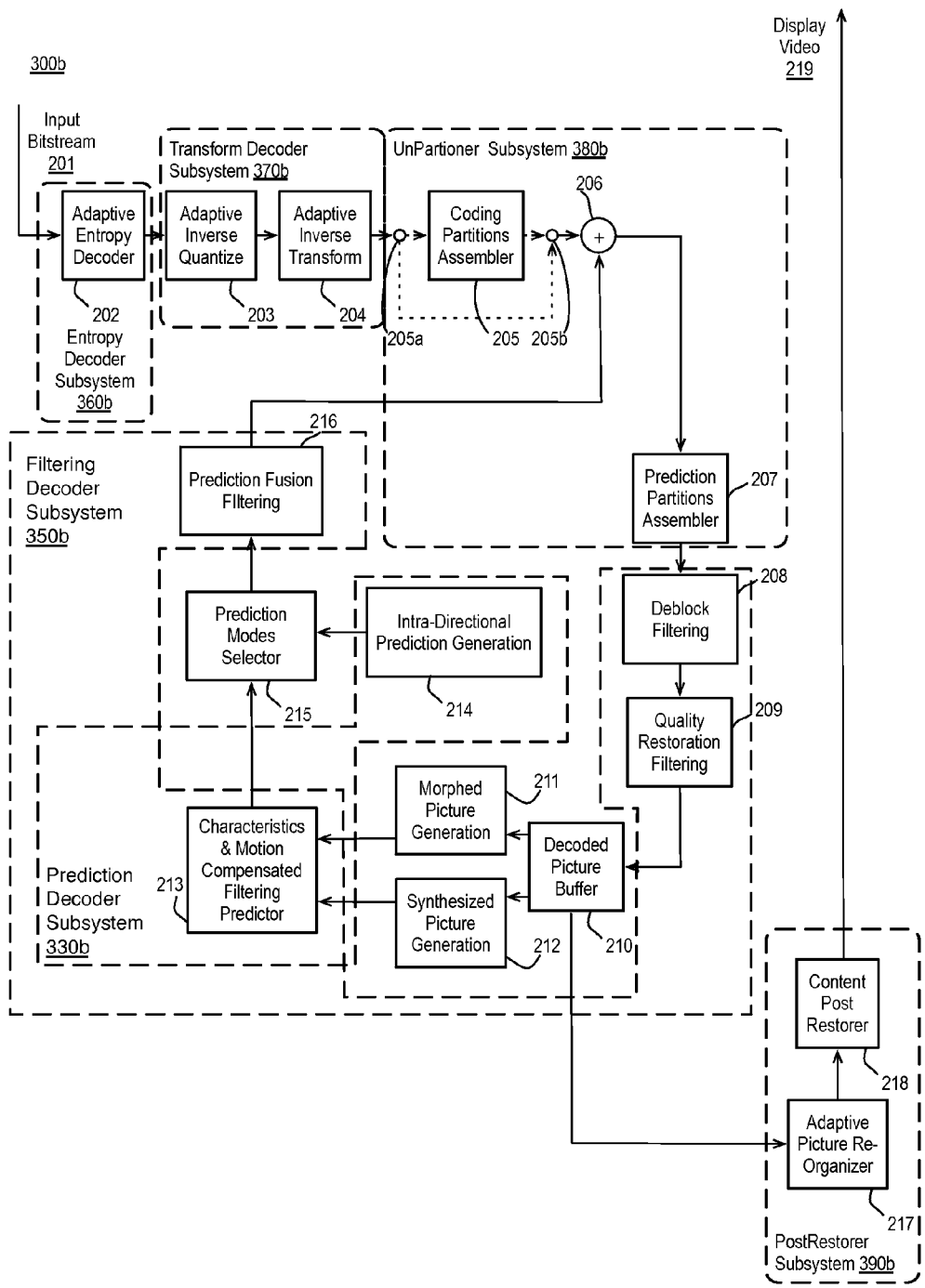
FIG. 3(b) is an illustrative diagram of an example next generation video decoder and subsystems.

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "ultra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390b of decoder 300b is an optional block that may perform further improvement of perceptual quality of decoded video. This processing can be done either in response to quality improvement parameters sent by encoder 100, or it can be standalone decision made at the postrestorer subsystem 390b. In terms of specific parameters computed at encoder 100 that can be used to improve quality at postrestorer subsystem 390b may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390b.

While subsystems 330b through 390b are illustrated as being associated with specific example functional modules of decoder 300b in FIG. 3(b), other implementations of decoder 300b herein may include a different distribution of the functional modules of decoder 300b among subsystems 330b through 390b. The present disclosure is not limited in this regard and, in various examples, implementation of the example subsystems 330b through 390b herein may include the undertaking of only a subset of the specific example functional modules of decoder 300b shown, additional functional modules, and/or in a different arrangement than illustrated.

Figure 4:
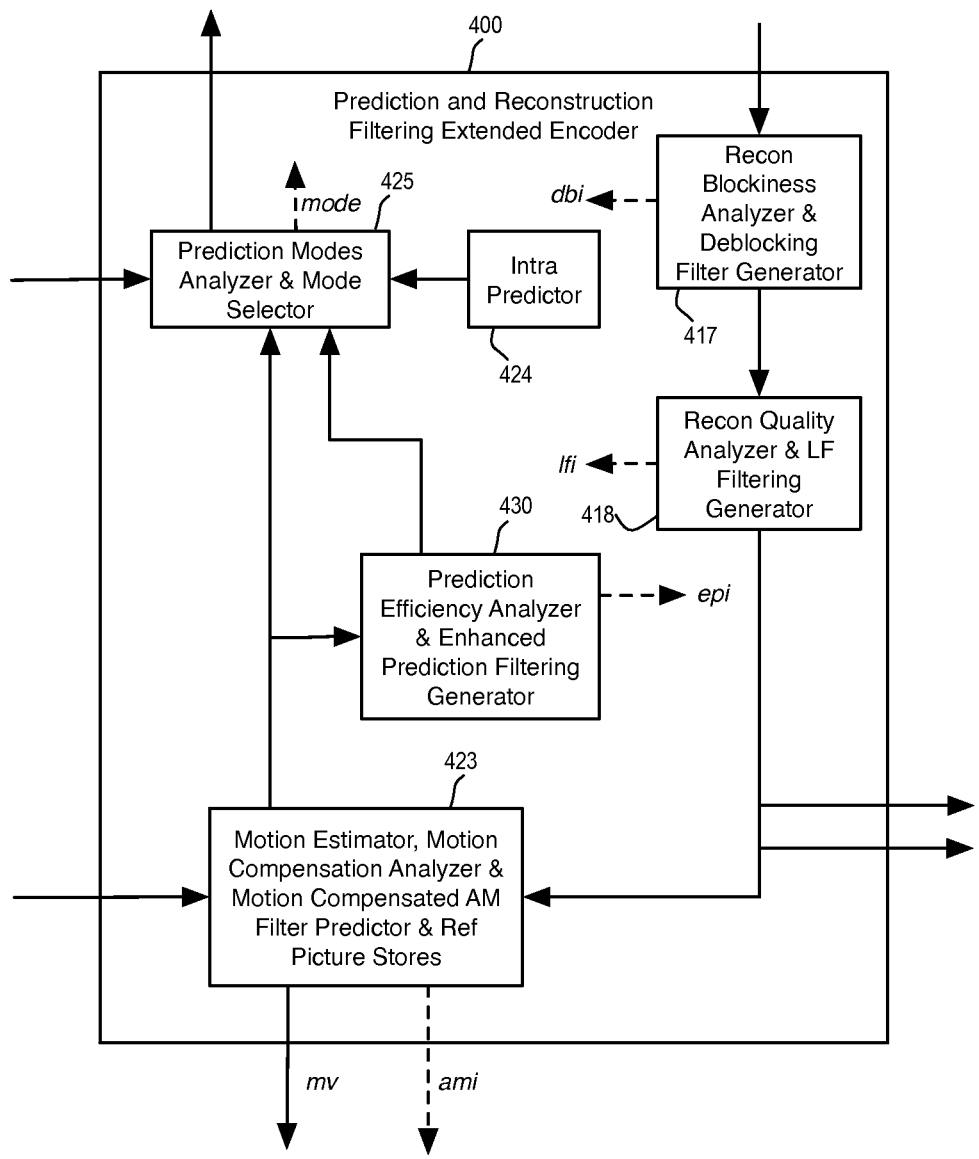
FIG. 4 is an illustrative diagram of an example encoder filter subsystem.

FIG. 4 is an illustrative diagram of an example encoder filtering subsystem 400, arranged in accordance with at least some implementations of the present disclosure. As illustrated, filtering subsystem 400 may include recon blockiness analyzer & deblocking filter generator 417, recon quality analyzer & LF filtering generator 418, motion estimator, motion compensation analyzer & motion compensated AM filter predictor & ref picture stores 423, intra predictor 424, prediction modes analyzer & mode selector 425, and/or prediction efficiency analyzer & enhanced prediction filtering generator 430.

Filtering subsystem 400 may incorporates "Pred Efficiency Analyzer & EI (Efficiency Improvement) Filtering Generator" that optionally allows filtering of the prediction signal so that both the filtered version as well as not filtered version can be provided as choices to Fred. Mode Analyzer and Mode Selector that besides selecting between various motion prediction modes and intra prediction mode available on block basis, also selects prediction reference/s to use. Obviously a key to improved coding efficiency provided by Fred Efficiency Analyzer & EP (Enhanced Prediction) Filtering Generator depends on two items, (1) how to analyze prediction efficiency, and (2) how to decide what type of filtering to perform. Since prediction filtering can be done by two ways, we call this approach PreSelection Prediction Filtering as compared to another embodiment that we generally refer to as call as Prediction Filtering (with Prediction Fusion, being a specific type and way of applying Prediction filtering). In any case, the Pred efficiency Analyzer & EP Filt Generator outputs epi parameters that need to be sent to the decoder.

Further, while a detailed discussion on aforementioned items is outside the scope of the present disclosure, it suffices to say that a nonseparable, a separable or a hybrid wiener filter selectively computed by grouping blocks where certain motion compensation and coding modes are efficient, with efficient coding of filter coefficients by codebook methods or using predictions (from history or codebook) would in general form a good solution for Prediction Filtering.

The Pred EP filtering as discussed in FIGS. 4 and 5B using suitable matched filters is clearly a step forward (as compared to a prediction filtering approach from 1980's included then in H.261 standard that simply used fixed low pass filters to filter prediction blocks and offer it to mode selector along with unfiltered prediction blocks), but it still is somewhat limited mainly as in advanced codecs such as HEVC or NGV there are many prediction modes and prediction references. So, if each prediction signal or prediction signal/reference type combination were to use a different content based filter, a number of type of filter coefficients would need to be sent to the decoder via the bitstream adding significant bit costs and complexity. Further the aforementioned system is shown only filtering motion compensated prediction signal while there are many sources of prediction (such as skip, direct, auto, and intra) in any coder as well as many prediction reference pictures (either actual, transformed, or synthesized).

In the illustrated implementation, recon blockiness analyzer & deblocking filter generator 417 may be capable of analysis of blocking produced during coding, determining dbi parameters to control how deblocking is applied.

In the illustrated implementation, recon quality analyzer & LF filtering generator 418 may be capable of analyzing and performing loop filtering, determining lfi parameters (e.g., filter coefficients, filter index, filter block map, or the like).

In the illustrated implementation, motion estimator, motion compensation analyzer & motion compensated AM filter predictor & ref picture stores 423 may be capable of improving motion compensated prediction, determining ami parameters.

In the illustrated implementation, intra predictor 424 may be capable of performing intra prediction.

In the illustrated implementation, prediction modes analyzer & mode selector 425 may be capable of selecting between various motion prediction modes and intra prediction modes available on a block basis, and selecting prediction references.

In the illustrated implementation, prediction efficiency analyzer & enhanced prediction filtering generator 430 may be capable of optionally filtering the prediction signal so that both the filtered version as well as not filtered version can be provided to prediction modes analyzer & mode selector 425, determining epi parameters.

As will be described in greater detail below, prediction efficiency analyzer & enhanced prediction filtering generator 430 may optionally be included or excluded from any of the following coder systems.

Figure 5:
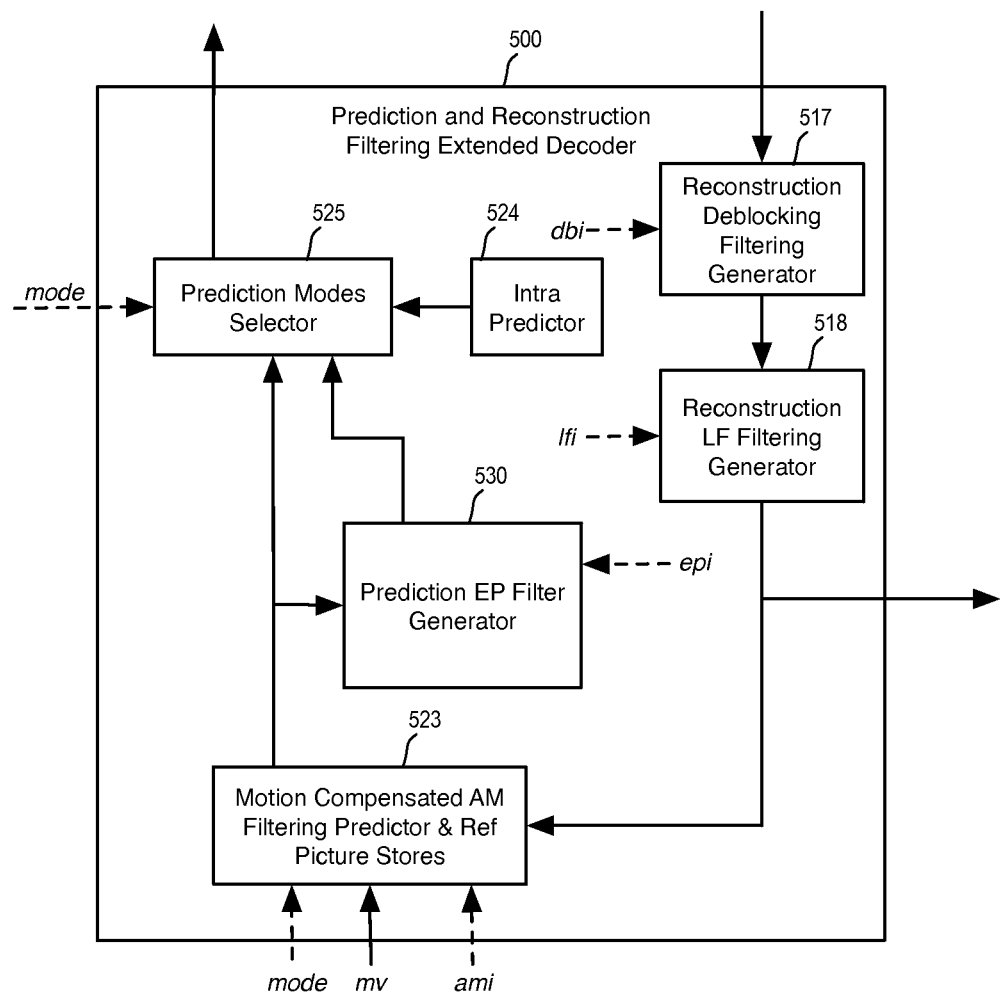
FIG. 5 is an illustrative diagram of an example decoder filter subsystem.

FIG. 5 is an illustrative diagram of an example decoder subsystem 500, arranged in accordance with at least some implementations of the present disclosure. As shown, decoder subsystem 500 may include reconstruction deblocking filtering generator 517, reconstruction LF filtering generator 518, motion compensated AM filtering predictor & ref picture stores 523, intra predictor 524, prediction modes selector 525, and/or prediction EP filter generator 530.

In operation, decoder subsystem 500 may use the Recon DB Filt. Generator that uses dbi parameters for deblock filtering, the Recon LF Filtering Generator that uses lfi parameters for in-loop filtering, and the Motion Compensated AM Filt. Generator that uses ami parameters for adaptive motion filtering, are common processing units between these two figures.

In the illustrated implementation, reconstruction deblocking filter generator 517 may be capable of deblocking. The operation of reconstruction deblocking filter generator 517 may be controlled by dbi parameters received from, for example, encoder 100 of FIG. 1.

In the illustrated implementation, reconstruction LF filtering generator 518 may be capable of performing loop filtering. The operation of reconstruction LF filtering generator 518 may be controlled by lfi parameters received from, for example, encoder 100 of FIG. 1.

In the illustrated implementation, motion compensated AM filtering predictor & ref picture stores 523 may be capable of AM filtering. The operation of motion compensated AM filtering predictor & ref picture stores 523 may be controlled by ami parameters received from, for example, encoder 100 of FIG. 1.

In the illustrated implementation, intra predictor 524 may be capable of performing intra prediction.

In the illustrated implementation, prediction modes selector 525 may be capable of determining a prediction mode selection from among, "skip", "auto", "inter", "multi", and "intra", for each prediction partition of a tile, all of which may apply to P- and F/B-pictures, based on mode selection data in, for example, input bitstream 201. In addition to prediction modes, prediction modes selector 525 also allows for selection of reference types that can be different depending on "inter" or "multi" mode, as well as for P- and F/B-pictures.

Figure 6:
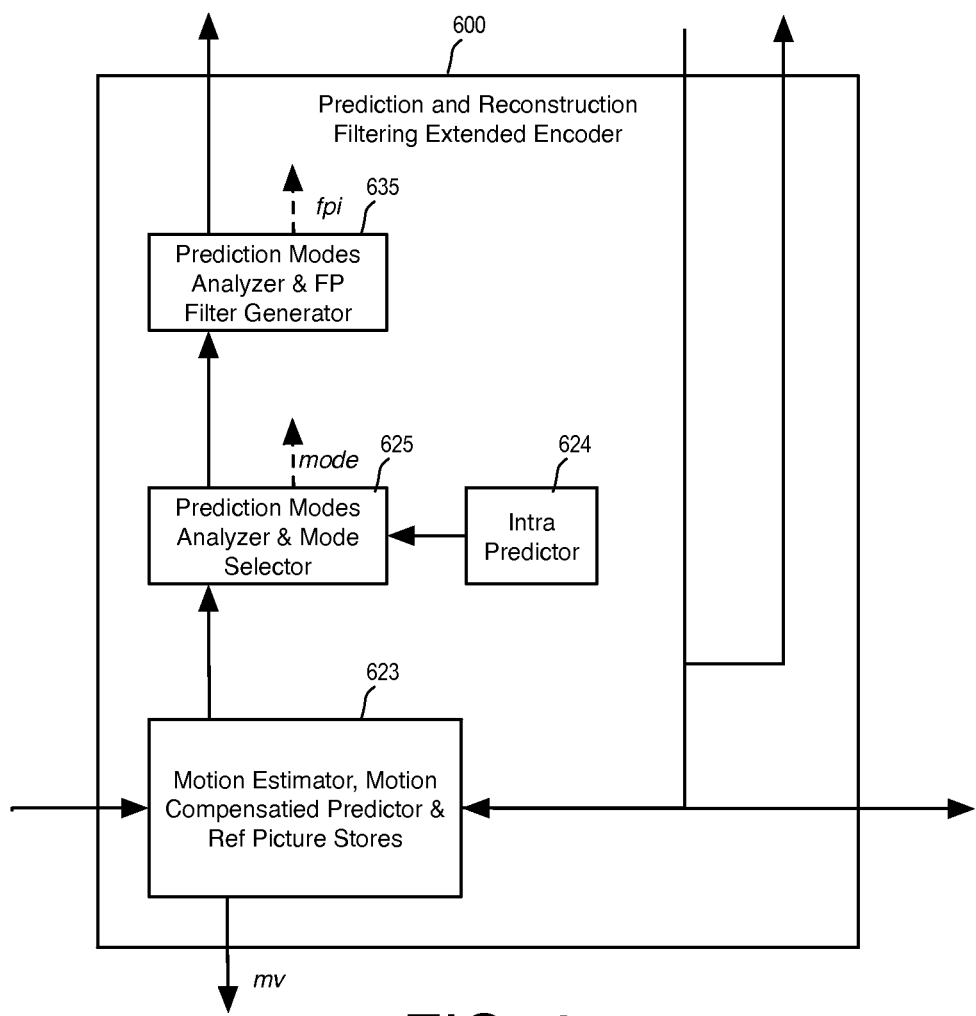
FIG. 6 is an illustrative diagram of an example encoder filter subsystem.

FIG. 6 is an illustrative diagram of an example encoder subsystem 600, arranged in accordance with at least some implementations of the present disclosure. As shown, encoder subsystem 600 may include motion estimator, motion compensated predictor & ref picture stores 623, intra predictor 624, prediction modes analyzer & mode selector 625, and/or prediction modes analyzer & FP filter generator 635.

In operation, encoder subsystem 600 introduces the concept of Pred Fusion Prediction (FP) filtering. Rather than filtering of certain prediction signals and offering it as a choice to mode decision process, the prediction FP filtering process first lets best mode decisions to be made without filtering and then in addition after assembling a frame or a subset of a picture (region, or 1 or more slices) of predictions, determines one or more filter/s to choose for improving the prediction signal. The goal of this type of prediction is in fact to reduce differences between various predictions by homogenizing them via a fusion process that would not only reduce prediction errors, but also improve its visual appearance which is especially important at higher quantizers where a recon signal is mainly derived from prediction with very little coding update sent.

Specifically, the Pred and Recon Filtering subsystem for Encoding depicted in FIG. 6 shows a processing unit labeled as Fred Fusion Analyzer & FP Filt Generator that takes the output of Pred Modes Selector and performs an analysis of predicted picture (region, or 1 or more slices) to determine how filtering can improve the prediction signal thereby reducing prediction errors, the actual signal that is coded. The filtering info including whether one filter or multiple filters (on one or more block types) are used, along with actual filter coefficients, index to history or codebook based prediction and associated coefficient prediction differences are sent as fpi information.

While specification of detailed choice of the number, sort of filters, size of filters, filter coefficients themselves their prediction and encoding for good results is outside the scope of this disclosure, it may suffice to say that wiener filters represent a good class of filters starting with which an effective yet practical algorithm for prediction filtering can be developed. Additionally, for prediction fusion filtering where intra and inter blocks need to coexist within the same picture (in a region, or in one or more slices), extension of boundaries of decoded previous blocks may be necessary, largely as intra coding typically uses spatial prediction and is thus dependent on decoded neighboring blocks.

In the illustrated implementation, motion estimator, motion compensated predictor & ref picture stores 623 may be capable of In the illustrated implementation, intra predictor 624 may be capable of performing intra prediction.

In the illustrated implementation, prediction modes analyzer & mode selector 625 may be capable of selecting between various motion prediction modes and intra prediction modes available on a block basis, and selecting prediction references.

In the illustrated implementation, prediction modes analyzer & FP filter generator 635 may be capable of receiving output from prediction modes analyzer & mode selector 625 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fpi information.

In operation, filtering subsystem 600 may operate so that the prediction FP filtering process first lets best mode decisions to be made without filtering and then in addition after assembling a frame or a subset of a picture (region, or 1 or more slices) of predictions, determines one or more filter/s to choose for improving the prediction signal. This type of prediction may reduce differences between various predictions by homogenizing them via a fusion process that may reduce prediction errors and improve the visual appearance of the video, which may be important at higher quantizers where a recon signal may mainly be derived from prediction with very little coding update sent.

Figure 7:
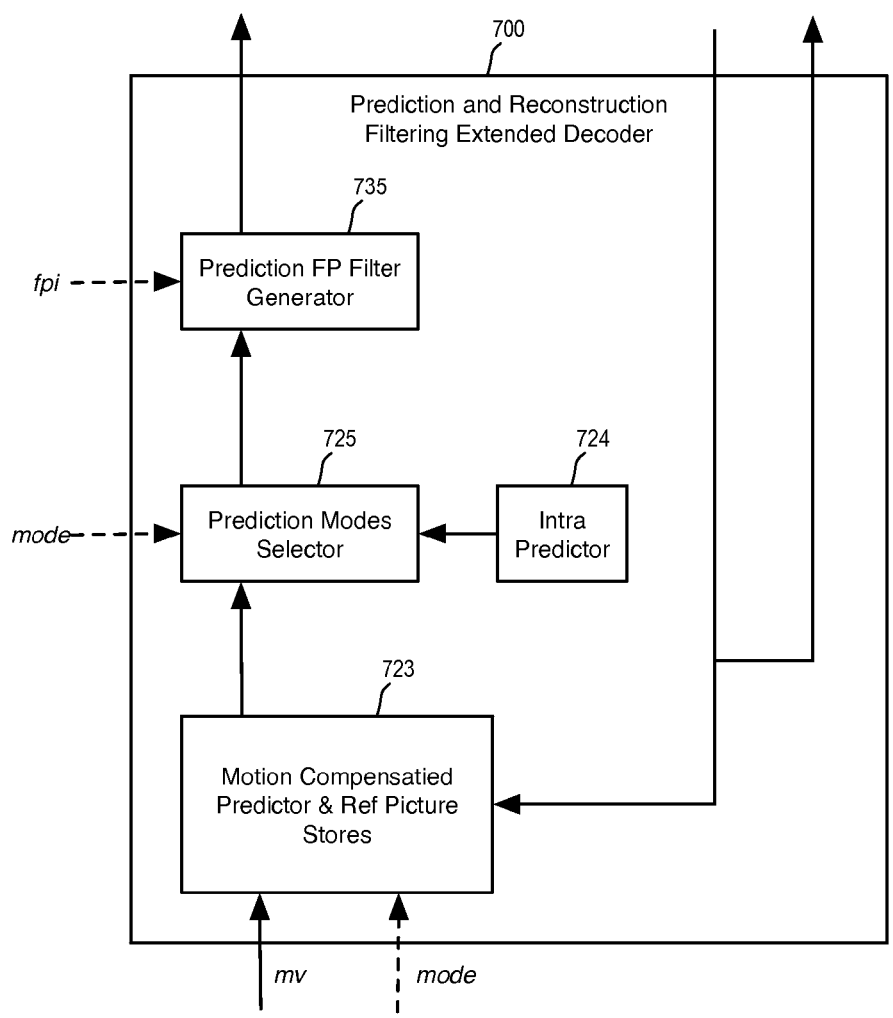
FIG. 7 is an illustrative diagram of an example decoder filter subsystem.

FIG. 7 is an illustrative diagram of an example decoder subsystem 700, arranged in accordance with at least some implementations of the present disclosure. As shown, decoder subsystem 700 may include motion compensated predictor & ref picture stores 723, intra predictor 724, prediction modes selector 725, and/or prediction FP filter generator 735.

In operation, decoder subsystem 700 may show a processing unit labeled Fred FP Filt Generator that performs prediction fusion FP Filtering at the decoder. It takes the output of Fred Modes Selector and under the guidance of fpi signal decoded at the encoder from the bitstream, it performs actual filtering.

In the illustrated implementation, motion compensated predictor & ref picture stores 723 may be capable of In the illustrated implementation, intra predictor 724 may be capable of performing intra prediction.

In the illustrated implementation, prediction modes selector 725 may be capable of selecting between various motion prediction modes and intra prediction modes available on a block basis, and selecting prediction references.

In the illustrated implementation, prediction FP filter generator 735 may be capable of performing prediction fusion FP filtering by receiving output from prediction modes selector 725 and, under guidance from the fpi information, performing actual filtering.

While specification of detailed choice (of the number, sort of filters, size of filters, and filter coefficients themselves and their prediction and encoding) is outside the scope of this disclosure, Wiener filters may represent a good class of filters starting with which an effective yet practical algorithm for prediction filtering can be developed. For prediction fusion filtering where intra and inter blocks need to coexist within the same picture (in a region, or in one or more slices), extension of boundaries of decoded previous blocks may be necessary, largely as intra coding typically uses spatial prediction and is thus dependent on decoded neighboring blocks.

Figure 8:
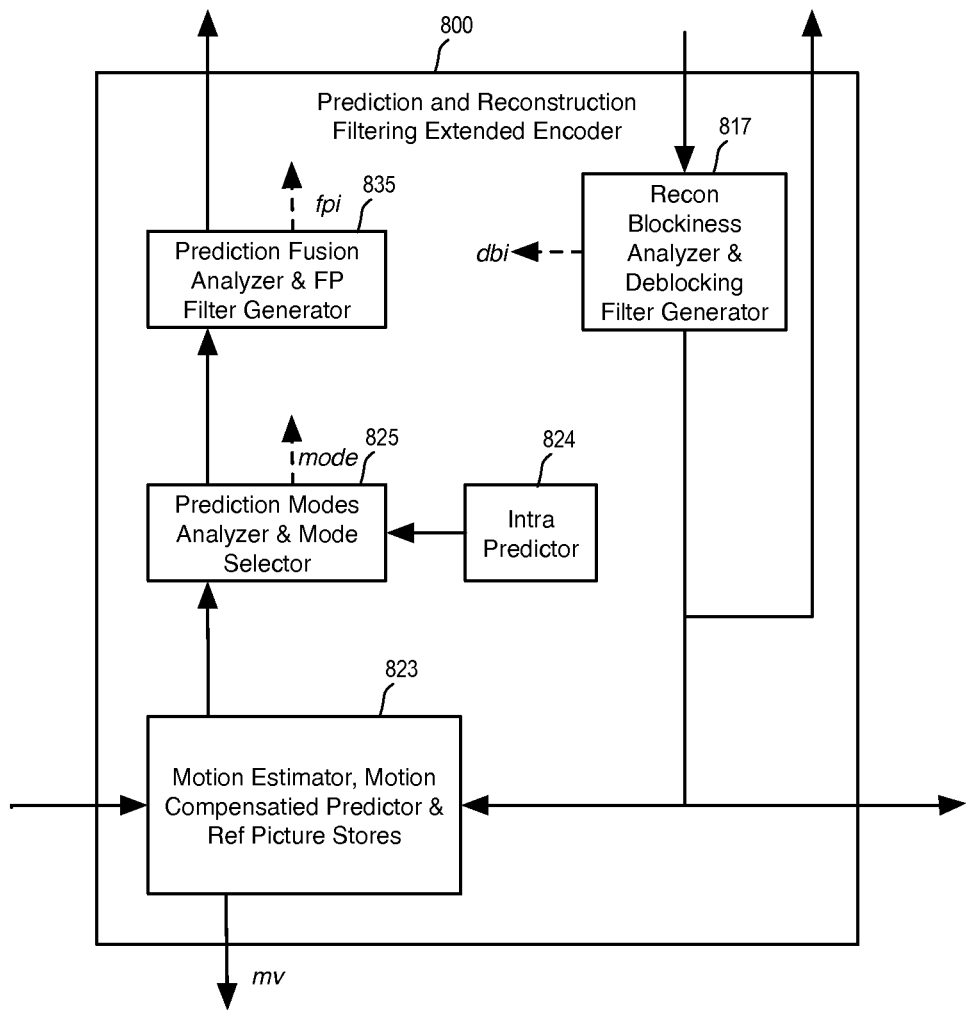
FIG. 8 is an illustrative diagram of an example encoder filter subsystem.

FIG. 8 is an illustrative diagram of an example encoder subsystem 800, arranged in accordance with at least some implementations of the present disclosure. As shown, encoder subsystem 800 may include recon blockiness analyzer & deblocking filter generator 817, motion estimator, motion compensated predictor & ref picture stores 823, intra predictor 824, prediction modes analyzer & mode selector 825, and/or prediction fusion analyzer & FP filter generator 835.

In operation, encoder subsystem 800 may include deblock filtering. In this Figure, the Recon Blockiness Analyzer & DB Filt. Generator that outputs dbi filtering parameters is identical to the deblock filtering processing unit discussed earlier. Both the fpi filtering parameters and the dbi filtering parameters are encoded and sent to the decoder via the bitstream. In this Figure, the Motion Estimator, Motion Compensated Predictor shown is the one without AM filtering.

In the illustrated implementation, recon blockiness analyzer & deblocking filter generator 817 may be capable of analysis of blocking produced during coding, determining dbi parameters to control how deblocking is applied.

In the illustrated implementation, motion estimator, motion compensated predictor & ref picture stores 823 may be capable of In the illustrated implementation, intra predictor 824 may be capable of performing intra prediction.

In the illustrated implementation, prediction modes analyzer & mode selector 825 may be capable of may be capable of selecting between various motion prediction modes and intra prediction modes available on a block basis, and selecting prediction references.

In the illustrated implementation, prediction fusion analyzer & FP filter generator 835 may be capable of receiving output from prediction modes analyzer & mode selector 825 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fpi information.

Figure 9:
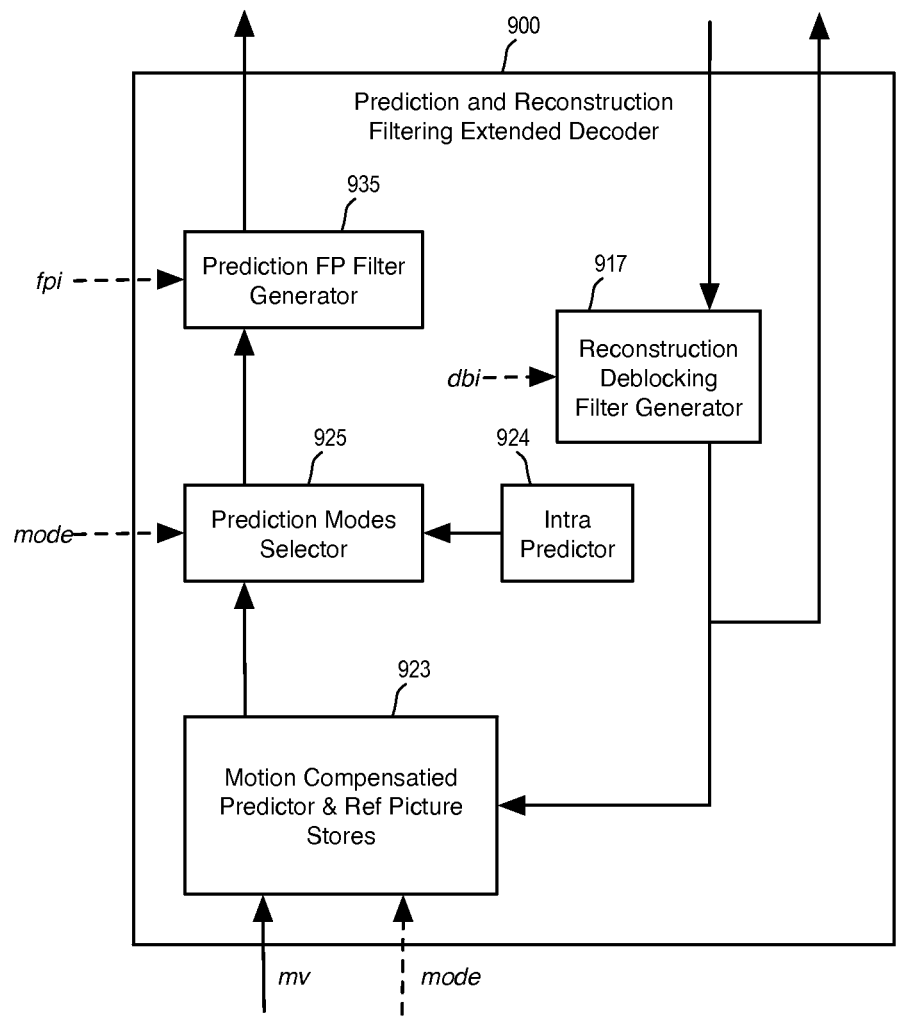
FIG. 9 is an illustrative diagram of an example decoder filter subsystem.

FIG. 9 is an illustrative diagram of an example decoder subsystem 900, arranged in accordance with at least some implementations of the present disclosure. As shown, decoder subsystem 900 may include reconstruction deblocking filter generator 917, motion compensated predictor & ref picture stores 923, intra predictor 924, prediction modes selector 925, and/or prediction FP filter generator 935.

In operation, decoder subsystem 900 may incorporates the processing unit of Recon DB Filt. Generator that deblocks reconstructed signal guided by the dbi parameters that are decoded at the decoder from the bitstream. The Pred FP Filt. Generator performs prediction fusion filtering at the decoder guided by fpi parameters. The Motion Compensated Predictor shown in this Figure is the version without AM filtering.

In the illustrated implementation, reconstruction deblocking filter generator 917 may be capable of deblocking the reconstructed signal, guided by the dbi parameters that are decoded at the decoder from the bitstream.

In the illustrated implementation, motion estimator, motion compensated predictor & ref picture stores 923 may be capable of In the illustrated implementation, intra predictor 924 may be capable of performing intra prediction.

In the illustrated implementation, prediction modes selector 925 may be capable of selecting between various motion prediction modes and intra prediction modes available on a block basis, and selecting prediction references.

In the illustrated implementation, prediction FP filter generator 935 may be capable of performing prediction fusion FP filtering by receiving output from prediction modes selector 925 and, under guidance from the fpi information, performing actual filtering.

Figure 10:
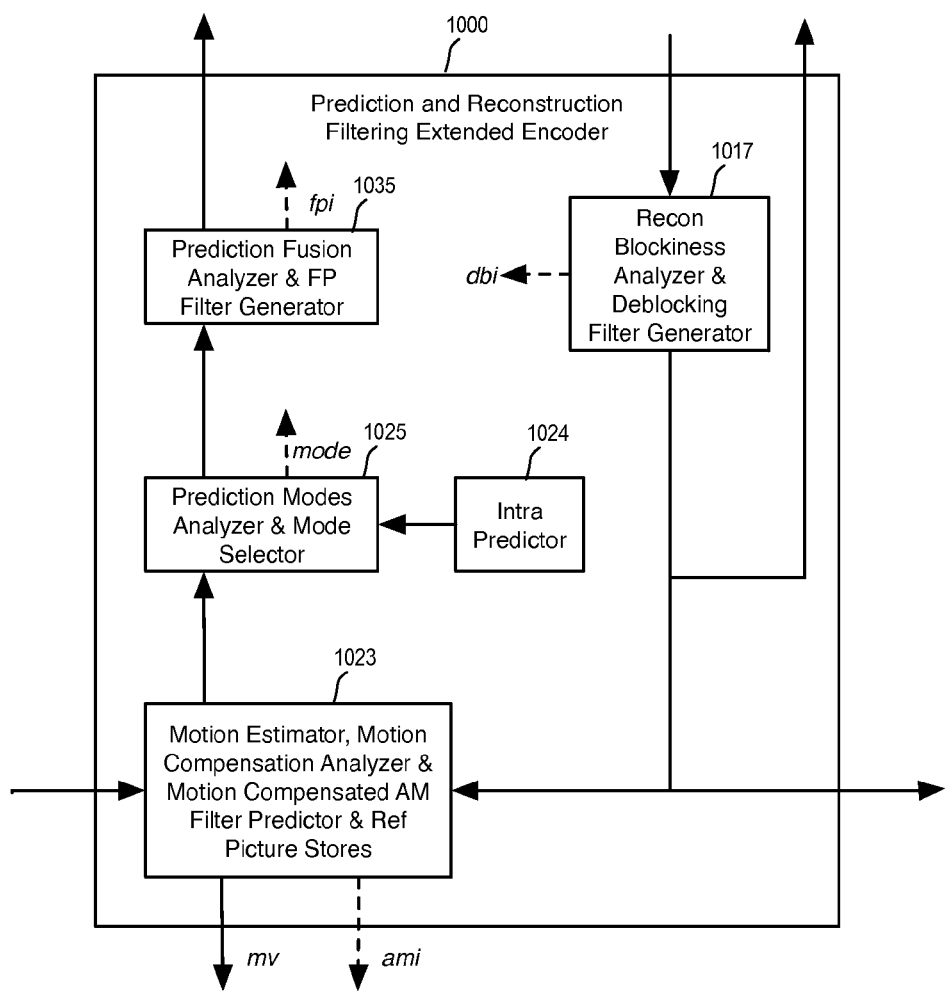
FIG. 10 is an illustrative diagram of an example encoder filter subsystem.

FIG. 10 is an illustrative diagram of an example encoder subsystem 1000, arranged in accordance with at least some implementations of the present disclosure. As shown, encoder subsystem 1000 may include recon blockiness analyzer & deblocking filter generator 1017, motion estimator, motion compensation analyzer & motion compensated AM filter predictor & ref picture stores 1023, intra predictor 1024, prediction modes analyzer & mode selector 1025, and/or prediction fusion analyzer & FP filter generator 1035.

In operation, example encoder subsystem 1000 may include AM (adaptive motion) filtering as part of Motion Compensation which outputs ami parameters that are sent to the decoder via the bitstream. This entire encoding subsystem now includes DB filtering, AM Filtering, and FP Filtering and encoded bitstream includes corresponding dbi, ami, and fpi parameters.

In the illustrated implementation, recon blockiness analyzer & deblocking filter generator 1017 may be capable of analysis of blocking produced during coding, determining dbi parameters to control how deblocking is applied.

In the illustrated implementation, motion estimator, motion compensation analyzer & motion compensated AM filter predictor & ref picture stores 1023 may be capable of performing adaptive motion filtering and outputting ami parameters that may be sent to the decoder via the bitstream.

In the illustrated implementation, intra predictor 1024 may be capable of performing intra prediction.

In the illustrated implementation, prediction modes analyzer & mode selector 1025 may be capable of may be capable of selecting between various motion prediction modes and intra prediction modes available on a block basis, and selecting prediction references.

In the illustrated implementation, prediction fusion analyzer & FP filter generator 1035 may be capable of receiving output from prediction modes analyzer & mode selector 1025 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fpi information.

Figure 11:
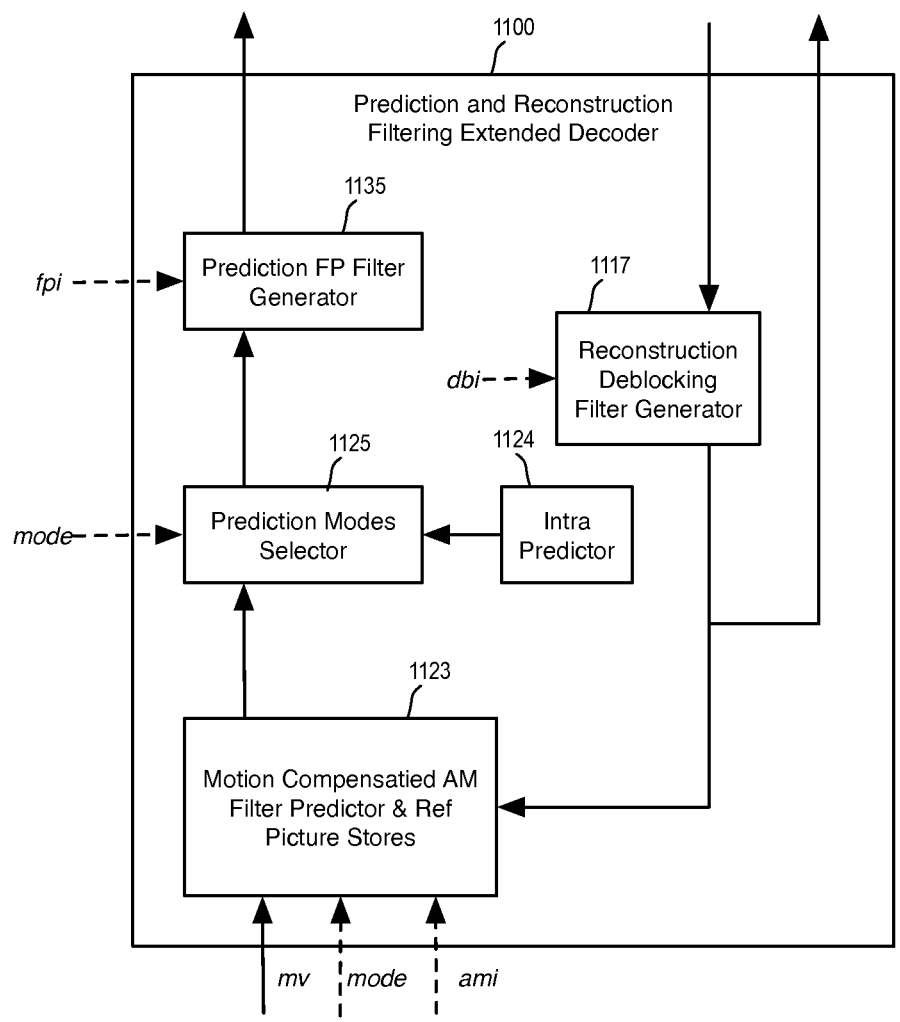
FIG. 11 is an illustrative diagram of an example decoder filter subsystem.

FIG. 11 is an illustrative diagram of an example decoder subsystem 1100, arranged in accordance with at least some implementations of the present disclosure. As shown, decoder subsystem 1100 may include reconstruction deblocking filter generator 1117, motion compensated AM filter predictor & ref picture stores 1123, intra predictor 1124, prediction modes selector 1125, and/or prediction FP filter generator 1135.

In operation, example decoder subsystem 1100 may include AM filtering in motion compensated predictor and is guided by ami filtering parameters decoded from the bitstream.

In the illustrated implementation, reconstruction deblocking filter generator 1117 may be capable of deblocking the reconstructed signal, guided by the dbi parameters that are decoded at the decoder from the bitstream.

In the illustrated implementation motion compensated AM filter predictor & ref picture stores 1123 may be capable of performing adaptive motion filtering, guided by ami filtering parameters decoded from the bitstream.

In the illustrated implementation, intra predictor 1124 may be capable of performing intra prediction.

In the illustrated implementation, prediction modes selector 1125 may be capable of selecting between various motion prediction modes and intra prediction modes available on a block basis, and selecting prediction references.

In the illustrated implementation, prediction FP filter generator 1135 may be capable of performing prediction fusion FP filtering by receiving output from prediction modes selector 1125 and, under guidance from the fpi information, performing actual filtering.

Figure 12:
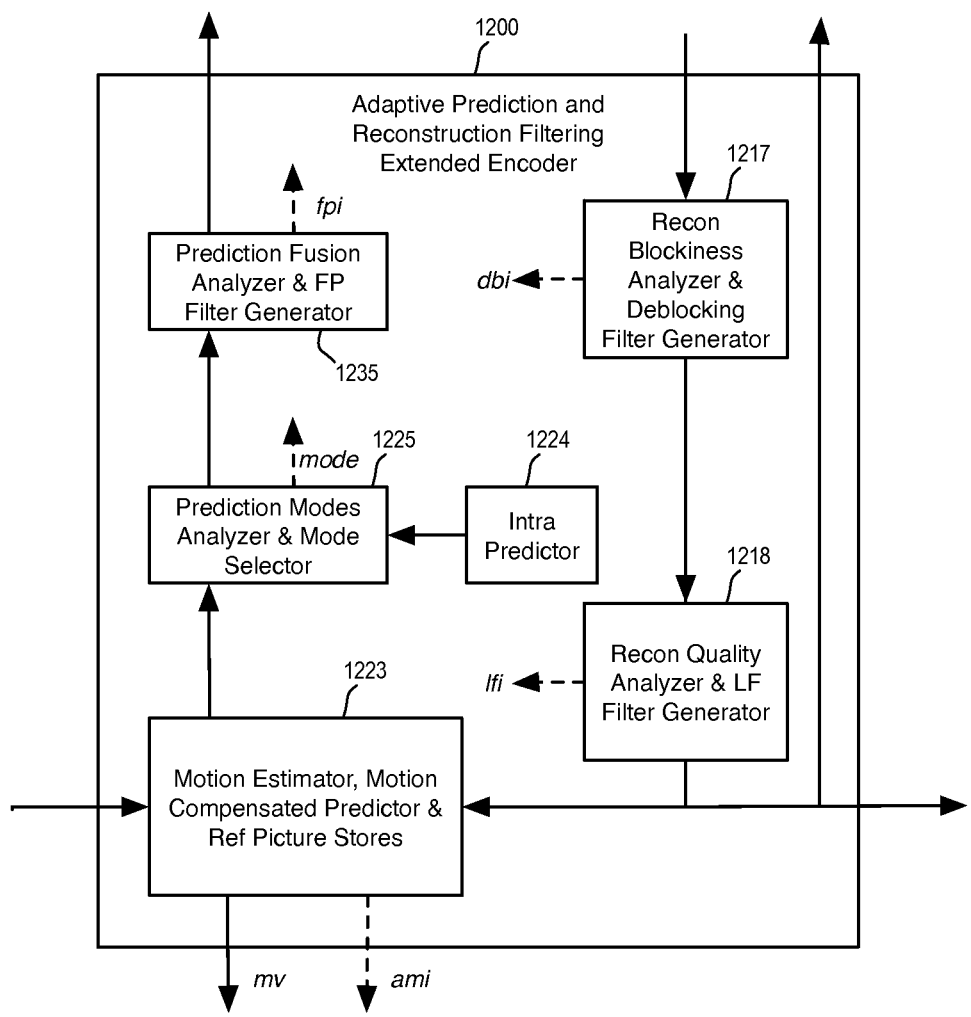
FIG. 12 is an illustrative diagram of an example encoder filter subsystem.

FIG. 12 is an illustrative diagram of an example encoder subsystem 1200, arranged in accordance with at least some implementations of the present disclosure. As shown, encoder subsystem 1200 may include recon blockiness analyzer & deblocking filter generator 1217, recon quality analyzer & LF filter generator 1218, motion estimator, motion compensated predictor & ref picture stores 1223, intra predictor 1224, prediction modes analyzer & mode selector 1225, and/or prediction fusion analyzer & FP filter generator 1235.

In operation, encoder subsystem 1200 may include LF (loop filtering) performed in Recon Quality Analyzer & LF Filt. Generator which outputs lfi parameters that are sent to the decoder via the bitstream. This entire encoding subsystem now includes DB filtering, LF filtering, and FP Filtering and encoded bitstream includes corresponding dbi, lli, and fpi parameters.

In the illustrated implementation, recon blockiness analyzer & deblocking filter generator 1217 may be capable of analysis of blocking produced during coding, determining dbi parameters to control how deblocking may be applied.

In the illustrated implementation, recon quality analyzer & LF filter generator 1218 may be capable of performing loop filtering, outputting lfi parameters that may be sent to the decoder via the bitstream In the illustrated implementation, motion estimator, motion compensated predictor & ref picture stores 1223 may be capable of In the illustrated implementation, intra predictor 1224 may be capable of performing intra prediction.

In the illustrated implementation, prediction modes analyzer & mode selector 1225 may be capable of may be capable of selecting between various motion prediction modes and intra prediction modes available on a block basis, and selecting prediction references.

In the illustrated implementation, prediction fusion analyzer & FP filter generator 1235 may be capable of receiving output from prediction modes analyzer & mode selector 1225 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fpi information.

Figure 13:
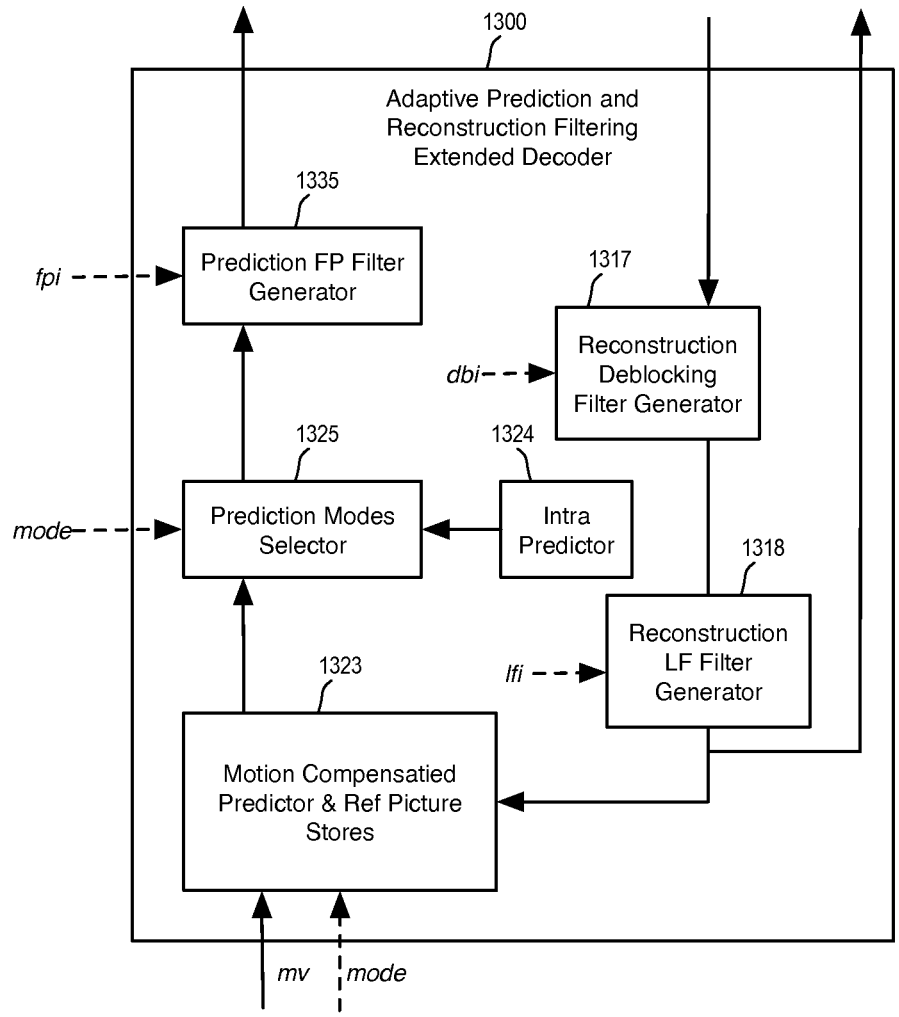
FIG. 13 is an illustrative diagram of an example decoder filter subsystem.

FIG. 13 is an illustrative diagram of an example decoder subsystem 1300, arranged in accordance with at least some implementations of the present disclosure. As shown, decoder subsystem 1300 may include reconstruction deblocking filter generator 1317, reconstruction LF filter generator 1318, motion compensated predictor & ref picture stores 1323, intra predictor 1324, prediction modes selector 1325, and/or prediction FP filter generator 1335.

In operation, example decoder subsystem 1300 may include LF filtering performed in Recon LF Filt. Generator and is guided by lfi filtering parameters decoded from the bitstream.

In the illustrated implementation, reconstruction deblocking filter generator 1317 may be capable of deblocking the reconstructed signal, guided by the dbi parameters that are decoded at the decoder from the bitstream.

In the illustrated implementation, reconstruction LF filter generator 1318 may be capable of performing LF filtering, guided by lfi filtering parameters decoded from the bitstream.

In the illustrated implementation, motion compensated predictor & ref picture stores 1323 may be capable of In the illustrated implementation, intra predictor 1324 may be capable of performing intra prediction.

In the illustrated implementation, prediction modes selector 1325 may be capable of selecting between various motion prediction modes and intra prediction modes available on a block basis, and selecting prediction references.

In the illustrated implementation, prediction FP filter generator 1335 may be capable of performing prediction fusion FP filtering by receiving output from prediction modes selector 1325 and, under guidance from the fpi information, performing actual filtering.

Figure 14:
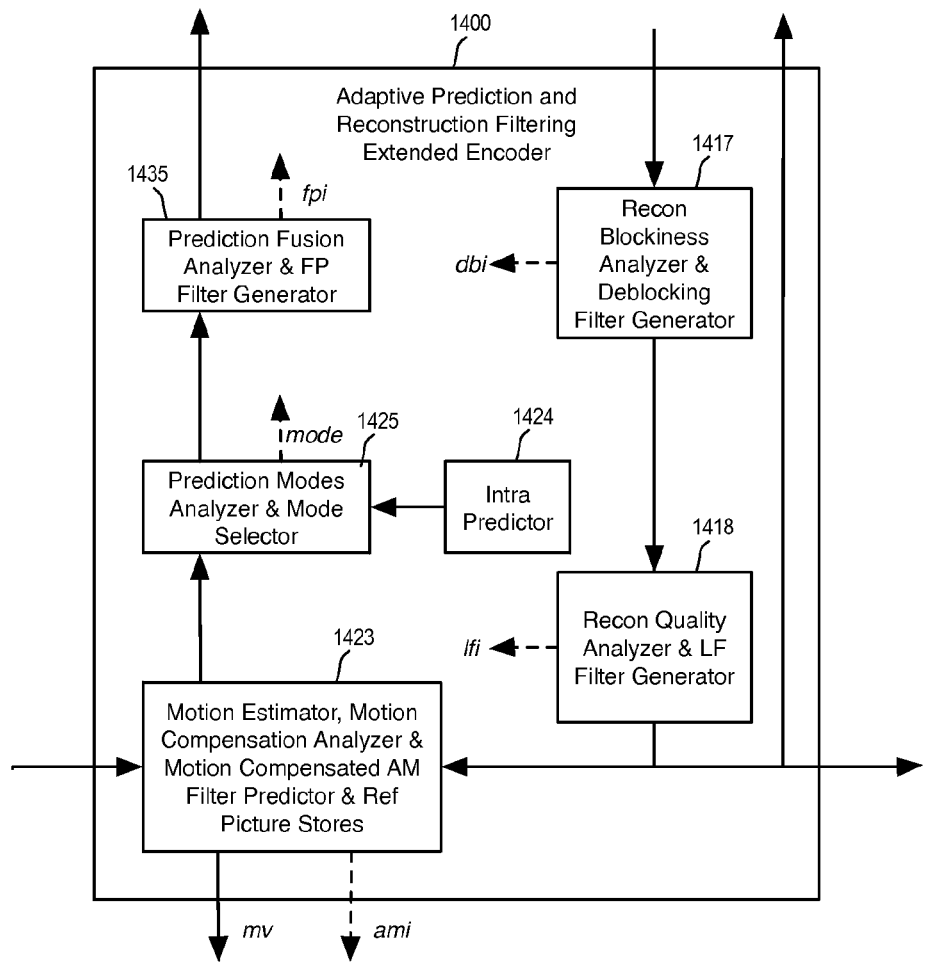
FIG. 14 is an illustrative diagram of an example encoder filter subsystem.

FIG. 14 is an illustrative diagram of an example encoder subsystem 1400, arranged in accordance with at least some implementations of the present disclosure. As shown, encoder subsystem 1400 may include recon blockiness analyzer & deblocking filter generator 1417, recon quality analyzer & LF filter generator 1418, motion estimator, motion compensation analyzer & motion compensated AM filter predictor & ref picture stores 1423, intra predictor 1424, prediction modes analyzer & mode selector 1425, and/or prediction fusion analyzer & FP filter generator 1435.

In operation, encoder subsystem 1400 may include AM (adaptive motion) filtering as part of Motion Compensation which outputs ami parameters that are sent to the decoder via the bitstream. This entire encoding subsystem now includes DB filtering, LF filtering, AM Filtering, and FP Filtering and encoded bitstream includes corresponding dbi, ami, and fpi parameters.

In the illustrated implementation, recon blockiness analyzer & deblocking filter generator 1417 may be capable of analysis of blocking produced during coding, determining dbi parameters to control how deblocking may be applied.

In the illustrated implementation, recon quality analyzer & LF filter generator 1418 may be capable of performing loop filtering, outputting lfi parameters that may be sent to the decoder via the bitstream In the illustrated implementation, motion estimator, motion compensation analyzer & motion compensated AM filter predictor & ref picture stores 1423 may be capable of performing adaptive motion filtering and outputting ami parameters that may be sent to the decoder via the bitstream.

In the illustrated implementation, intra predictor 1424 may be capable of performing intra prediction.

In the illustrated implementation, prediction modes analyzer & mode selector 1425 may be capable of may be capable of selecting between various motion prediction modes and intra prediction modes available on a block basis, and selecting prediction references.

In the illustrated implementation, prediction fusion analyzer & FP filter generator 1435 may be capable of receiving output from prediction modes analyzer & mode selector 1425 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fpi information.

Figure 15:
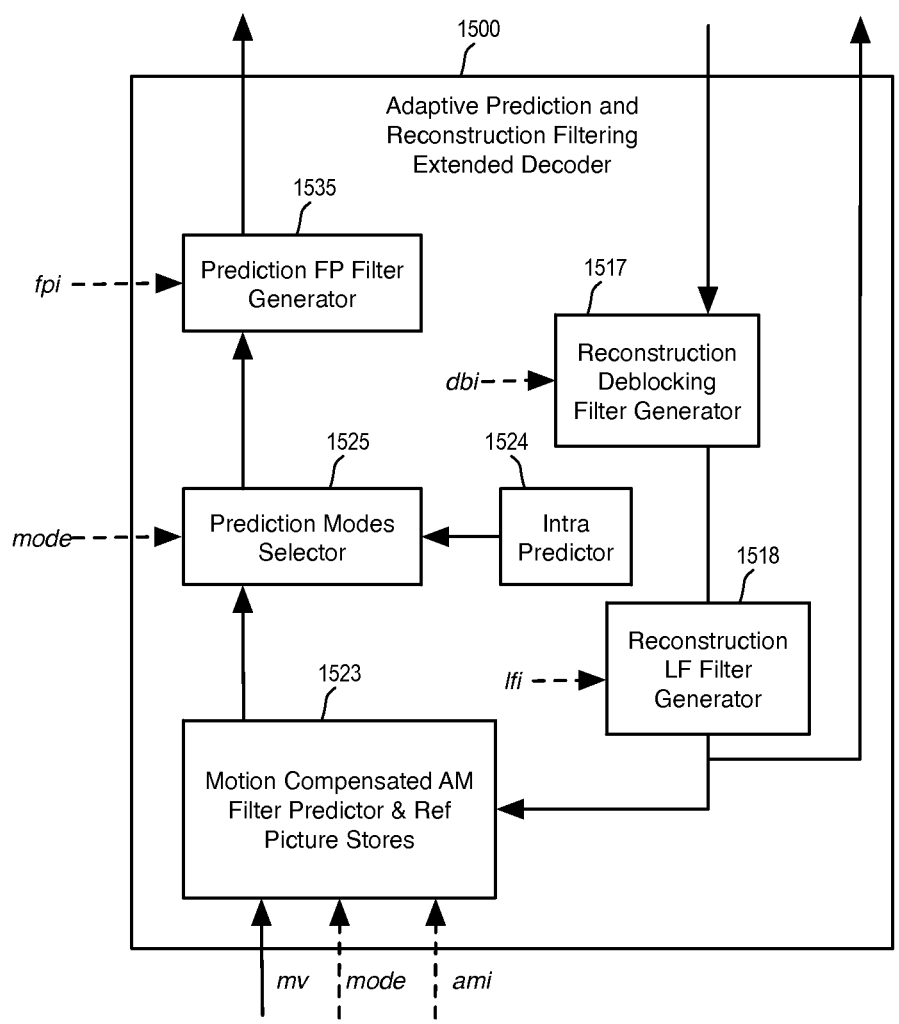
FIG. 15 is an illustrative diagram of an example decoder filter subsystem.

FIG. 15 is an illustrative diagram of an example decoder subsystem 1500, arranged in accordance with at least some implementations of the present disclosure. As shown, decoder subsystem 1500 may include reconstruction deblocking filter generator 1517, reconstruction LF filter generator 1518, motion compensated AM filter predictor & ref picture stores 1523, intra predictor 1524, prediction modes selector 1525, and/or prediction FP filter generator 1535.

In operation, decoder subsystem 1500 may include AM filtering in motion compensated predictor and is guided by ami filtering parameters decoded from the bitstream.

In the illustrated implementation, reconstruction deblocking filter generator 1517 may be capable of deblocking the reconstructed signal, guided by the dbi parameters that are decoded at the decoder from the bitstream.

In the illustrated implementation, reconstruction LF filter generator 1518 may be capable of performing LF filtering, guided by lfi filtering parameters decoded from the bitstream.

In the illustrated implementation, motion compensated AM filter predictor & ref picture stores 1523 may be capable of performing adaptive motion filtering, guided by ami filtering parameters decoded from the bitstream.

In the illustrated implementation, intra predictor 1524 may be capable of performing intra prediction.

In the illustrated implementation, prediction modes selector 1525 may be capable of selecting between various motion prediction modes and intra prediction modes available on a block basis, and selecting prediction references.

In the illustrated implementation, prediction FP filter generator 1535 may be capable of performing prediction fusion FP filtering by receiving output from prediction modes selector 1525 and, under guidance from the fpi information, performing actual filtering.

Figure 16:
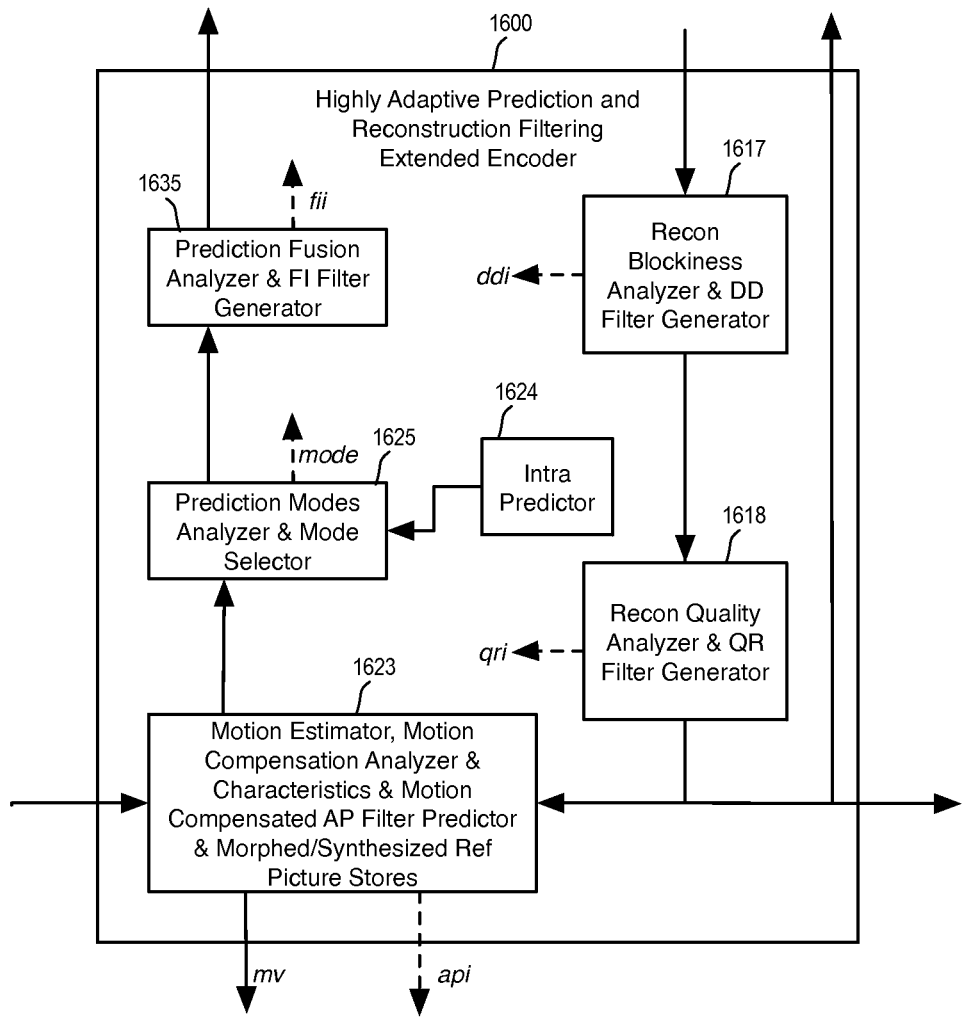
FIG. 16 is an illustrative diagram of an example encoder filter subsystem.

FIG. 16 is an illustrative diagram of an example encoder subsystem 1600, arranged in accordance with at least some implementations of the present disclosure. As shown, encoder subsystem 1600 may include recon blockiness analyzer & DD filter generator 1617, recon quality analyzer & QR filter generator 1618, motion estimator, motion compensation analyzer & characteristics & motion compensated AP filter predictor & morphed/synthesized ref picture stores 1623, intra predictor 1624, prediction modes analyzer & mode selector 1625, and/or prediction fusion analyzer & FI filter generator 1635.

In operation, encoder subsystem 1600 may include a type of deblock filtering, a type of in-loop filtering, a type of adaptive motion filtering, and a type of fusion improvement filtering and having the encoded bitstream carry corresponding parameters needed for each such filtering. The specific versions of such filtering used are DD (Deblock and Dither) filtering that now replaces DB filtering, QR (Quality Restoration) filtering that now replaces LF filtering, AP (Adaptive Precision) filtering that replace AM filtering, and FI (Fusion Improvement) filtering replaces FP filtering. The corresponding parameters that are now sent to the decoder are ddi parameters, qri parameters, api parameters, and fii parameters.

In operation, decoder subsystem 1600 may use fusion analyzer & FI filter generator 1635. Such FI-type fusion filtering may include at least one of a non-separable, separable, or hybrid wiener filter, the like, and/or combinations thereof. The deblock and dither filtering may include deblock filtering on 4 pixels. The quality restoration filtering may include applying a non-symmetric, point symmetric, or hybrid wiener filter, where the wiener filter may include a 9×9 square or a shape including a subset of 9×9 or 11×9 coefficients. The adaptive precision filtering may include applying a wiener filter with explicit filters for each of 16¼ pixel locations. The fusion improvement filtering may include applying a non-symmetric, point symmetric, or hybrid wiener filter, where the wiener filter may include a 9×9 square or a shape including a subset of 9×9 or 11×9 coefficients.

While a detailed discussion of each of these specific filters is outside the scope of this disclosure, general information is presented to distinguish them from generic forms of these filters.

As used herein the term "DD" and/or "DD Filter" may refer to a deblocking filter that operates on 4 pixels at a time to remove blockiness from encoded video that may use a variety of block sizes for motion compensation and transform coding. In addition it also uses a dithering operation that further reduces the appearance of blockiness without reducing statistical (PSNR) metrics.

As used herein the term "QR" and/or "QR Filter" may refer to a type of wiener filter that is nonsymmetric, point symmetric or hybrid (party symmetric partly nonsymmetric) of 9×9 square or shapes that are subset of 9×9 or 11×9 coefficients. For efficient filtering overhead is minimized by use of a codebook search, so either the computed coefficients (after prediction) are encoded and sent to the decoder or an index to a history filter or codebook filter is sent to the decoder. Also, filter coefficients from codebook can be corrected by sending a correction term, and the codebook is updated while encoding progresses. Both luma and chroma signals are filtered and may use different shapes and filter sizes.

As used herein the term "AP" and/or "AP Filter" may refer to a type of wiener filter such that uses explicitly computed filters for each of 16, ¼ pel location.

Filtering combinations may be generated using a series of available filters in the codebook by using a mix and match approach. Use of a codebook allows for different types of content, such as slow motion to high motion (blurry content) with corresponding filters. Since mix and match of specific ¼ pel locations from multiple filters can be used to create new filter combinations, it can provide a very effective solution.

As used herein the term "FI" and/or "FI Filter" may refer to a type of wiener filter that is nonsymmetric, point symmetric or hybrid (party symmetric partly nonsymmetric) of 9×9 square or shapes that are subset of 9×9 or 11×9 coefficients. For efficient filtering overhead is minimized by use of a codebook search, so either the computed coefficients (after prediction) are encoded and sent to the decoder or an index to a history filter or codebook filter is sent to the decoder. Also, filter coefficients from codebook can be corrected by sending a correction term, and the codebook is updated while encoding progresses. Both luma and chroma signals are filtered and may use different shapes and filter sizes.

In the illustrated implementation, recon blockiness analyzer & DD filter generator 1617 may be capable of analysis of blocking produced during coding, determining ddi parameters to control how deblocking may be applied. Recon blockiness analyzer & DD filter generator 1617 may operate on 4 pixels at a time to remove blockiness from encoded video that may use a variety of block sizes for motion compensation and transform coding. Recon blockiness analyzer & DD filter generator 1617 may also use a dithering operation that may further reduces the appearance of blockiness without reducing statistical (PSNR) metrics.

In the illustrated implementation, recon quality analyzer & QR filter generator 1618 may be capable of performing quality restoration filtering, outputting qri parameters that may be sent to the decoder via the bitstream. Recon quality analyzer & QR filter generator 1618 may use a Wiener filter that may be nonsymmetric, point symmetric or hybrid (party symmetric partly nonsymmetric) of 9×9 square or shapes that are a subset of 9×9 or 11×9 coefficients. Recon quality analyzer & QR filter generator 1618 may minimize filtering overhead by use of a codebook search, so either the computed coefficients (after prediction) may be encoded and sent to the decoder or an index to a history filter or codebook filter may be sent to the decoder. Recon quality analyzer & QR filter generator 1618 may correct filter coefficients from a codebook by sending a correction term, and the codebook may be updated while encoding progresses. Both luma and chroma signals may be filtered and may use different shapes and filter sizes.

In the illustrated implementation, motion estimator, motion compensation analyzer & characteristics & motion compensated AP filter predictor & morphed/synthesized ref picture stores 1623 may be capable of performing adaptive precision filtering and outputting api parameters that may be sent to the decoder via the bitstream. Motion estimator, motion compensation analyzer & characteristics & motion compensated AP filter predictor & morphed/synthesized ref picture stores 1623 may use a Wiener filter that may use explicitly computed filters for each of 16, ¼ pel location. Motion estimator, motion compensation analyzer & characteristics & motion compensated AP filter predictor & morphed/synthesized ref picture stores 1623 may generate filtering combinations using a series of available filters in the codebook by using a mix and match approach, allowing for different types of content, such as slow motion to high motion (blurry content) with corresponding filters. Motion estimator, motion compensation analyzer & characteristics & motion compensated AP filter predictor & morphed/synthesized ref picture stores 1623 may create new filter combinations from mixing and matching specific ¼ pel locations from multiple filters.

In the illustrated implementation, intra predictor 1624 may be capable of performing intra prediction.

In the illustrated implementation, prediction modes analyzer & mode selector 1625 may be capable of may be capable of selecting between various motion prediction modes and intra prediction modes available on a block basis, and selecting prediction references.

In the illustrated implementation, prediction fusion analyzer & FI filter generator 1635 may be capable of receiving output from prediction modes analyzer & mode selector 1625 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fii information. Prediction fusion analyzer & FI filter generator 1635 may use a Wiener filter that may be nonsymmetric, point symmetric or hybrid (party symmetric partly nonsymmetric) of 9×9 square or shapes that are a subset of 9×9 or 11×9 coefficients. Prediction fusion analyzer & FI filter generator 1635 may minimize filtering overhead by use of a codebook search, so either the computed coefficients (after prediction) may be encoded and sent to the decoder or an index to a history filter or codebook filter may be sent to the decoder. Prediction fusion analyzer & FI filter generator 1635 may correct filter coefficients from a codebook by sending a correction term, and the codebook may be updated while encoding progresses. Both luma and chroma signals may be filtered and may use different shapes and filter sizes.

Figure 17:
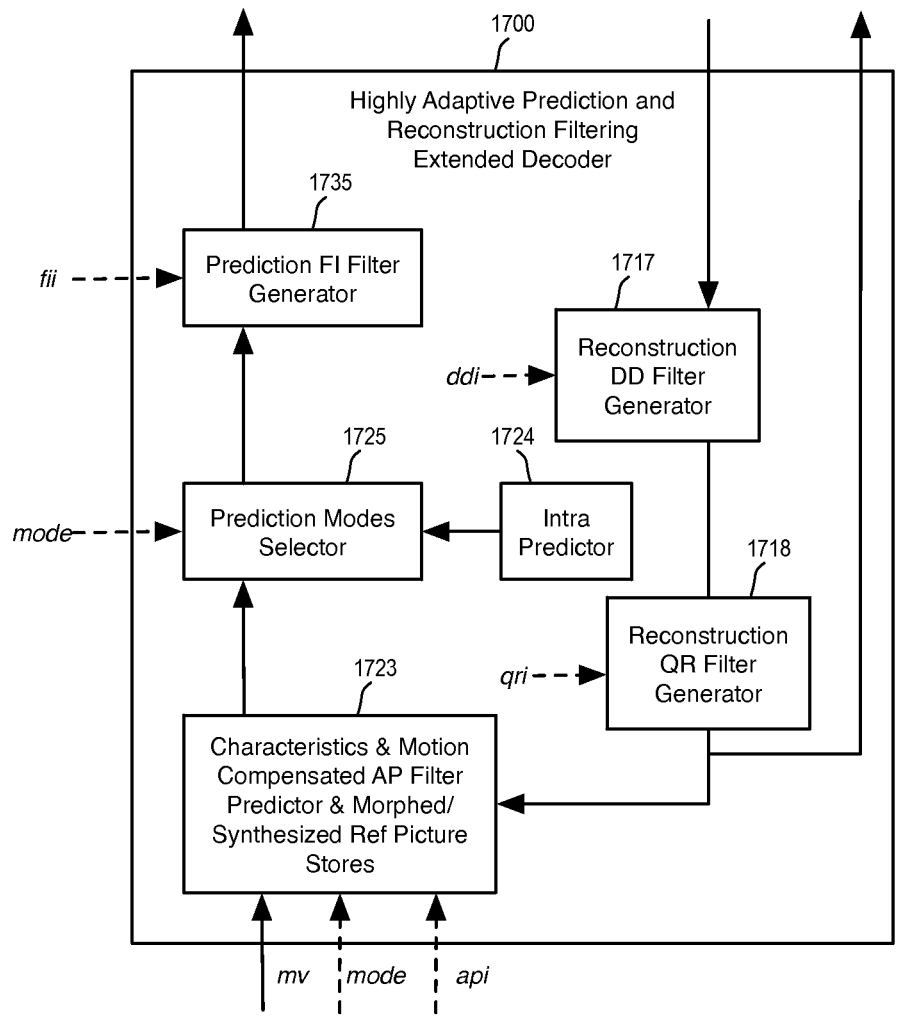
FIG. 17 is an illustrative diagram of an example decoder filter subsystem.

FIG. 17 is an illustrative diagram of an example decoder subsystem 1700, arranged in accordance with at least some implementations of the present disclosure. As shown, decoder subsystem 1700 may include reconstruction DD filter generator 1717, reconstruction QR filter generator 1718, characteristics & motion compensated AP filter predictor & morphed/synthesized ref picture stores 1723, intra predictor 1724, prediction modes selector 1725, and/or prediction FI filter generator 1735.

In operation, decoder subsystem 1700 may use specific versions of generic filtering and correspond to the filters discussed at the encoder, ie, DD (Deblock and Dither) filtering, QR (Quality Restoration) filtering, AP (Adaptive Precision) filtering, and FI (Fusion Improvement) filtering. The corresponding parameters ddi parameters, qri parameters, api parameters, and fii parameters are sent by the encoder via bistream and are decoded and used by this subsystem for NGV decoding.

In the illustrated implementation, reconstruction DD filter generator 1717 may be capable of deblocking and de-dithering the reconstructed signal, guided by the ddi parameters that are decoded at the decoder from the bitstream.

In the illustrated implementation, reconstruction QR filter generator 1718 may be capable of performing QR filtering, guided by qri filtering parameters decoded from the bitstream.

In the illustrated implementation, characteristics & motion compensated AP filter predictor & morphed/synthesized ref picture stores 1723 may be capable of performing adaptive precision filtering, guided by api filtering parameters decoded from the bitstream.

In the illustrated implementation, intra predictor 1724 may be capable of performing intra prediction.

In the illustrated implementation, prediction modes selector 1725 may be capable of selecting between various motion prediction modes and intra prediction modes available on a block basis, and selecting prediction references.

In the illustrated implementation, prediction FI filter generator 1735 may be capable of performing fusion improvement filtering by receiving output from prediction modes selector 1725 and, under guidance from the fii information, performing actual filtering.

Figure 18:
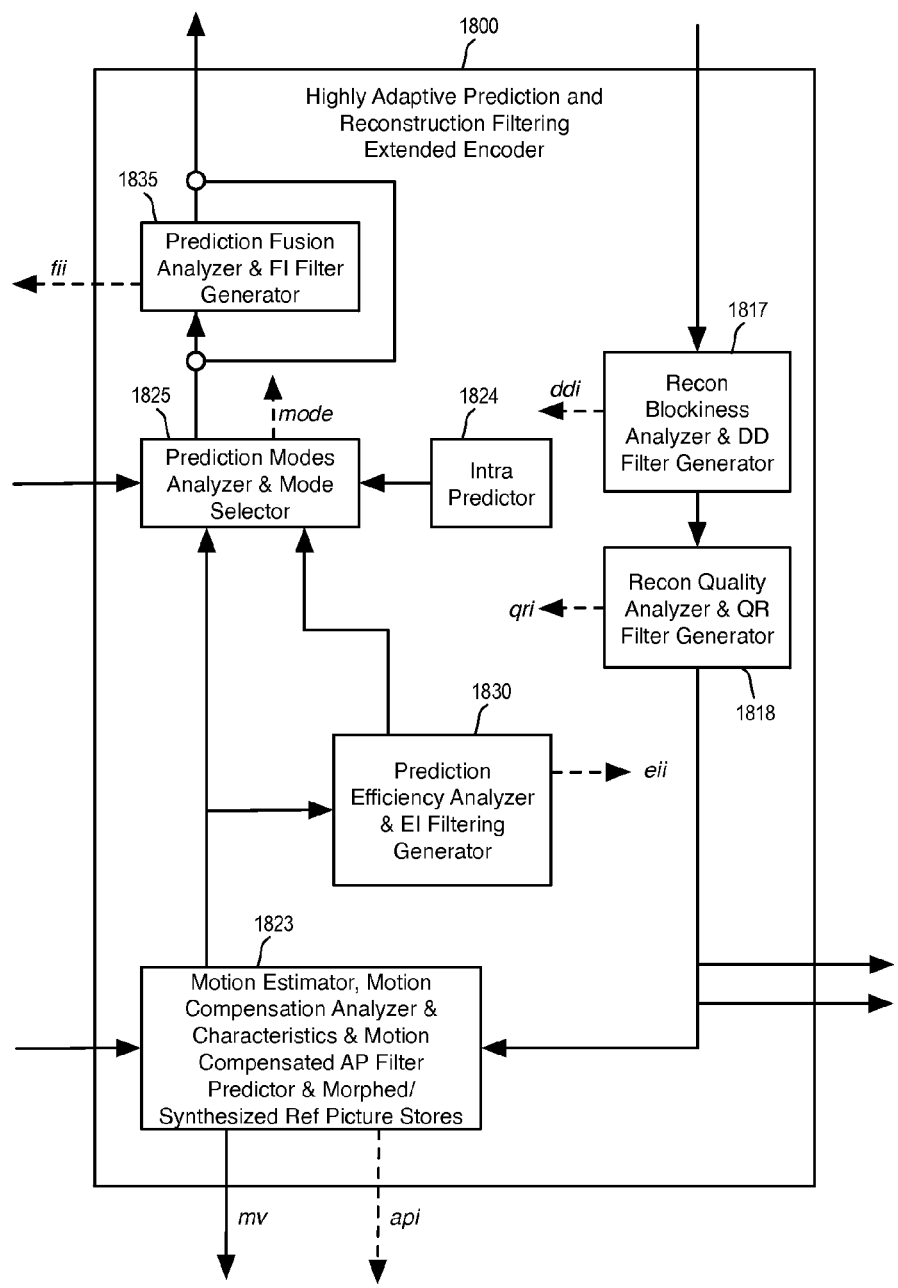
FIG. 18 is an illustrative diagram of an example encoder filter subsystem.

FIG. 18 is an illustrative diagram of an example encoder subsystem 1800, arranged in accordance with at least some implementations of the present disclosure. As shown, encoder subsystem 2300 may include recon blockiness analyzer & DD filter generator 1817, recon quality analyzer & QR filter generator 1818, motion estimator, motion compensation analyzer & characteristics & motion compensated AP filter predictor & morphed/synthesized ref picture stores 18323, intra predictor 1824, prediction modes analyzer & mode selector 1825, prediction efficiency analyzer & EI filtering generator 1830, and/or prediction fusion analyzer & FI filter generator 1835.

In operation, encoder subsystem 1800 may adds Pred EI Filt. Such a Pred EI filter may be a specific form of the generic Pred EP filter. Pred Efficiency Analyzer and EI Filter Generator outputs filtered prediction signal, and eii filter parameters that are sent to the decoder via bitstream. encoder subsystem 1800 subsystem allows for use of either Pred EI filter or Pred FI filter or both Pred Ei and FI Filter. This is controlled by a pair of switches, one before and one after the FI filter. For instance by appropriately placing this pair of switches in open position it is entirely possible to bypass Prediction Fusion Analyzer and FI Filter Generator, allowing only EI filter to be enabled. Further, it is also possible to have these pair of switches in the closed position allowing FI filtering to be active regardless of whether EI filtering is active. Since EP filtering when enabled is block adaptive, this info is sent to the decoder via the bitstream and allows selective use of EP filter on certain blocks where it is activated.

In the illustrated implementation, recon blockiness analyzer & DD filter generator 1817 may be capable of analysis of blocking produced during coding, determining ddi parameters to control how deblocking may be applied. Recon blockiness analyzer & DD filter generator 1617 may operate on 4 pixels at a time to remove blockiness from encoded video that may use a variety of block sizes for motion compensation and transform coding. Recon blockiness analyzer & DD filter generator 1817 may also use a dithering operation that may further reduces the appearance of blockiness without reducing statistical (PSNR) metrics.

In the illustrated implementation, recon quality analyzer & QR filter generator 1818 may be capable of performing quality restoration filtering, outputting qri parameters that may be sent to the decoder via the bitstream. Recon quality analyzer & QR filter generator 1818 may use a Wiener filter that may be nonsymmetric, point symmetric or hybrid (party symmetric partly nonsymmetric) of 9×9 square or shapes that are a subset of 9×9 or 11×9 coefficients. Recon quality analyzer & QR filter generator 1818 may minimize filtering overhead by use of a codebook search, so either the computed coefficients (after prediction) may be encoded and sent to the decoder or an index to a history filter or codebook filter may be sent to the decoder. Recon quality analyzer & QR filter generator 1818 may correct filter coefficients from a codebook by sending a correction term, and the codebook may be updated while encoding progresses. Both luma and chroma signals may be filtered and may use different shapes and filter sizes.

In the illustrated implementation, motion estimator, motion compensation analyzer & characteristics & motion compensated AP filter predictor & morphed/synthesized ref picture stores 1823 may be capable of performing adaptive precision filtering and outputting api parameters that may be sent to the decoder via the bitstream. Motion estimator, motion compensation analyzer & characteristics & motion compensated AP filter predictor & morphed/synthesized ref picture stores 1823 may use a Wiener filter that may use explicitly computed filters for each of 16, ¼ pel location. Motion estimator, motion compensation analyzer & characteristics & motion compensated AP filter predictor & morphed/synthesized ref picture stores 1823 may generate filtering combinations using a series of available filters in the codebook by using a mix and match approach, allowing for different types of content, such as slow motion to high motion (blurry content) with corresponding filters. Motion estimator, motion compensation analyzer & characteristics & motion compensated AP filter predictor & morphed/synthesized ref picture stores 1823 may create new filter combinations from mixing and matching specific ¼ pel locations from multiple filters.

In the illustrated implementation, intra predictor 1824 may be capable of performing intra prediction.

In the illustrated implementation, prediction modes analyzer & mode selector 1825 may be capable of may be capable of selecting between various motion prediction modes and intra prediction modes available on a block basis, and selecting prediction references.

In the illustrated implementation, prediction efficiency analyzer & EP filtering generator 1830 may be capable of outputting filtered prediction signals and eii filter parameters that may be sent to the decoder via bitstream.

In the illustrated implementation, prediction fusion analyzer & FI filter generator 1835 may be capable of receiving output from prediction modes analyzer & mode selector 1825 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fii information. Prediction fusion analyzer & FI filter generator 1835 may use a Wiener filter that may be nonsymmetric, point symmetric or hybrid (party symmetric partly nonsymmetric) of 9×9 square or shapes that are a subset of 9×9 or 11×9 coefficients. Prediction fusion analyzer & FI filter generator 1835 may minimize filtering overhead by use of a codebook search, so either the computed coefficients (after prediction) may be encoded and sent to the decoder or an index to a history filter or codebook filter may be sent to the decoder. Prediction fusion analyzer & FI filter generator 1835 may correct filter coefficients from a codebook by sending a correction term, and the codebook may be updated while encoding progresses. Both luma and chroma signals may be filtered and may use different shapes and filter sizes.

Figure 19:
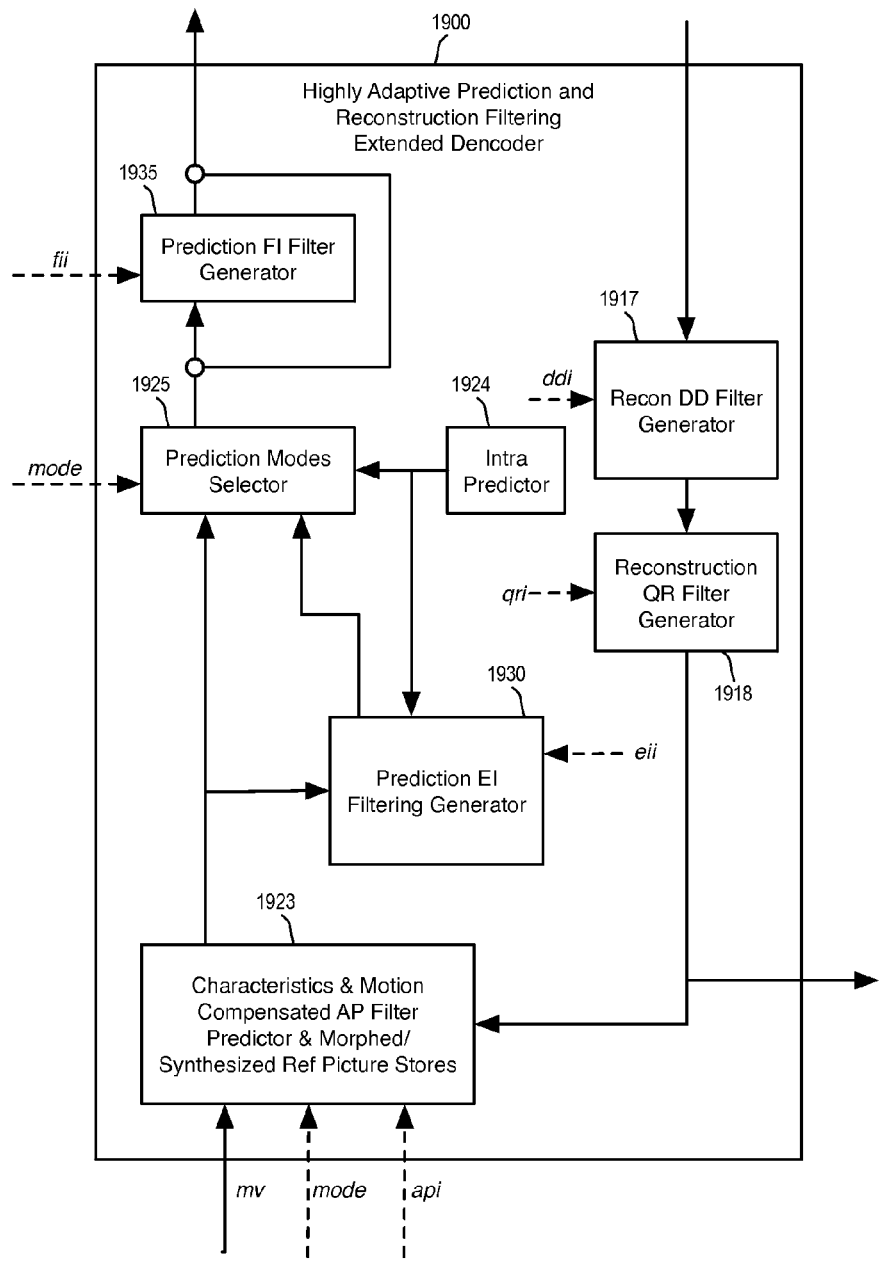
FIG. 19 is an illustrative diagram of an example decoder filter subsystem.

FIG. 19 is an illustrative diagram of an example decoder subsystem 1900, arranged in accordance with at least some implementations of the present disclosure. As shown, decoder subsystem 1900 may include reconstruction DD filter generator 1917, reconstruction QR filter generator 1918, characteristics & motion compensated AP filter predictor & morphed/synthesized ref picture stores 1923, intra predictor 1924, prediction modes selector 1925, prediction EP filtering generator 1930, and/or prediction FI filter generator 1935.

In the illustrated implementation, reconstruction DD filter generator 1917 may be capable of deblocking and de-dithering the reconstructed signal, guided by the ddi parameters that are decoded at the decoder from the bitstream.

In the illustrated implementation, reconstruction QR filter generator 1918 may be capable of performing QR filtering, guided by qri filtering parameters decoded from the bitstream.

In the illustrated implementation, characteristics & motion compensated AP filter predictor & morphed/synthesized ref picture stores 1923 may be capable of performing adaptive precision filtering, guided by api filtering parameters decoded from the bitstream.

In the illustrated implementation, intra predictor 1924 may be capable of performing intra prediction.

In the illustrated implementation, prediction modes selector 1925 may be capable of selecting between various motion prediction modes and intra prediction modes available on a block basis, and selecting prediction references.

In the illustrated implementation, prediction EP filtering generator 1930 may be capable of generating filtered prediction for selection by prediction modes analyzer & mode selector 1925 based on the prediction mode information sent in the bitstream by the encoder. Prediction efficiency analyzer & EP filtering generator 1930 may perform filtering which may be locally block adaptive and responsive to the mode information carried via the bitstream to the decoder.

In the illustrated implementation, prediction FI filter generator 1935 may be capable of performing fusion improvement filtering by receiving output from prediction modes selector 1925 and, under guidance from the fii information, performing actual filtering.

Figure 20:
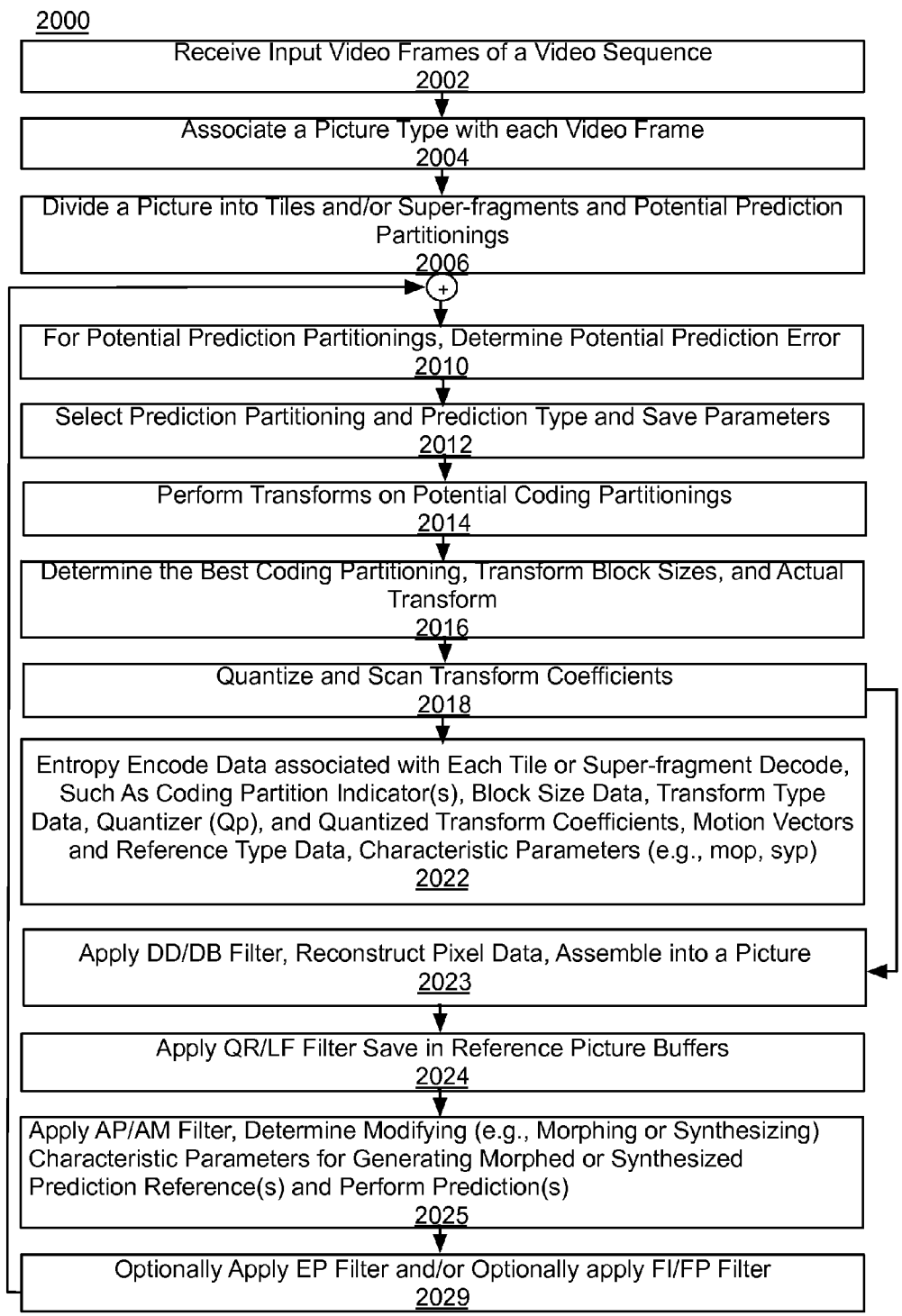
FIG. 20 is a flow diagram illustrating an example encoding process.

FIG. 20 is a flow diagram illustrating an example process 2000, arranged in accordance with at least some implementations of the present disclosure. Process 2000 may include one or more operations, functions or actions as illustrated by one or more operations. Process 2000 may form at least part of a next generation video coding process. By way of non-limiting example, process 2000 may form at least part of a next generation video encoding process as undertaken by encoder system 100 of FIG. 1 and/or any other encoder system or subsystems described herein.

Process 2000 may begin at operation 2002, "Receive Input Video Frames of a Video Sequence", where input video frames of a video sequence may be received via encoder 100 for example.

Process 2000 may continue at operation 2004, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 2003 through 2011) may be performed on a frame or picture of a group of pictures and the processing may be repeated for all frames or pictures of a group and then repeated for all groups of pictures in a video sequence.

Process 2000 may continue at operation 2006, "Divide a Picture into Tiles and/or Super-fragments and Potential Prediction Partitionings", where a picture may be divided into tiles or super-fragments and potential prediction partitions via prediction partitions generator 105 for example.

Process 2000 may continue at operation 2010, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2000 may continue at operation 2012, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2000 may continue at operation 2014, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2000 may continue at operation 2016, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2000 may continue at operation 2018, "Quantize and Scan Transform Coefficients", where transform coefficients associated with coding partitions (and/or transform blocks) may be quantized and scanned in preparation for entropy coding.

Process 2000 may continue at operation 2022, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2000 may continue at operation 2023 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 2000 may continue at operation 2024 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2000 may continue at operation 2025, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for FB-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2012) may include a frame reference, morphing parameters, or synthesizing parameters associated with the prediction partition.

Process 2000 may continue at operation 2029 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 2002 through 2029 may provide for video encoding and bitstream transmission techniques, which may be employed by an encoder system as discussed herein.

Figures 21, 22:
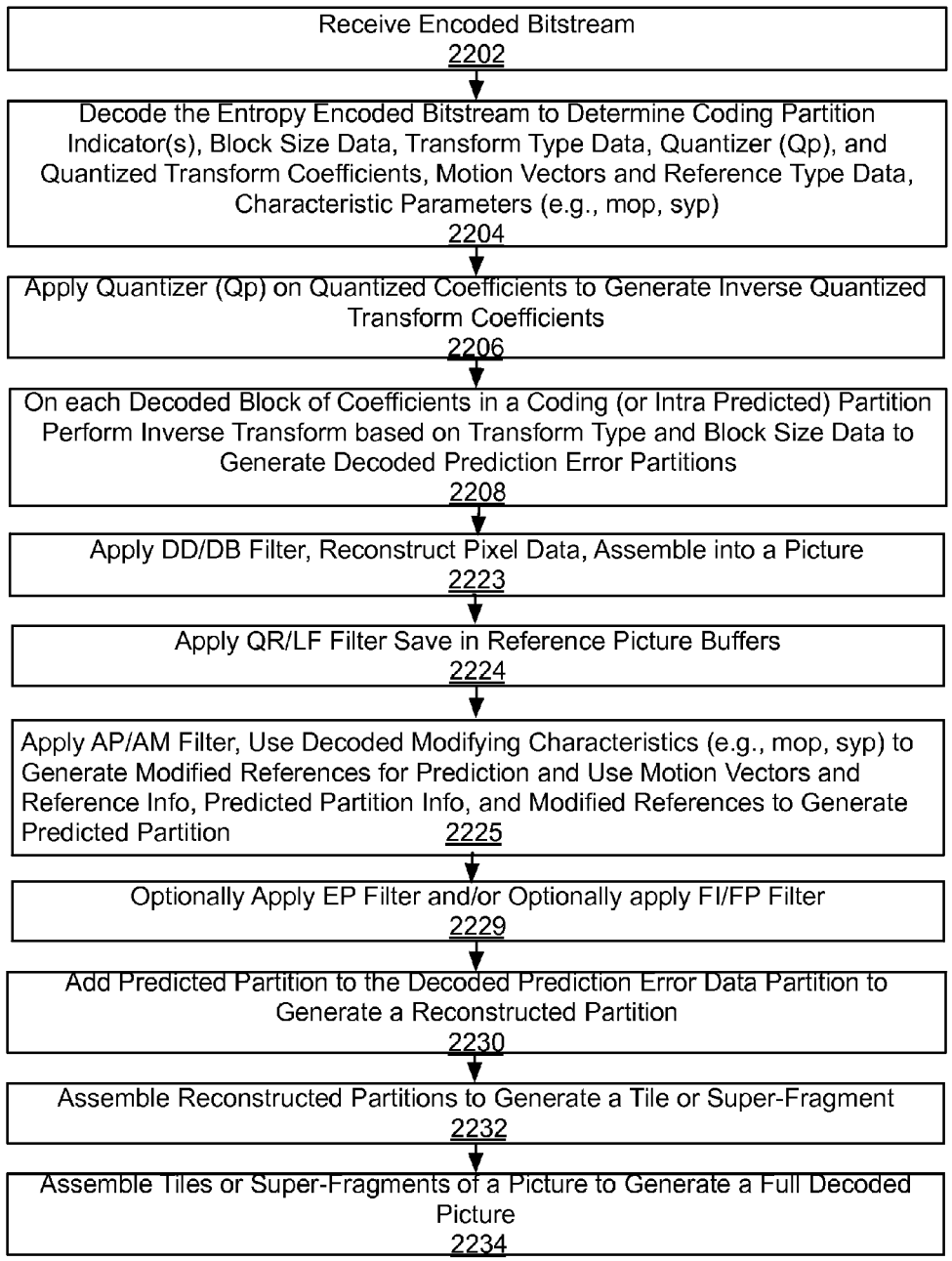
FIG. 21 illustrates an example bitstream.
FIG. 22 is a flow diagram illustrating an example decoding process.

FIG. 21 illustrates an example bitstream 2100, arranged in accordance with at least some implementations of the present disclosure. In some examples, bitstream 2100 may correspond to output bitstream 111 as shown in FIG. 1 and/or input bitstream 201 as shown in FIG. 2. Although not shown in FIG. 21 for the sake of clarity of presentation, in some examples bitstream 2100 may include a header portion and a data portion. In various examples, bitstream 2100 may include data, indicators, index values, mode selection data, or the like associated with encoding a video frame as discussed herein.

As discussed, bitstream 2100 may be generated by an encoder such as, for example, encoder 100 and/or received by a decoder 200 for decoding such that decoded video frames may be presented via a display device.

FIG. 22 is a flow diagram illustrating an example process 2200, arranged in accordance with at least some implementations of the present disclosure. Process 2200 may include one or more operations, functions or actions as illustrated by one or more operations. Process 2200 may form at least part of a next generation video coding process. By way of non-limiting example, process 2200 may form at least part of a next generation video decoding process as undertaken by decoder system 200 and/or any other decoder system or subsystems described herein.

Process 2200 may begin at operation 2202, "Receive Encoded Bitstream", where a bitstream may be received. For example, a bitstream encoded as discussed herein may be received at a video decoder. In some examples, bitstream 2200 may be received via decoder 200.

Process 1100 may continue at operation 1104, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2200 may continue at operation 2206, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 2206 may be applied via adaptive inverse quantize module 203.

Process 2200 may continue at operation 2208, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 2200 may continue at operation 2223 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 2200 may continue at operation 2224 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2200 may continue at operation 2225, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 2200 may continue at operation 2229 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 2200 may continue at operation 2230, "Add Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 2200 may continue at operation 2232, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 2200 may continue at operation 2234, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Some additional and/or alternative details related to process 2000, 2200 and other processes discussed herein may be illustrated in one or more examples of implementations discussed herein and, in particular, with respect to FIG. 23 below.

Figure 23A:
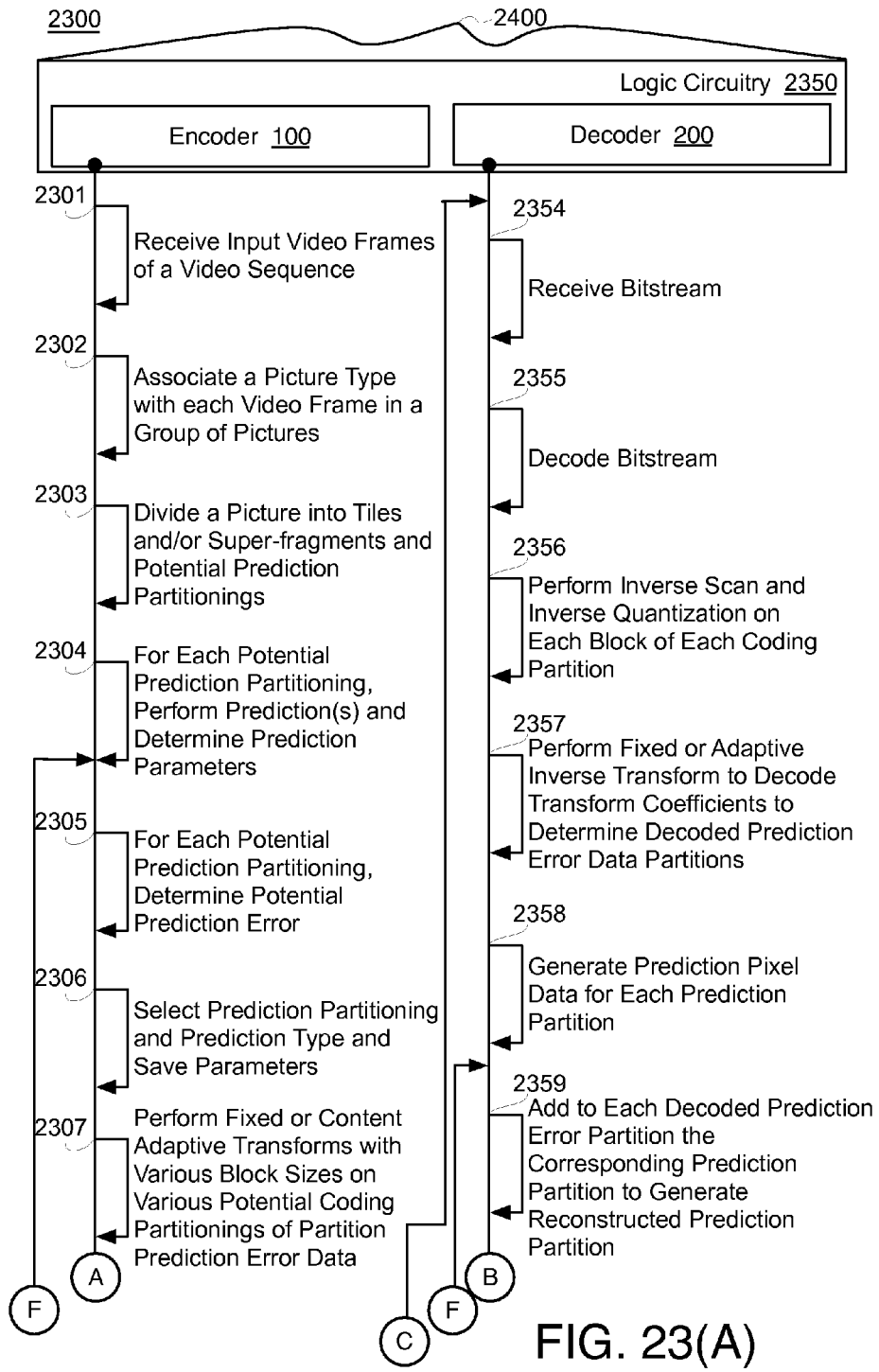
FIGS. 23(A), 23(B), and 23(C) provide an illustrative diagram of an example video coding system and video coding process in operation.
Figure 23B:
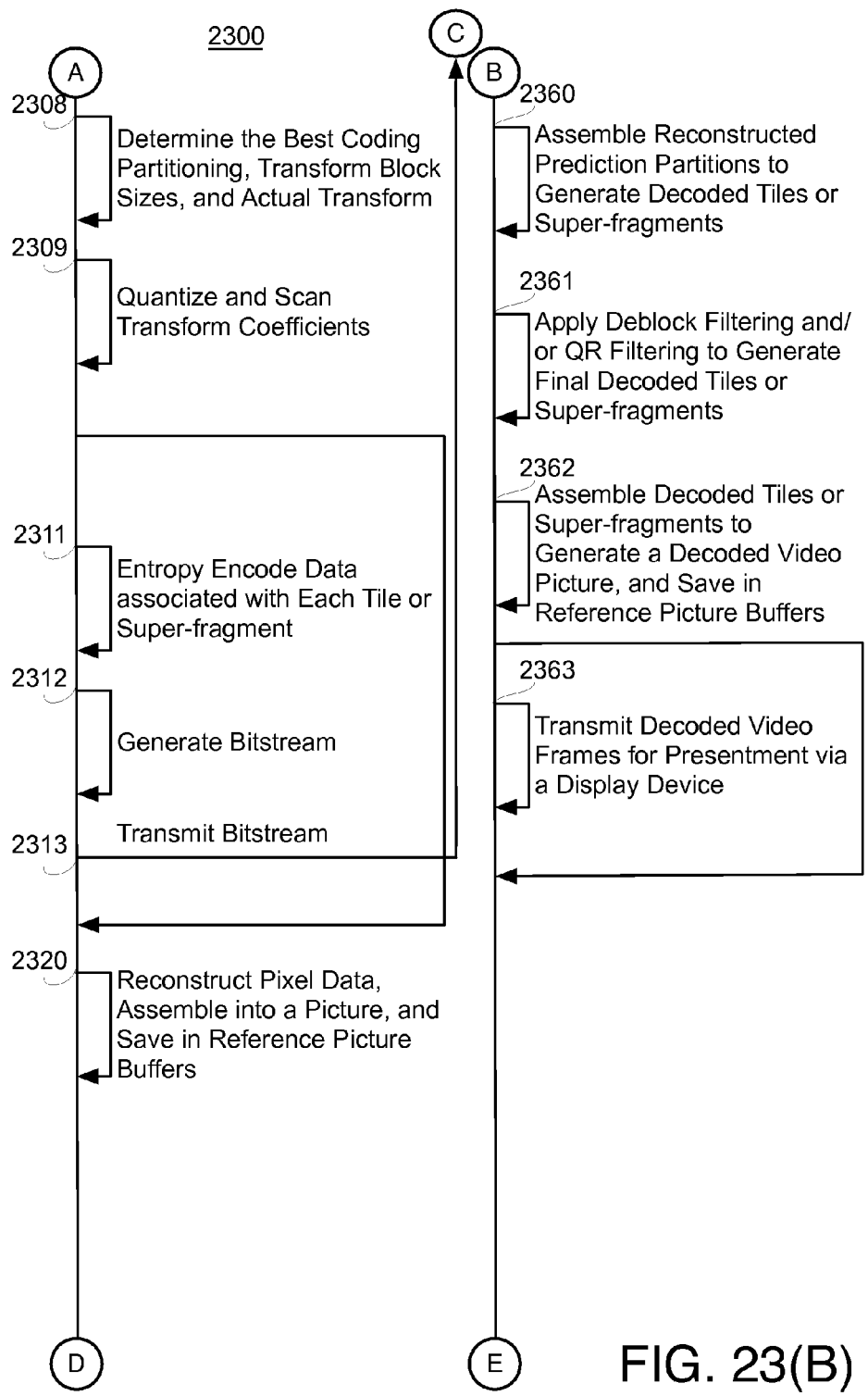
Figure 23C:
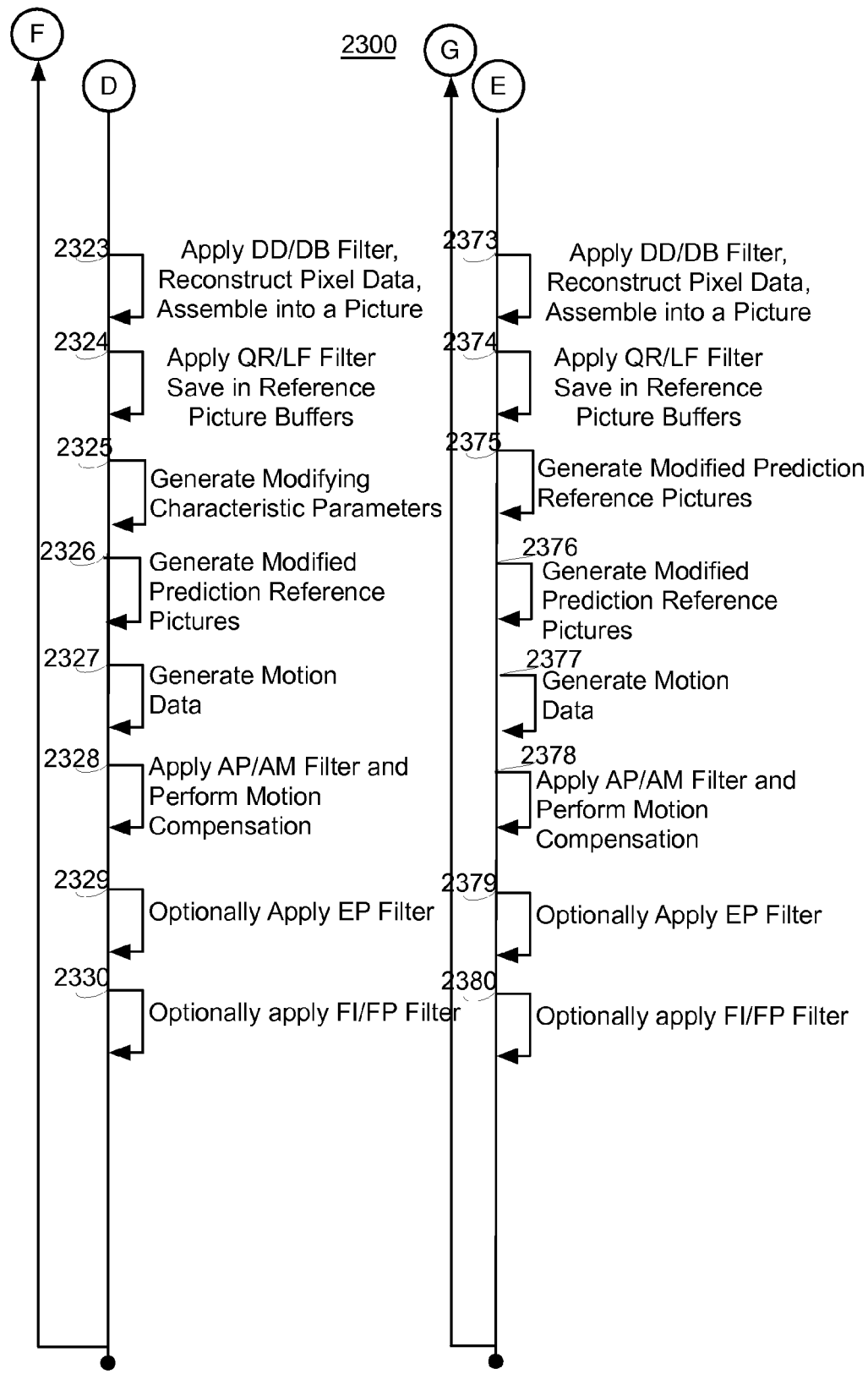

FIGS. 23(A), 23(B), and 23(C) provide an illustrative diagram of an example video coding system 2400 and video coding process 2300 in operation, arranged in accordance with at least some implementations of the present disclosure. In the illustrated implementation, process 2300 may include one or more operations, functions or actions as illustrated by one or more of actions 2301 through 2380. By way of non-limiting example, process 2300 will be described herein with reference to example video coding system 2400 including encoder 100 of FIG. 1 and decoder 200 of FIG. 2, as is discussed further herein below with respect to FIG. 24. In various examples, process 2300 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 2400 may include logic circuitry 2350, the like, and/or combinations thereof. For example, logic circuitry 2350 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 2400, as shown in FIGS. 23(A)-(C) may include one particular set of blocks or actions associated with particular modules, these blocks or actions may be associated with different modules than the particular modules illustrated here. Although process 2300, as illustrated, is directed to encoding and decoding, the concepts and/or operations described may be applied to encoding and/or decoding separately, and, more generally, to video coding.

Process 2300 may begin at operation 2301, "Receive Input Video Frames of a Video Sequence", where input video frames of a video sequence may be received via encoder 100 for example.

Process 2300 may continue at operation 2302, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 2303 through 2311) may be performed on a frame or picture of a group of pictures and the processing may be repeated for all frames or pictures of a group and then repeated for all groups of pictures in a video sequence.

Process 2300 may continue at operation 2303, "Divide a Picture into Tiles and/or Super-fragments and Potential Prediction Partitionings", where a picture may be divided into tiles or super-fragments and potential prediction partitions via prediction partitions generator 105 for example.

Process 2300 may continue at operation 2304, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for FB-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2312) may include a frame reference, morphing parameters, or synthesizing parameters associated with the prediction partition.

Process 2300 may continue at operation 2305, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2300 may continue at operation 2306, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2300 may continue at operation 2307, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2300 may continue at operation 2308, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2300 may continue at operation 2309, "Quantize and Scan Transform Coefficients", where transform coefficients associated with coding partitions (and/or transform blocks) may be quantized and scanned in preparation for entropy coding.

Process 2300 may continue at operation 2311, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 2300 may continue at operation 2312, "Generate Bitstream" where a bitstream may be generated based on the entropy encoded data. As discussed, in some examples, the bitstream may include a frame or picture reference, morphing parameters, or synthesizing parameters associated with a prediction partition.

Process 2300 may continue at operation 2313, "Transmit Bitstream", where the bitstream may be transmitted. For example, video coding system 2400 may transmit output bitstream 111, bitstream 2100, or the like via an antenna 2402 (please refer to FIG. 24).

Process 2300 may continue at operation 2320, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 2300 may continue at operation 2323 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 2300 may continue at operation 2324 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2300 may continue at operation 2325, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 2300 may continue at operation 2326, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 2300 may continue at operation 2327, "Generate Motion Data", where, motion estimation data may be generated. For example, motion data associated with a prediction partition of a current picture may be generated based at least in part on one of the first modified prediction reference picture or the second modified prediction reference picture.

Process 2300 may continue at operation 2328, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 2300 may feed this information back to operation 2304 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 2300 may continue at operation 2329 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 2300 may continue at operation 2330 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 2301 through 2340 may provide for video encoding and bitstream transmission techniques, which may be employed by an encoder system as discussed herein. The following operations, operations 2354 through 2368 may provide for video decoding and video display techniques, which may be employed by a decoder system as discussed herein.

Process 2300 may continue at operation 2354, "Receive Bitstream", where the bitstream may be received. For example, input bitstream 201, bitstream 2100, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 2300 may continue at operation 2355, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 2300 may continue at operation 2356, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 2300 may continue at operation 2357, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 2300 may continue at operation 2358, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 2300 may continue at operation 2359, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 2300 may continue at operation 2360, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 2300 may continue at operation 2361, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 2300 may continue at operation 2362, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Figure 24:
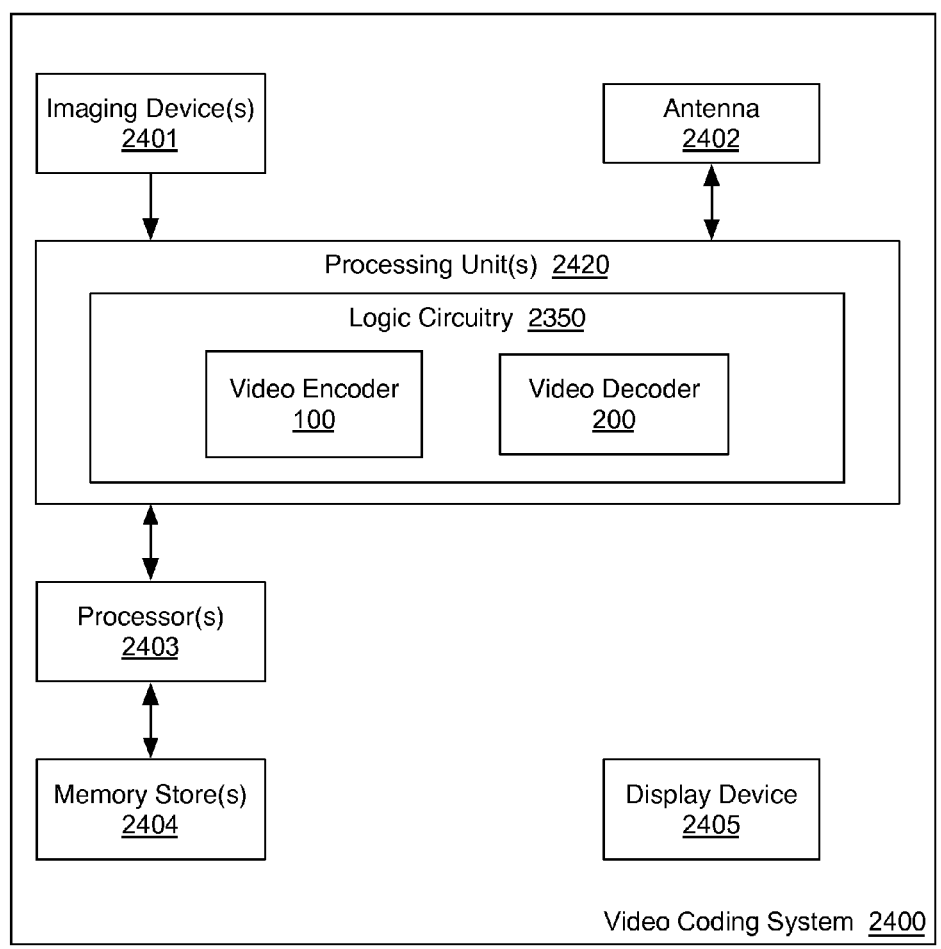
FIG. 24 is an illustrative diagram of an example video coding system.

Process 2300 may continue at operation 2363, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2405 (as shown in FIG. 24) for presentment.

Process 2200 may continue at operation 2273 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 2200 may continue at operation 2274 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 2300 may continue at operation 2376, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 2300 may continue at operation 2377, "Generate Motion Data", where, motion estimation data may be generated. For example, motion data associated with a prediction partition of a current picture may be generated based at least in part on one of the third modified prediction reference picture or the third modified prediction reference picture.

Process 2300 may continue at operation 2378, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition.

Process 1300 may feed this information back to operation 1359 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 2200 may continue at operation 2279 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 2200 may continue at operation 2280 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 2300 may be implemented via any of the coder systems as discussed herein. Further, process 1300 may be repeated either in serial or in parallel on any number of instantiations of video data such as prediction error data partitions, original data partitions, or wavelet data or the like.

In one example, a computer-implemented method for video coding may include generating a predicted partition associated with a prediction partition. An enhanced predicted partition and enhanced prediction parameters associated with the enhanced predicted partition may be generated, where the enhanced predicted partition is based at least in part on the predicted partition. A determination may be made as to whether to use the enhanced predicted partition or the predicted partition as a selected predicted partition for the prediction partition. The selected predicted partition may include the enhanced predicted partition coding the enhanced prediction parameters into a bitstream.

In some implementations, video coding may include generating a first reconstructed tile or super-fragment. Deblock filtering or deblock and dither filtering and in-loop or quality restoration filtering may be applied to the reconstructed tile or super-fragment to generate a first final reconstructed tile or super-fragment. Deblock filtering or deblock and dither filtering parameters associated with the deblock filtering or the deblock and dither filtering may be generated. In-loop filtering or quality restoration filtering parameters associated with the in-loop filtering or the quality restoration filtering may be generated. The first final reconstructed tile or super-fragment and a second final reconstructed tile or super-fragment may be assembled to generate a reconstructed video frame. The reconstructed video frame in a picture buffer may be stored, where the predicted partition is based at least in part on the reconstructed video frame, and where generating the predicted partition may include motion compensation including an adaptive motion or an adaptive precision filtering. Adaptive motion filtering parameters or adaptive precision filtering parameters associated with the adaptive motion filtering or adaptive precision filtering may be generated. The deblock filtering parameters or deblock and dither filtering parameters, the in-loop filtering parameters or quality restoration filtering parameters, and the adaptive motion filtering parameters or adaptive precision filtering parameters may be coded into the bitstream. A determination may be made as to whether to apply fusion filtering or fusion improvement filtering to the selected predicted partition. When fusion filtering or fusion improvement filtering is to be applied to the selected predicted partition the process may include: assembling the selected predicted partition and a second selected predicted partition may be to generate at least a portion of an assembled picture; fusion filtering or fusion improvement filtering the portion of the assembled picture; generating fusion filtering parameters or fusion improvement filtering parameters associated with the fusion filtering or the fusion improvement filtering; and coding the fusion filtering parameters or the fusion improvement filtering parameters into the bitstream. An indicator may be generated indicating whether to use the enhanced predicted partition or the predicted partition data as the selected predicted partition for the prediction partition. The indicator into the bitstream may be encoded. The selected predicted partition may be differenced with original pixel data associated with the prediction partition to generate a prediction error data partition. The prediction error data partition may be partitioned to generate a plurality of coding partitions. A forward transform on the plurality of coding partitions may be performed to generate transform coefficients associated with the plurality of coding partitions. The transform coefficients may be quantized to generate quantized transform coefficients. The quantized transform coefficients and the indicator may be encoded into the bitstream and transmitted.

In some implementations, video coding may include receiving the bitstream and decoding the bitstream to determine the enhanced prediction parameters, the deblock filtering parameters or deblock and dither filtering parameters, the in-loop filtering parameters or quality restoration filtering parameters, the adaptive motion filtering parameters or adaptive precision filtering parameters, the fusion filtering or fusion improvement filtering parameters, the indicator, and the quantized transform coefficients. An inverse quantization may be performed based at least in part on the quantized transform coefficients to generate decoded transform coefficients. An inverse transform may be performed based at least in part on the decoded transform coefficients to generate a plurality of decoded coding partitions. The plurality of decoded coding partitions may be assembled to generate a decoded prediction error data partition. At least one of a first decoded tile or a first decoded super-fragment may be generated. Decoder deblock filtering or decoder deblock and dither filtering and decoder in-loop or decoder quality restoration filtering may be applied to the first decoded tile or super-fragment based at least in part on the deblock filtering parameters or deblock and dither filtering parameters and the in-loop filtering parameters or quality restoration filtering parameters to generate a first final decoded reconstructed tile or super-fragment. The first final decoded reconstructed tile or super-fragment and a second final decoded reconstructed tile or super-fragment may be assembled to generate a decoded reconstructed video frame. The decoded reconstructed video frame may be stored in a decoder picture buffer. Decoder motion compensation may be performed to generate a decoded predicted partition, where the decoder motion compensation may include a decoder adaptive motion filtering or a decoder adaptive precision filtering based at least in part on the adaptive motion filtering parameters or adaptive precision filtering parameters. An enhanced decoded predicted partition may be generated based at least in part on the enhanced prediction parameters and the decoded predicted partition. A determination may be made as to whether to use the decoded enhanced predicted partition or the decoded predicted partition as a selected decoded predicted partition. A determination may be made as to whether to apply decoder fusion filtering or decoder fusion improvement filtering to the selected decoded predicted partition. When decoder fusion filtering or decoder fusion improvement filtering is to be applied to the selected decoded predicted partition may: assemble the selected decoded predicted partition and a second selected decoded predicted partition to generate at least a portion of a decoded assembled picture; and decoder fusion filter or decoder fusion improvement filter the portion of the decoded assembled picture based at least in part on the fusion filtering parameters or the fusion improvement filtering parameters. The selected decoded predicted partition may be added to the decoded prediction error data partition to generate a first decoded reconstructed partition; combine the first decoded reconstructed partition and a second decoded reconstructed partition to generate a third final decoded reconstructed tile or super-fragment. The third final decoded reconstructed tile or super-fragment and a fourth final decoded reconstructed tile or super-fragment may be assembled to generate a second decoded reconstructed video frame. The second decoded reconstructed video frame may be transmitted for presentment via a display device. The fusion filtering may include at least one of a non-separable, separable, or hybrid wiener filter, the like, and/or combinations thereof. The deblock and dither filtering may include deblock filtering on 4 pixels. The quality restoration filtering may include applying a non-symmetric, point symmetric, or hybrid wiener filter, where the wiener filter may include a 9×9 square or a shape including a subset of 9×9 or 11×9 coefficients. The adaptive precision filtering may include applying a wiener filter with explicit filters for each of 16 ¼ pixel locations. The fusion improvement filtering may include applying a non-symmetric, point symmetric, or hybrid wiener filter, where the wiener filter may include a 9×9 square or a shape including a subset of 9×9 or 11×9 coefficients.

In some implementations, a computer-implemented method for video coding may include partitioning a plurality of tiles or super-fragments of a video frame to generate a plurality of prediction partitions. A plurality of predicted partitions associated with the plurality of prediction partitions may be differenced to generate a corresponding plurality of prediction error data partitions. At least a portion of the prediction error data partitions may be partitioned to generate a plurality of coding partitions. One or more transforms may be performed on the plurality of coding partitions to generate transform coefficients, where the one or more transforms may include at least one content adaptive transform. The transform coefficients may be quantized to generate quantized transform coefficients. An inverse quantization may be performed on the quantized transform coefficients to generate reconstructed transform coefficients. One or more inverse transforms may be performed on the reconstructed transform coefficients to generate a plurality of reconstructed coding partitions. The plurality of reconstructed coding partitions may be assembled to generate a plurality of reconstructed prediction error data partitions.

The plurality of predicted partitions may be added to the plurality of reconstructed prediction error data partitions to generate at least one reconstructed tile or super-fragment. Deblock filtering parameters and a first final reconstructed tile or super-fragment may be generated based at least in part on the at least one reconstructed tile or super-fragment and the deblock filtering parameters. The first final reconstructed tile or super-fragment and a second final reconstructed tile or super-fragment may be assembled to generate a reconstructed picture. Quality restoration in-loop filtering parameters and a reconstructed prediction reference picture may be generated based at least in part on the reconstructed picture and the quality restoration in-loop filtering parameters.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition, where the motion compensation may include generating adaptive precision filtering parameters and performing the motion compensation based at least in part on an adaptive precision filtering using the adaptive precision filtering parameters.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition. Enhanced prediction parameters and an enhanced predicted partition may be generated based at least in part on the enhanced prediction parameters and the predicted partition. A determination may be made as to whether to use the enhanced predicted partition or the second predicted partition as a selected predicted partition for the second prediction partition. The selected predicted partition may include the enhanced predicted partition coding the enhanced prediction parameters into a bitstream.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition. The second predicted partition and a third predicted partition may be assembled to generate at least a portion of an assembled picture. Fusion filtering parameters and a fusion filtered portion of the assembled picture and an enhanced predicted partition may be generated based at least in part on the fusion filtering parameters.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition, where the motion compensation may include generating adaptive precision filtering parameters and performing the motion compensation based at least in part on an adaptive precision filtering using the adaptive precision filtering parameters. Enhanced prediction parameters and an enhanced predicted partition may be generated based at least in part on the enhanced prediction parameters and the second predicted partition, where the enhanced prediction parameters may be generated at least one of before selecting the second predicted partition for coding or after selecting the second predicted partition for coding.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition, where the motion compensation may include generating adaptive precision filtering parameters and performing the motion compensation based at least in part on an adaptive precision filtering using the adaptive precision filtering parameters.

In some implementations, a computer-implemented method for video coding may include generating synthesizing characteristic parameters and a synthesized prediction reference picture based at least in part on the synthesizing characteristic parameters and the reconstructed prediction reference picture. Motion data associated with a second prediction partition may be generated based at least in part on the morphed prediction reference picture. Motion compensation may be performed based on the motion data and the synthesized prediction reference picture to generate a second predicted partition, where the motion compensation may include generating adaptive precision filtering parameters and performing the motion compensation based at least in part on an adaptive precision filtering using the adaptive precision filtering parameters.

In some implementations, a computer-implemented method for video coding may include generating morphing characteristic parameters and a morphed prediction reference picture based at least in part on the morphing characteristic parameters and the reconstructed prediction reference picture. Synthesizing characteristic parameters and a synthesized prediction reference picture may be generated based at least in part on the synthesizing characteristic parameters and the reconstructed prediction reference picture. First motion data associated with a second prediction partition may be generated based at least in part on the morphed prediction reference picture. Second motion data associated with a third prediction partition may be generated based at least in part on the synthesized prediction reference picture. Motion compensation may be performed based on the first motion data and the morphed prediction reference picture to generate a second predicted partition, where the motion compensation may include generating adaptive precision filtering parameters and performing the motion compensation based at least in part on an adaptive precision filtering using the adaptive precision filtering parameters. A second motion compensation may be performed based on the second motion data and the synthesized prediction reference picture to generate a third predicted partition, where the second motion compensation may include generating second adaptive precision filtering parameters and performing the second motion compensation based at least in part on a second adaptive precision filtering using the second adaptive precision filtering parameters.

In some implementations, a computer-implemented method for video coding may include generating morphing characteristic parameters and a morphed prediction reference picture based at least in part on the morphing characteristic parameters and the reconstructed prediction reference picture. Synthesizing characteristic parameters and a synthesized prediction reference picture may be generated based at least in part on the synthesizing characteristic parameters and a second reconstructed prediction reference picture. First motion data associated with a second prediction partition may be generated based at least in part on the morphed prediction reference picture. Second motion data associated with a third prediction partition may be generated based at least in part on the synthesized prediction reference picture. Third motion data associated with a fourth prediction partition may be generated based at least in part on a third reconstructed prediction reference picture. Motion compensation may be performed based on the first motion data and the morphed prediction reference picture to generate a second predicted partition, where the motion compensation may include generating adaptive precision filtering parameters and performing the motion compensation based at least in part on an adaptive precision filtering using the adaptive precision filtering parameters. A second motion compensation may be performed based on the second motion data and the synthesized prediction reference picture to generate a third predicted partition, where the second motion compensation may include generating second adaptive precision filtering parameters and performing the second motion compensation based at least in part on a second adaptive precision filtering using the second adaptive precision filtering parameters. A third motion compensation may be performed based on the third motion data and the third reconstructed prediction reference picture to generate a fourth predicted partition, where the third motion compensation may include generating third adaptive precision filtering parameters and performing the third motion compensation based at least in part on a third adaptive precision filtering using the third adaptive precision filtering parameters.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition. Enhanced prediction parameters and an enhanced predicted partition may be generated based at least in part on the enhanced prediction parameters and the second predicted partition, where the enhanced prediction parameters are generated at least one of before selecting the second predicted partition for coding or after selecting the second predicted partition for coding In some implementations, a computer-implemented method for video coding may include generating synthesizing characteristic parameters and a synthesized prediction reference picture based at least in part on synthesizing morphing characteristic parameters and the reconstructed prediction reference picture. Motion data associated with a second prediction partition may be generated based at least in part on the synthesized prediction reference picture. Motion compensation may be performed based on the motion data and the synthesized prediction reference picture to generate a second predicted partition. Enhanced prediction parameters and an enhanced predicted partition may be generated based at least in part on the enhanced prediction parameters and the second predicted partition, where the enhanced prediction parameters are generated at least one of before selecting the second predicted partition for coding or after selecting the second predicted partition for coding.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition. Synthesizing characteristic parameters and a synthesized prediction reference picture may be generated based at least in part on synthesizing morphing characteristic parameters and a second reconstructed prediction reference picture. Motion data associated with the second prediction partition may be generated based at least in part on the synthesized prediction reference picture. Motion compensation may be performed based on the motion data and the synthesized prediction reference picture to generate a third predicted partition. The second predicted partition and the third predicted partition may be combined to generate a fourth predicted partition, where the combining may include a weighted average. Enhanced prediction parameters and an enhanced predicted partition may be generated based at least in part on the enhanced prediction parameters and the fourth predicted partition, where the enhanced prediction parameters are generated at least one of before selecting the fourth predicted partition for coding or after selecting the fourth predicted partition for coding.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition. Synthesizing characteristic parameters and a synthesized prediction reference picture may be generated based at least in part on synthesizing morphing characteristic parameters and a second reconstructed prediction reference picture. Motion data associated with the second prediction partition may be generated based at least in part on the synthesized prediction reference picture. Motion compensation may be performed based on the motion data and the synthesized prediction reference picture to generate a third predicted partition. Motion data associated with the second prediction partition may be generated based at least in part on a second reconstructed prediction reference picture. Motion compensation may be performed based on the motion data and the morphed prediction reference picture to generate a fourth predicted partition. The second predicted partition and the third predicted partition may be combined to generate a fifth predicted partition, where the combining may include a weighted average. A selection between the fifth predicted partition and the fourth predicted partition to generate a selected prediction partition may be made. Enhanced prediction parameters and an enhanced predicted partition may be generated based at least in part on the enhanced prediction parameters and the selected predicted partition.

In another example, a computer-implemented method for video coding may include partitioning a plurality of tiles or super-fragments of a video frame to generate a plurality of prediction partitions. A plurality of predicted partitions associated with the plurality of prediction partitions may be differenced to generate a corresponding plurality of prediction error data partitions. At least a portion of the prediction error data partitions may be partitioned to generate a plurality of coding partitions. One or more transforms may be performed on the plurality of coding partitions to generate transform coefficients, where the one or more transforms include at least one content adaptive transform. The transform coefficients may be quantized to generate quantized transform coefficients. An inverse quantization may be performed on the quantized transform coefficients to generate reconstructed transform coefficients. One or more inverse transforms may be performed on the reconstructed transform coefficients to generate a plurality of reconstructed coding partitions. The plurality of reconstructed coding partitions may be assembled to generate a plurality of reconstructed prediction error data partitions. The plurality of predicted partitions may be added to the plurality of reconstructed prediction error data partitions to generate at least one reconstructed tile or super-fragment. Deblock filtering parameters and a first final reconstructed tile or super-fragment may be generated based at least in part on the at least one reconstructed tile or super-fragment and the deblock filtering parameters. The first final reconstructed tile or super-fragment and a second final reconstructed tile or super-fragment may be assembled to generate a reconstructed prediction reference picture. Morphing characteristic parameters and a morphed prediction reference picture may be generated based at least in part on the morphing characteristic parameters and the reconstructed prediction reference picture. Synthesizing characteristic parameters and a synthesized prediction reference picture may be generated based at least in part on the synthesizing characteristic parameters and the reconstructed prediction reference picture. Motion data associated with a second prediction partition may be generated based at least in part on one of the morphed prediction reference picture or the synthesized prediction reference picture. Motion compensation may be performed based on the motion data and at least one of the morphed prediction reference picture or the synthesized prediction reference picture to generate a second predicted partition.

In some implementations, a computer-implemented method for video coding where generating the reconstructed prediction reference picture further may include generating and applying quality restoration in-loop filtering parameters to the reconstructed prediction reference picture.

In some implementations, a computer-implemented method for video coding where the motion compensation may include generating adaptive precision filtering parameters and performing the motion compensation based at least in part on an adaptive precision filtering using the adaptive precision filtering parameters.

In some implementations, a computer-implemented method for video coding where generating the reconstructed prediction reference picture further may include generating and applying quality restoration in-loop filtering parameters to the reconstructed prediction reference picture, where the motion compensation may include generating adaptive precision filtering parameters and performing the motion compensation based at least in part on an adaptive precision filtering using the adaptive precision filtering parameters.

In some implementations, a computer-implemented method for video coding may include generating enhanced prediction parameters and an enhanced predicted partition based at least in part on the enhanced prediction parameters and the second predicted partition. A determination may be made as to whether to use the enhanced predicted partition or the second predicted partition as a selected predicted partition for the second prediction partition. The selected predicted partition may include the enhanced predicted partition coding the enhanced prediction parameters into a bitstream, where generating the reconstructed prediction reference picture further may include generating and applying quality restoration in-loop filtering parameters to the reconstructed prediction reference picture.

In some implementations, a computer-implemented method for video coding may include assembling the second predicted partition and a third predicted partition to generate at least a portion of an assembled picture. Fusion filtering parameters and a fusion filtered portion of the assembled picture an enhanced predicted partition may be generated based at least in part on the fusion filtering parameters, where generating the reconstructed prediction reference picture further may include generating and applying quality restoration in-loop filtering parameters to the reconstructed prediction reference picture.

In some implementations, a computer-implemented method for video coding may include generating enhanced prediction parameters and an enhanced predicted partition based at least in part on the enhanced prediction parameters and the second predicted partition. A determination may be made as to whether to use the enhanced predicted partition or the second predicted partition as a selected predicted partition for the second prediction partition. The selected predicted partition may include the enhanced predicted partition coding the enhanced prediction parameters into a bitstream, where the motion compensation may include generating adaptive precision filtering parameters and performing the motion compensation based at least in part on an adaptive precision filtering using the adaptive precision filtering parameters, and where generating the reconstructed prediction reference picture further may include generating and applying quality restoration in-loop filtering parameters to the reconstructed prediction reference picture.

In some implementations, a computer-implemented method for video coding may include assembling the second predicted partition and a third predicted partition to generate at least a portion of an assembled picture. Fusion filtering parameters and a fusion filtered portion of the assembled picture an enhanced predicted partition may be generated based at least in part on the fusion filtering parameters, where the motion compensation may include generating adaptive precision filtering parameters and performing the motion compensation based at least in part on an adaptive precision filtering using the adaptive precision filtering parameters, and where generating the reconstructed prediction reference picture further may include generating and applying quality restoration in-loop filtering parameters to the reconstructed prediction reference picture.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Various components of the systems described herein may be implemented in software, firmware, and/or hardware and/or any combination thereof. For example, various components of system 1400 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

FIG. 24 is an illustrative diagram of example video coding system 2400, arranged in accordance with at least some implementations of the present disclosure. In the illustrated implementation, video coding system 2400 may include imaging device(s) 2401, video encoder 100, video decoder 200 (and/or a video coder implemented via logic circuitry 2350 of processing unit(s) 2420), an antenna 2402, one or more processor(s) 2403, one or more memory store(s) 2404, and/or a display device 2405.

As illustrated, imaging device(s) 2401, antenna 2402, processing unit(s) 2420, logic circuitry 2350, video encoder 100, video decoder 200, processor(s) 2403, memory store(s) 2404, and/or display device 2405 may be capable of communication with one another. As discussed, although illustrated with both video encoder 100 and video decoder 200, video coding system 2400 may include only video encoder 100 or only video decoder 200 in various examples.

As shown, in some examples, video coding system 2400 may include antenna 2402. Antenna 2402 may be configured to transmit or receive an encoded bitstream of video data, for example. Further, in some examples, video coding system 2400 may include display device 2405. Display device 2405 may be configured to present video data. As shown, in some examples, logic circuitry 2350 may be implemented via processing unit(s) 2420. Processing unit(s) 2420 may include application-specific integrated circuit (ASIC) logic, graphics processor(s), general purpose processor(s), or the like. Video coding system 2400 also may include optional processor(s) 2403, which may similarly include application-specific integrated circuit (ASIC) logic, graphics processor(s), general purpose processor(s), or the like. In some examples, logic circuitry 2350 may be implemented via hardware, video coding dedicated hardware, or the like, and processor(s) 2403 may implemented general purpose software, operating systems, or the like. In addition, memory store(s) 2404 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 2404 may be implemented by cache memory. In some examples, logic circuitry 2350 may access memory store(s) 2404 (for implementation of an image buffer for example). In other examples, logic circuitry 2350 and/or processing unit(s) 2420 may include memory stores (e.g., cache or the like) for the implementation of an image buffer or the like.

In some examples, video encoder 100 implemented via logic circuitry may include an image buffer (e.g., via either processing unit(s) 2420 or memory store(s) 2404)) and a graphics processing unit (e.g., via processing unit(s) 2420). The graphics processing unit may be communicatively coupled to the image buffer. The graphics processing unit may include video encoder 100 as implemented via logic circuitry 2350 to embody the various modules as discussed with respect to FIGS. 1, 3, 4, 6, 8, 10, 12, 14, 16, and/or 18. For example, the graphics processing unit may include coding partitions generator logic circuitry, adaptive transform logic circuitry, content pre-analyzer, encode controller logic circuitry, adaptive entropy encoder logic circuitry, and so on. The logic circuitry may be configured to perform the various operations as discussed herein.

In one example, graphics processing unit of video encoder 100 may be configured to partition a plurality of tiles or super-fragments of a video frame to generate a plurality of prediction partitions. A plurality of predicted partitions associated with the plurality of prediction partitions may be differenced to generate a corresponding plurality of prediction error data partitions. At least a portion of the prediction error data partitions may be partitioned to generate a plurality of coding partitions. One or more transforms may be performed on the plurality of coding partitions to generate transform coefficients, where the one or more transforms may include at least one content adaptive transform. The transform coefficients may be quantized to generate quantized transform coefficients. An inverse quantization may be performed on the quantized transform coefficients to generate reconstructed transform coefficients. One or more inverse transforms may be performed on the reconstructed transform coefficients to generate a plurality of reconstructed coding partitions. The plurality of reconstructed coding partitions may be assembled to generate a plurality of reconstructed prediction error data partitions. The plurality of predicted partitions may be added to the plurality of reconstructed prediction error data partitions to generate at least one reconstructed tile or super-fragment. Deblock filtering parameters and a first final reconstructed tile or super-fragment may be generated based at least in part on the at least one reconstructed tile or super-fragment and the deblock filtering parameters. The first final reconstructed tile or super-fragment and a second final reconstructed tile or super-fragment may be assembled to generate a reconstructed picture. Quality restoration in-loop filtering parameters and a reconstructed prediction reference picture may be generated based at least in part on the reconstructed picture and the quality restoration in-loop filtering parameters.

Video decoder 200 may be implemented in a similar manner as implemented via logic circuitry 2350 to embody the various modules as discussed with respect to decoder 200 of FIG. 2 and/or any other decoder system or subsystem described herein.

In some examples, antenna 2402 of video coding system 2400 may be configured to receive an encoded bitstream of video data. As discussed, the encoded bitstream may include data associated with the coding partition (e.g., transform coefficients or quantized transform coefficients, optional indicators (as discussed), and/or data defining the coding partition (e.g., data associated with defining bi-tree partitions or k-d tree partitions using a symbol-run coding or codebook technique or the like)). Video coding system 2400 may also include video decoder 200 coupled to antenna 2402 and configured to decode the encoded bitstream.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 25:
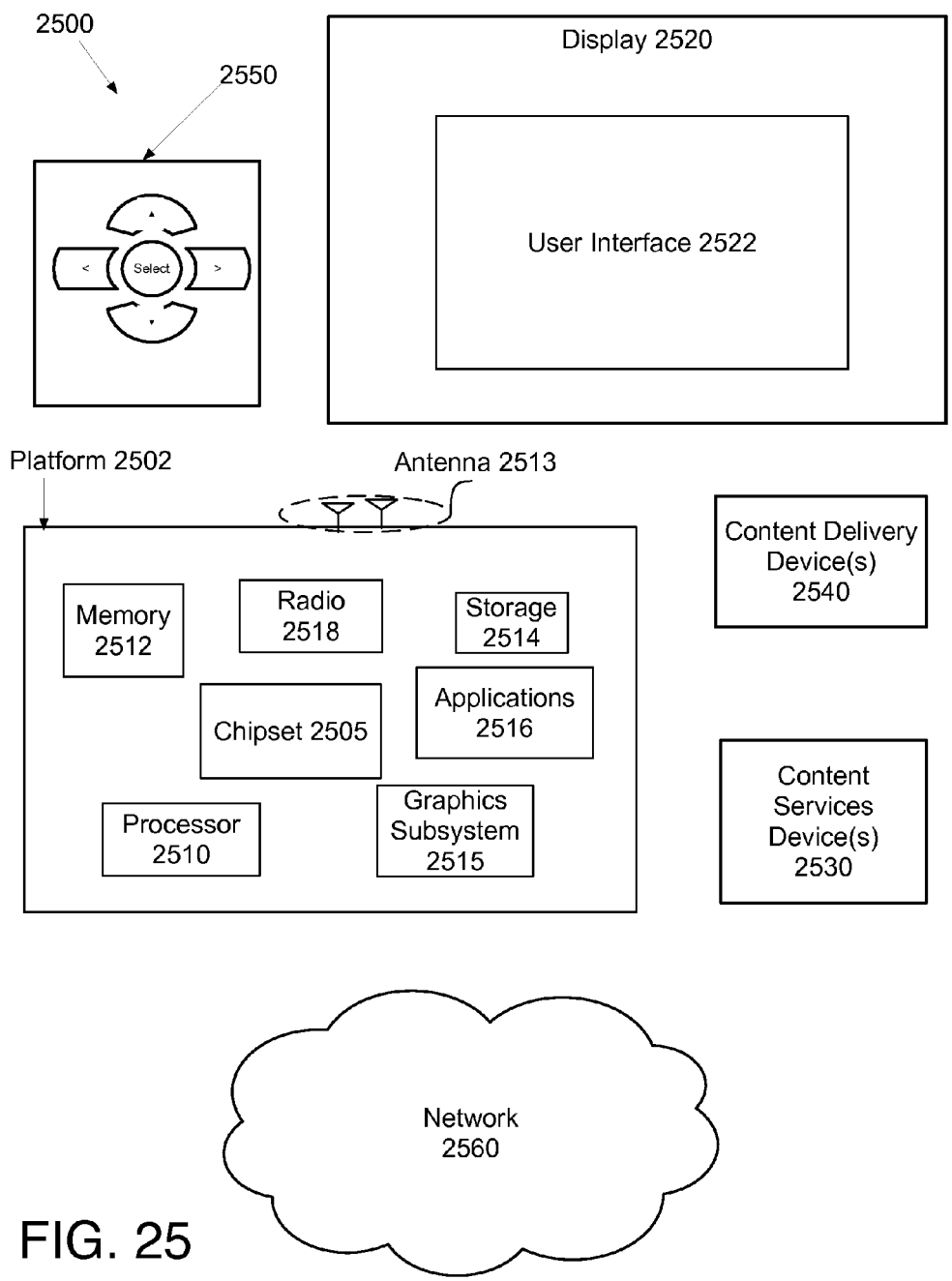
FIG. 25 is an illustrative diagram of an example system.

FIG. 25 is an illustrative diagram of an example system 2500, arranged in accordance with at least some implementations of the present disclosure. In various implementations, system 2500 may be a media system although system 2500 is not limited to this context. For example, system 2500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2500 includes a platform 2502 coupled to a display 2520. Platform 2502 may receive content from a content device such as content services device(s) 2530 or content delivery device(s) 2540 or other similar content sources. A navigation controller 2550 including one or more navigation features may be used to interact with, for example, platform 2502 and/or display 2520. Each of these components is described in greater detail below.

In various implementations, platform 2502 may include any combination of a chipset 2505, processor 2510, memory 2512, antenna 2513, storage 2514, graphics subsystem 2515, applications 2516 and/or radio 2518. Chipset 2505 may provide intercommunication among processor 2510, memory 2512, storage 2514, graphics subsystem 2515, applications 2516 and/or radio 2518. For example, chipset 2505 may include a storage adapter (not depicted) capable of providing intercommunication with storage 2514.

Processor 2510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2510 may be dual-core processor(s), dual-core mobile processor(s), and so forth.

Memory 2512 may be implemented as a volatile memory device such as, but not limited to, a Random Access Memory (RAM), Dynamic Random Access Memory (DRAM), or Static RAM (SRAM).

Storage 2514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2514 may include technology to increase the storage performance enhanced protection for valuable digital media when multiple hard drives are included, for example.

Graphics subsystem 2515 may perform processing of images such as still or video for display. Graphics subsystem 2515 may be a graphics processing unit (GPU) or a visual processing unit (VPU), for example. An analog or digital interface may be used to communicatively couple graphics subsystem 2515 and display 2520. For example, the interface may be any of a High-Definition Multimedia Interface, DisplayPort, wireless HDMI, and/or wireless HD compliant techniques. Graphics subsystem 2515 may be integrated into processor 2510 or chipset 2505. In some implementations, graphics subsystem 2515 may be a stand-alone device communicatively coupled to chipset 2505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2518 may operate in accordance with one or more applicable standards in any version.

In various implementations, display 2520 may include any television type monitor or display. Display 2520 may include, for example, a computer display screen, touch screen display, video monitor, television-like device, and/or a television. Display 2520 may be digital and/or analog. In various implementations, display 2520 may be a holographic display. Also, display 2520 may be a transparent surface that may receive a visual projection. Such projections may convey various forms of information, images, and/or objects. For example, such projections may be a visual overlay for a mobile augmented reality (MAR) application. Under the control of one or more software applications 2516, platform 2502 may display user interface 2522 on display 2520.

In various implementations, content services device(s) 2530 may be hosted by any national, international and/or independent service and thus accessible to platform 2502 via the Internet, for example. Content services device(s) 2530 may be coupled to platform 2502 and/or to display 2520. Platform 2502 and/or content services device(s) 2530 may be coupled to a network 2560 to communicate (e.g., send and/or receive) media information to and from network 2560. Content delivery device(s) 2540 also may be coupled to platform 2502 and/or to display 2520.

In various implementations, content services device(s) 2530 may include a cable television box, personal computer, network, telephone, Internet enabled devices or appliance capable of delivering digital information and/or content, and any other similar device capable of unidirectionally or bidirectionally communicating content between content providers and platform 2502 and/display 2520, via network 2560 or directly. It will be appreciated that the content may be communicated unidirectionally and/or bidirectionally to and from any one of the components in system 2500 and a content provider via network 2560. Examples of content may include any media information including, for example, video, music, medical and gaming information, and so forth.

Content services device(s) 2530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2502 may receive control signals from navigation controller 2550 having one or more navigation features. The navigation features of controller 2550 may be used to interact with user interface 2522, for example. In various embodiments, navigation controller 2550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2550 may be replicated on a display (e.g., display 2520) by movements of a pointer, cursor, focus ring, or other visual indicators displayed on the display. For example, under the control of software applications 2516, the navigation features located on navigation controller 2550 may be mapped to virtual navigation features displayed on user interface 2522. In various embodiments, controller 2550 may not be a separate component but may be integrated into platform 2502 and/or display 2520. The present disclosure, however, is not limited to the elements or in the context shown or described herein.

In various implementations, drivers (not shown) may include technology to enable users to instantly turn on and off platform 2502 like a television with the touch of a button after initial boot-up, when enabled, for example. Program logic may allow platform 2502 to stream content to media adaptors or other content services device(s) 2530 or content delivery device(s) 2540 even when the platform is turned "off." In addition, chipset 2505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2500 may be integrated. For example, platform 2502 and content services device(s) 2530 may be integrated, or platform 2502 and content delivery device(s) 2540 may be integrated, or platform 2502, content services device(s) 2530, and content delivery device(s) 2540 may be integrated, for example. In various embodiments, platform 2502 and display 2520 may be an integrated unit. Display 2520 and content service device(s) 2530 may be integrated, or display 2520 and content delivery device(s) 2540 may be integrated, for example. These examples are not meant to limit the present disclosure.

In various embodiments, system 2500 may be implemented as a wireless system, a wired system, or a combination of both. When implemented as a wireless system, system 2500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 25.

Figure 26:
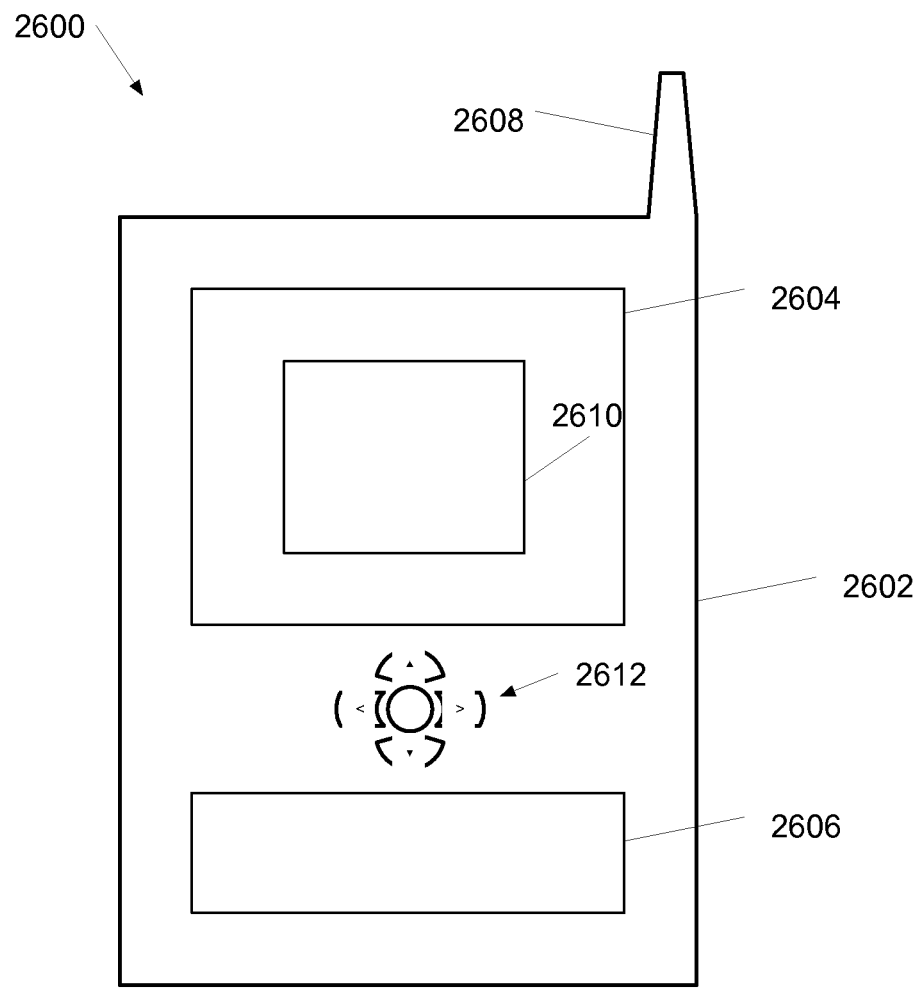
FIG. 26 illustrates an example device, all arranged in accordance with at least some implementations of the present disclosure.

As described above, system 2500 may be embodied in varying physical styles or form factors. FIG. 26 illustrates implementations of a small form factor device 2600 in which system 2600 may be embodied. In various embodiments, for example, device 2600 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 26, device 2600 may include a housing 2602, a display 2604 which may include a user interface 2610, an input/output (I/O) device 2606, and an antenna 2608. Device 2600 also may include navigation features 2612. Display 2604 may include any suitable display unit for displaying information appropriate for a mobile computing device. I/O device 2606 may include any suitable I/O device for entering information into a mobile computing device. Examples for I/O device 2606 may include an alphanumeric keyboard, a numeric keypad, a touch pad, input keys, buttons, switches, rocker switches, microphones, speakers, voice recognition device and software, and so forth. Information also may be entered into device 2600 by way of microphone (not shown). Such information may be digitized by a voice recognition device (not shown). The embodiments are not limited in this context.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include generating a predicted partition associated with a prediction partition. An enhanced predicted partition and enhanced prediction parameters associated with the enhanced predicted partition may be generated, where the enhanced predicted partition is based at least in part on the predicted partition. A determination may be made as to whether to use the enhanced predicted partition or the predicted partition as a selected predicted partition for the prediction partition. The selected predicted partition may include the enhanced predicted partition coding the enhanced prediction parameters into a bitstream.

In some implementations, video coding may include generating a first reconstructed tile or super-fragment. Deblock filtering or deblock and dither filtering and in-loop or quality restoration filtering may be applied to the reconstructed tile or super-fragment to generate a first final reconstructed tile or super-fragment. Deblock filtering or deblock and dither filtering parameters associated with the deblock filtering or the deblock and dither filtering may be generated. In-loop filtering or quality restoration filtering parameters associated with the in-loop filtering or the quality restoration filtering may be generated. The first final reconstructed tile or super-fragment and a second final reconstructed tile or super-fragment may be assembled to generate a reconstructed video frame. The reconstructed video frame in a picture buffer may be stored, where the predicted partition is based at least in part on the reconstructed video frame, and where generating the predicted partition may include motion compensation including an adaptive motion or an adaptive precision filtering. Adaptive motion filtering parameters or adaptive precision filtering parameters associated with the adaptive motion filtering or adaptive precision filtering may be generated. The deblock filtering parameters or deblock and dither filtering parameters, the in-loop filtering parameters or quality restoration filtering parameters, and the adaptive motion filtering parameters or adaptive precision filtering parameters may be coded into the bitstream. A determination may be made as to whether to apply fusion filtering or fusion improvement filtering to the selected predicted partition. When fusion filtering or fusion improvement filtering is to be applied to the selected predicted partition the process may include: assembling the selected predicted partition and a second selected predicted partition may be to generate at least a portion of an assembled picture; fusion filtering or fusion improvement filtering the portion of the assembled picture; generating fusion filtering parameters or fusion improvement filtering parameters associated with the fusion filtering or the fusion improvement filtering; and coding the fusion filtering parameters or the fusion improvement filtering parameters into the bitstream. An indicator may be generated indicating whether to use the enhanced predicted partition or the predicted partition data as the selected predicted partition for the prediction partition. The indicator into the bitstream may be encoded. The selected predicted partition may be differenced with original pixel data associated with the prediction partition to generate a prediction error data partition. The prediction error data partition may be partitioned to generate a plurality of coding partitions. A forward transform on the plurality of coding partitions may be performed to generate transform coefficients associated with the plurality of coding partitions. The transform coefficients may be quantized to generate quantized transform coefficients. The quantized transform coefficients and the indicator may be encoded into the bitstream and transmitted.

In some implementations, video coding may include receiving the bitstream and decoding the bitstream to determine the enhanced prediction parameters, the deblock filtering parameters or deblock and dither filtering parameters, the in-loop filtering parameters or quality restoration filtering parameters, the adaptive motion filtering parameters or adaptive precision filtering parameters, the fusion filtering or fusion improvement filtering parameters, the indicator, and the quantized transform coefficients. An inverse quantization may be performed based at least in part on the quantized transform coefficients to generate decoded transform coefficients. An inverse transform may be performed based at least in part on the decoded transform coefficients to generate a plurality of decoded coding partitions. The plurality of decoded coding partitions may be assembled to generate a decoded prediction error data partition. At least one of a first decoded tile or a first decoded super-fragment may be generated. Decoder deblock filtering or decoder deblock and dither filtering and decoder in-loop or decoder quality restoration filtering may be applied to the first decoded tile or super-fragment based at least in part on the deblock filtering parameters or deblock and dither filtering parameters and the in-loop filtering parameters or quality restoration filtering parameters to generate a first final decoded reconstructed tile or super-fragment. The first final decoded reconstructed tile or super-fragment and a second final decoded reconstructed tile or super-fragment may be assembled to generate a decoded reconstructed video frame. The decoded reconstructed video frame may be stored in a decoder picture buffer. Decoder motion compensation may be performed to generate a decoded predicted partition, where the decoder motion compensation may include a decoder adaptive motion filtering or a decoder adaptive precision filtering based at least in part on the adaptive motion filtering parameters or adaptive precision filtering parameters. An enhanced decoded predicted partition may be generated based at least in part on the enhanced prediction parameters and the decoded predicted partition. A determination may be made as to whether to use the decoded enhanced predicted partition or the decoded predicted partition as a selected decoded predicted partition. A determination may be made as to whether to apply decoder fusion filtering or decoder fusion improvement filtering to the selected decoded predicted partition. When decoder fusion filtering or decoder fusion improvement filtering is to be applied to the selected decoded predicted partition may: assemble the selected decoded predicted partition and a second selected decoded predicted partition to generate at least a portion of a decoded assembled picture; and decoder fusion filter or decoder fusion improvement filter the portion of the decoded assembled picture based at least in part on the fusion filtering parameters or the fusion improvement filtering parameters. The selected decoded predicted partition may be added to the decoded prediction error data partition to generate a first decoded reconstructed partition; combine the first decoded reconstructed partition and a second decoded reconstructed partition to generate a third final decoded reconstructed tile or super-fragment. The third final decoded reconstructed tile or super-fragment and a fourth final decoded reconstructed tile or super-fragment may be assembled to generate a second decoded reconstructed video frame. The second decoded reconstructed video frame may be transmitted for presentment via a display device. The fusion filtering may include at least one of a non-separable, separable, or hybrid wiener filter, the like, and/or combinations thereof. The deblock and dither filtering may include deblock filtering on 4 pixels. The quality restoration filtering may include applying a non-symmetric, point symmetric, or hybrid wiener filter, where the wiener filter may include a 9×9 square or a shape including a subset of 9×9 or 11×9 coefficients. The adaptive precision filtering may include applying a wiener filter with explicit filters for each of 16 ¼ pixel locations. The fusion improvement filtering may include applying a non-symmetric, point symmetric, or hybrid wiener filter, where the wiener filter may include a 9×9 square or a shape including a subset of 9×9 or 11×9 coefficients.

In some implementations, a computer-implemented method for video coding may include partitioning a plurality of tiles or super-fragments of a video frame to generate a plurality of prediction partitions. A plurality of predicted partitions associated with the plurality of prediction partitions may be differenced to generate a corresponding plurality of prediction error data partitions. At least a portion of the prediction error data partitions may be partitioned to generate a plurality of coding partitions. One or more transforms may be performed on the plurality of coding partitions to generate transform coefficients, where the one or more transforms may include at least one content adaptive transform. The transform coefficients may be quantized to generate quantized transform coefficients. An inverse quantization may be performed on the quantized transform coefficients to generate reconstructed transform coefficients. One or more inverse transforms may be performed on the reconstructed transform coefficients to generate a plurality of reconstructed coding partitions. The plurality of reconstructed coding partitions may be assembled to generate a plurality of reconstructed prediction error data partitions. The plurality of predicted partitions may be added to the plurality of reconstructed prediction error data partitions to generate at least one reconstructed tile or super-fragment. Deblock filtering parameters and a first final reconstructed tile or super-fragment may be generated based at least in part on the at least one reconstructed tile or super-fragment and the deblock filtering parameters. The first final reconstructed tile or super-fragment and a second final reconstructed tile or super-fragment may be assembled to generate a reconstructed picture. Quality restoration in-loop filtering parameters and a reconstructed prediction reference picture may be generated based at least in part on the reconstructed picture and the quality restoration in-loop filtering parameters.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition, where the motion compensation may include generating adaptive precision filtering parameters and performing the motion compensation based at least in part on an adaptive precision filtering using the adaptive precision filtering parameters.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition. Enhanced prediction parameters and an enhanced predicted partition may be generated based at least in part on the enhanced prediction parameters and the predicted partition. A determination may be made as to whether to use the enhanced predicted partition or the second predicted partition as a selected predicted partition for the second prediction partition. The selected predicted partition may include the enhanced predicted partition coding the enhanced prediction parameters into a bitstream.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition. The second predicted partition and a third predicted partition may be assembled to generate at least a portion of an assembled picture. Fusion filtering parameters and a fusion filtered portion of the assembled picture and an enhanced predicted partition may be generated based at least in part on the fusion filtering parameters.

In some implementations, a computer-implemented method for video coding may include generating motion data associated with a second prediction partition based at least in part on the reconstructed prediction reference picture. Motion compensation may be performed based on the motion data and the reconstructed prediction reference picture to generate a second predicted partition, where the motion compensation may include generating adaptive precision filtering parameters and performing the motion compensation based at least in part on an adaptive precision filtering using the adaptive precision filtering parameters. Enhanced prediction parameters and an enhanced predicted partition may be generated based at least in part on the enhanced prediction parameters and the second predicted partition, where the enhanced prediction parameters may be generated at least one of before selecting the second predicted partition for coding or after selecting the second predicted partition for coding.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition, where the motion compensation may include generating adaptive precision filtering parameters and performing the motion compensation based at least in part on an adaptive precision filtering using the adaptive precision filtering parameters.

In some implementations, a computer-implemented method for video coding may include generating synthesizing characteristic parameters and a synthesized prediction reference picture based at least in part on the synthesizing characteristic parameters and the reconstructed prediction reference picture. Motion data associated with a second prediction partition may be generated based at least in part on the morphed prediction reference picture. Motion compensation may be performed based on the motion data and the synthesized prediction reference picture to generate a second predicted partition, where the motion compensation may include generating adaptive precision filtering parameters and performing the motion compensation based at least in part on an adaptive precision filtering using the adaptive precision filtering parameters.

In some implementations, a computer-implemented method for video coding may include generating morphing characteristic parameters and a morphed prediction reference picture based at least in part on the morphing characteristic parameters and the reconstructed prediction reference picture. Synthesizing characteristic parameters and a synthesized prediction reference picture may be generated based at least in part on the synthesizing characteristic parameters and the reconstructed prediction reference picture. First motion data associated with a second prediction partition may be generated based at least in part on the morphed prediction reference picture. Second motion data associated with a third prediction partition may be generated based at least in part on the synthesized prediction reference picture. Motion compensation may be performed based on the first motion data and the morphed prediction reference picture to generate a second predicted partition, where the motion compensation may include generating adaptive precision filtering parameters and performing the motion compensation based at least in part on an adaptive precision filtering using the adaptive precision filtering parameters. A second motion compensation may be performed based on the second motion data and the synthesized prediction reference picture to generate a third predicted partition, where the second motion compensation may include generating second adaptive precision filtering parameters and performing the second motion compensation based at least in part on a second adaptive precision filtering using the second adaptive precision filtering parameters.

In some implementations, a computer-implemented method for video coding may include generating morphing characteristic parameters and a morphed prediction reference picture based at least in part on the morphing characteristic parameters and the reconstructed prediction reference picture. Synthesizing characteristic parameters and a synthesized prediction reference picture may be generated based at least in part on the synthesizing characteristic parameters and a second reconstructed prediction reference picture. First motion data associated with a second prediction partition may be generated based at least in part on the morphed prediction reference picture. Second motion data associated with a third prediction partition may be generated based at least in part on the synthesized prediction reference picture. Third motion data associated with a fourth prediction partition may be generated based at least in part on a third reconstructed prediction reference picture. Motion compensation may be performed based on the first motion data and the morphed prediction reference picture to generate a second predicted partition, where the motion compensation may include generating adaptive precision filtering parameters and performing the motion compensation based at least in part on an adaptive precision filtering using the adaptive precision filtering parameters. A second motion compensation may be performed based on the second motion data and the synthesized prediction reference picture to generate a third predicted partition, where the second motion compensation may include generating second adaptive precision filtering parameters and performing the second motion compensation based at least in part on a second adaptive precision filtering using the second adaptive precision filtering parameters. A third motion compensation may be performed based on the third motion data and the third reconstructed prediction reference picture to generate a fourth predicted partition, where the third motion compensation may include generating third adaptive precision filtering parameters and performing the third motion compensation based at least in part on a third adaptive precision filtering using the third adaptive precision filtering parameters.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition. Enhanced prediction parameters and an enhanced predicted partition may be generated based at least in part on the enhanced prediction parameters and the second predicted partition, where the enhanced prediction parameters are generated at least one of before selecting the second predicted partition for coding or after selecting the second predicted partition for coding In some implementations, a computer-implemented method for video coding may include generating synthesizing characteristic parameters and a synthesized prediction reference picture based at least in part on synthesizing morphing characteristic parameters and the reconstructed prediction reference picture. Motion data associated with a second prediction partition may be generated based at least in part on the synthesized prediction reference picture. Motion compensation may be performed based on the motion data and the synthesized prediction reference picture to generate a second predicted partition. Enhanced prediction parameters and an enhanced predicted partition may be generated based at least in part on the enhanced prediction parameters and the second predicted partition, where the enhanced prediction parameters are generated at least one of before selecting the second predicted partition for coding or after selecting the second predicted partition for coding.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition. Synthesizing characteristic parameters and a synthesized prediction reference picture may be generated based at least in part on synthesizing morphing characteristic parameters and a second reconstructed prediction reference picture. Motion data associated with the second prediction partition may be generated based at least in part on the synthesized prediction reference picture. Motion compensation may be performed based on the motion data and the synthesized prediction reference picture to generate a third predicted partition. The second predicted partition and the third predicted partition may be combined to generate a fourth predicted partition, where the combining may include a weighted average. Enhanced prediction parameters and an enhanced predicted partition may be generated based at least in part on the enhanced prediction parameters and the fourth predicted partition, where the enhanced prediction parameters are generated at least one of before selecting the fourth predicted partition for coding or after selecting the fourth predicted partition for coding.

In some implementations, a computer-implemented method for video coding may include generating morphing characteristic parameters and a morphed prediction reference picture based at least in part on the morphing characteristic parameters and the reconstructed prediction reference picture. Motion data associated with a second prediction partition may be generated based at least in part on the morphed prediction reference picture. Motion compensation may be performed based on the motion data and the morphed prediction reference picture to generate a second predicted partition. Synthesizing characteristic parameters and a synthesized prediction reference picture may be generated based at least in part on synthesizing morphing characteristic parameters and a second reconstructed prediction reference picture. Motion data associated with the second prediction partition may be generated based at least in part on the synthesized prediction reference picture. Motion compensation may be performed based on the motion data and the synthesized prediction reference picture to generate a third predicted partition. Motion data associated with the second prediction partition may be generated based at least in part on a second reconstructed prediction reference picture. Motion compensation may be performed based on the motion data and the morphed prediction reference picture to generate a fourth predicted partition. The second predicted partition and the third predicted partition may be combined to generate a fifth predicted partition, where the combining may include a weighted average. A selection between the fifth predicted partition and the fourth predicted partition to generate a selected prediction partition may be made. Enhanced prediction parameters and an enhanced predicted partition may be generated based at least in part on the enhanced prediction parameters and the selected predicted partition.

In another example, a computer-implemented method for video coding may include partitioning a plurality of tiles or super-fragments of a video frame to generate a plurality of prediction partitions. A plurality of predicted partitions associated with the plurality of prediction partitions may be differenced to generate a corresponding plurality of prediction error data partitions. At least a portion of the prediction error data partitions may be partitioned to generate a plurality of coding partitions. One or more transforms may be performed on the plurality of coding partitions to generate transform coefficients, where the one or more transforms include at least one content adaptive transform. The transform coefficients may be quantized to generate quantized transform coefficients. An inverse quantization may be performed on the quantized transform coefficients to generate reconstructed transform coefficients. One or more inverse transforms may be performed on the reconstructed transform coefficients to generate a plurality of reconstructed coding partitions. The plurality of reconstructed coding partitions may be assembled to generate a plurality of reconstructed prediction error data partitions. The plurality of predicted partitions may be added to the plurality of reconstructed prediction error data partitions to generate at least one reconstructed tile or super-fragment. Deblock filtering parameters and a first final reconstructed tile or super-fragment may be generated based at least in part on the at least one reconstructed tile or super-fragment and the deblock filtering parameters. The first final reconstructed tile or super-fragment and a second final reconstructed tile or super-fragment may be assembled to generate a reconstructed prediction reference picture. Morphing characteristic parameters and a morphed prediction reference picture may be generated based at least in part on the morphing characteristic parameters and the reconstructed prediction reference picture. Synthesizing characteristic parameters and a synthesized prediction reference picture may be generated based at least in part on the synthesizing characteristic parameters and the reconstructed prediction reference picture. Motion data associated with a second prediction partition may be generated based at least in part on one of the morphed prediction reference picture or the synthesized prediction reference picture. Motion compensation may be performed based on the motion data and at least one of the morphed prediction reference picture or the synthesized prediction reference picture to generate a second predicted partition.

In some implementations, a computer-implemented method for video coding where generating the reconstructed prediction reference picture further may include generating and applying quality restoration in-loop filtering parameters to the reconstructed prediction reference picture.

In some implementations, a computer-implemented method for video coding where the motion compensation may include generating adaptive precision filtering parameters and performing the motion compensation based at least in part on an adaptive precision filtering using the adaptive precision filtering parameters.

In some implementations, a computer-implemented method for video coding where generating the reconstructed prediction reference picture further may include generating and applying quality restoration in-loop filtering parameters to the reconstructed prediction reference picture, where the motion compensation may include generating adaptive precision filtering parameters and performing the motion compensation based at least in part on an adaptive precision filtering using the adaptive precision filtering parameters.

In some implementations, a computer-implemented method for video coding may include generating enhanced prediction parameters and an enhanced predicted partition based at least in part on the enhanced prediction parameters and the second predicted partition. A determination may be made as to whether to use the enhanced predicted partition or the second predicted partition as a selected predicted partition for the second prediction partition. The selected predicted partition may include the enhanced predicted partition coding the enhanced prediction parameters into a bitstream, where generating the reconstructed prediction reference picture further may include generating and applying quality restoration in-loop filtering parameters to the reconstructed prediction reference picture.

In some implementations, a computer-implemented method for video coding may include assembling the second predicted partition and a third predicted partition to generate at least a portion of an assembled picture. Fusion filtering parameters and a fusion filtered portion of the assembled picture an enhanced predicted partition may be generated based at least in part on the fusion filtering parameters, where generating the reconstructed prediction reference picture further may include generating and applying quality restoration in-loop filtering parameters to the reconstructed prediction reference picture.

In some implementations, a computer-implemented method for video coding may include generating enhanced prediction parameters and an enhanced predicted partition based at least in part on the enhanced prediction parameters and the second predicted partition. A determination may be made as to whether to use the enhanced predicted partition or the second predicted partition as a selected predicted partition for the second prediction partition. The selected predicted partition may include the enhanced predicted partition coding the enhanced prediction parameters into a bitstream, where the motion compensation may include generating adaptive precision filtering parameters and performing the motion compensation based at least in part on an adaptive precision filtering using the adaptive precision filtering parameters, and where generating the reconstructed prediction reference picture further may include generating and applying quality restoration in-loop filtering parameters to the reconstructed prediction reference picture.

In some implementations, a computer-implemented method for video coding may include assembling the second predicted partition and a third predicted partition to generate at least a portion of an assembled picture. Fusion filtering parameters and a fusion filtered portion of the assembled picture an enhanced predicted partition may be generated based at least in part on the fusion filtering parameters, where the motion compensation may include generating adaptive precision filtering parameters and performing the motion compensation based at least in part on an adaptive precision filtering using the adaptive precision filtering parameters, and where generating the reconstructed prediction reference picture further may include generating and applying quality restoration in-loop filtering parameters to the reconstructed prediction reference picture.

In another example, a video encoder may include an image buffer. A graphics processing unit may be communicatively coupled to the image buffer and may be configured to partition a plurality of tiles or super-fragments of a video frame to generate a plurality of prediction partitions. A plurality of predicted partitions associated with the plurality of prediction partitions may be differenced to generate a corresponding plurality of prediction error data partitions. At least a portion of the prediction error data partitions may be partitioned to generate a plurality of coding partitions. One or more transforms may be performed on the plurality of coding partitions to generate transform coefficients, where the one or more transforms may include at least one content adaptive transform. The transform coefficients may be quantized to generate quantized transform coefficients. An inverse quantization may be performed on the quantized transform coefficients to generate reconstructed transform coefficients. One or more inverse transforms may be performed on the reconstructed transform coefficients to generate a plurality of reconstructed coding partitions. The plurality of reconstructed coding partitions may be assembled to generate a plurality of reconstructed prediction error data partitions. The plurality of predicted partitions may be added to the plurality of reconstructed prediction error data partitions to generate at least one reconstructed tile or super-fragment. Deblock filtering parameters and a first final reconstructed tile or super-fragment may be generated based at least in part on the at least one reconstructed tile or super-fragment and the deblock filtering parameters. The first final reconstructed tile or super-fragment and a second final reconstructed tile or super-fragment may be assembled to generate a reconstructed picture. Quality restoration in-loop filtering parameters and a reconstructed prediction reference picture may be generated based at least in part on the reconstructed picture and the quality restoration in-loop filtering parameters.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:

partitioning a plurality of tiles or super-fragments of a video frame to generate a plurality of prediction partitions;

differencing a plurality of predicted partitions associated with the plurality of prediction partitions to generate a corresponding plurality of prediction error data partitions;

partitioning at least a portion of the prediction error data partitions to generate a plurality of coding partitions;

performing one or more transforms on the plurality of coding partitions to generate transform coefficients, wherein the one or more transforms comprise at least one content adaptive transform;

quantizing the transform coefficients to generate quantized transform coefficients;

performing an inverse quantization on the quantized transform coefficients to generate reconstructed transform coefficients;

performing one or more inverse transforms on the reconstructed transform coefficients to generate a plurality of reconstructed coding partitions;

assembling the plurality of reconstructed coding partitions to generate a plurality of reconstructed prediction error data partitions;

adding the plurality of predicted partitions to the plurality of reconstructed prediction error data partitions to generate at least one reconstructed tile or super-fragment;

generating deblock filtering parameters and a first final reconstructed tile or super-fragment based at least in part on the at least one reconstructed tile or super-fragment and the deblock filtering parameters;

assembling the first final reconstructed tile or super-fragment and a second final reconstructed tile or super-fragment to generate a reconstructed picture; and generating quality restoration in-loop filtering parameters and a reconstructed prediction reference picture based at least in part on the reconstructed picture and the quality restoration in-loop filtering parameters.

2. The method of claim 1, further comprising:

generating motion data associated with a second prediction partition based at least in part on the reconstructed prediction reference picture; and performing motion compensation based on the motion data and the reconstructed prediction reference picture to generate a second predicted partition, wherein the motion compensation comprises generating adaptive precision filtering parameters and performing the motion compensation based at least in part on an adaptive precision filtering using the adaptive precision filtering parameters.

3. The method of claim 1, further comprising:

generating motion data associated with a second prediction partition based at least in part on the reconstructed prediction reference picture;

performing motion compensation based on the motion data and the reconstructed prediction reference picture to generate a second predicted partition;

generating enhanced prediction parameters and an enhanced predicted partition based at least in part on the enhanced prediction parameters and the predicted partition;

determining whether to use the enhanced predicted partition or the second predicted partition as a selected predicted partition for the second prediction partition; and wherein the selected predicted partition comprises the enhanced predicted partition coding the enhanced prediction parameters into a bitstream.

4. The method of claim 1, further comprising:
generating motion data associated with a second prediction partition based at least in part on the reconstructed prediction reference picture;
performing motion compensation based on the motion data and the reconstructed prediction reference picture to generate a second predicted partition;
assembling the second predicted partition and a third predicted partition to generate at least a portion of an assembled picture; and
generating fusion filtering parameters and a fusion filtered portion of the assembled picture and an enhanced predicted partition based at least in part on the fusion filtering parameters.

5. The method of claim 1, further comprising:
generating motion data associated with a second prediction partition based at least in part on the reconstructed prediction reference picture;
performing motion compensation based on the motion data and the reconstructed prediction reference picture to generate a second predicted partition, wherein the motion compensation comprises generating adaptive precision filtering parameters and performing the motion compensation based at least in part on an adaptive precision filtering using the adaptive precision filtering parameters; and
generating enhanced prediction parameters and an enhanced predicted partition based at least in part on the enhanced prediction parameters and the second predicted partition, wherein the enhanced prediction parameters are generated at least one of before selecting the second predicted partition for coding or after selecting the second predicted partition for coding.

6. The method of claim 1, further comprising:
generating morphing characteristic parameters and a morphed prediction reference picture based at least in part on the morphing characteristic parameters and the reconstructed prediction reference picture;
generating synthesizing characteristic parameters and a synthesized prediction reference picture based at least in part on the synthesizing characteristic parameters and the reconstructed prediction reference picture;
generating first motion data associated with a second prediction partition based at least in part on the morphed prediction reference picture;
generating second motion data associated with a third prediction partition based at least in part on the synthesized prediction reference picture;
performing motion compensation based on the first motion data and the morphed prediction reference picture to generate a second predicted partition, wherein the motion compensation comprises generating adaptive precision filtering parameters and performing the motion compensation based at least in part on an adaptive precision filtering using the adaptive precision filtering parameters; and
performing a second motion compensation based on the second motion data and the synthesized prediction reference picture to generate a third predicted partition, wherein the second motion compensation comprises generating second adaptive precision filtering parameters and performing the second motion compensation based at least in part on a second adaptive precision filtering using the second adaptive precision filtering parameters.

7. The method of claim 1, further comprising:
generating morphing characteristic parameters and a morphed prediction reference picture based at least in part on the morphing characteristic parameters and the reconstructed prediction reference picture;
generating synthesizing characteristic parameters and a synthesized prediction reference picture based at least in part on the synthesizing characteristic parameters and a second reconstructed prediction reference picture;
generating first motion data associated with a second prediction partition based at least in part on the morphed prediction reference picture;
generating second motion data associated with a third prediction partition based at least in part on the synthesized prediction reference picture;
generating third motion data associated with a fourth prediction partition based at least in part on a third reconstructed prediction reference picture;
performing motion compensation based on the first motion data and the morphed prediction reference picture to generate a second predicted partition, wherein the motion compensation comprises generating adaptive precision filtering parameters and performing the motion compensation based at least in part on an adaptive precision filtering using the adaptive precision filtering parameters;
performing a second motion compensation based on the second motion data and the synthesized prediction reference picture to generate a third predicted partition, wherein the second motion compensation comprises generating second adaptive precision filtering parameters and performing the second motion compensation based at least in part on a second adaptive precision filtering using the second adaptive precision filtering parameters; and
performing a third motion compensation based on the third motion data and the third reconstructed prediction reference picture to generate a fourth predicted partition, wherein the third motion compensation comprises generating third adaptive precision filtering parameters and performing the third motion compensation based at least in part on a third adaptive precision filtering using the third adaptive precision filtering parameters.

8. The method of claim 1, further comprising:
generating morphing characteristic parameters and a morphed prediction reference picture based at least in part on the morphing characteristic parameters and the reconstructed prediction reference picture;
generating motion data associated with a second prediction partition based at least in part on the morphed prediction reference picture;
performing motion compensation based on the motion data and the morphed prediction reference picture to generate a second predicted partition;
generating synthesizing characteristic parameters and a synthesized prediction reference picture based at least in part on synthesizing morphing characteristic parameters and a second reconstructed prediction reference picture;
generating motion data associated with the second prediction partition based at least in part on the synthesized prediction reference picture;

performing motion compensation based on the motion data and the synthesized prediction reference picture to generate a third predicted partition;
generating motion data associated with the second prediction partition based at least in part on a second reconstructed prediction reference picture;
performing motion compensation based on the motion data and the morphed prediction reference picture to generate a fourth predicted partition;
combining the second predicted partition and the third predicted partition to generate a fifth predicted partition, wherein the combining comprises a weighted average;
selecting between the fifth predicted partition and the fourth predicted partition to generate a selected prediction partition; and
generating enhanced prediction parameters and an enhanced predicted partition based at least in part on the enhanced prediction parameters and the selected predicted partition.

9. A computer-implemented method for video coding, comprising:
partitioning a plurality of tiles or super-fragments of a video frame to generate a plurality of prediction partitions;
differencing a plurality of predicted partitions associated with the plurality of prediction partitions to generate a corresponding plurality of prediction error data partitions;
partitioning at least a portion of the prediction error data partitions to generate a plurality of coding partitions;
performing one or more transforms on the plurality of coding partitions to generate transform coefficients, wherein the one or more transforms comprise at least one content adaptive transform;
quantizing the transform coefficients to generate quantized transform coefficients;
performing an inverse quantization on the quantized transform coefficients to generate reconstructed transform coefficients;
performing one or more inverse transforms on the reconstructed transform coefficients to generate a plurality of reconstructed coding partitions;
assembling the plurality of reconstructed coding partitions to generate a plurality of reconstructed prediction error data partitions;
adding the plurality of predicted partitions to the plurality of reconstructed prediction error data partitions to generate at least one reconstructed tile or super-fragment;
generating deblock filtering parameters and a first final reconstructed tile or super-fragment based at least in part on the at least one reconstructed tile or super-fragment and the deblock filtering parameters;
assembling the first final reconstructed tile or super-fragment and a second final reconstructed tile or super-fragment to generate a reconstructed prediction reference picture;
generating morphing characteristic parameters and a morphed prediction reference picture based at least in part on the morphing characteristic parameters and the reconstructed prediction reference picture;
generating synthesizing characteristic parameters and a synthesized prediction reference picture based at least in part on the synthesizing characteristic parameters and the reconstructed prediction reference picture;
generating motion data associated with a second prediction partition based at least in part on one of the morphed prediction reference picture or the synthesized prediction reference picture; and
performing motion compensation based on the motion data and at least one of the morphed prediction reference picture or the synthesized prediction reference picture to generate a second predicted partition.

10. The method of claim 9, wherein to generate the reconstructed prediction reference picture further comprises generating and applying quality restoration in-loop filtering parameters to the reconstructed prediction reference picture.

11. The method of claim 9, wherein the motion compensation comprises generating adaptive precision filtering parameters and performing the motion compensation based at least in part on an adaptive precision filtering using the adaptive precision filtering parameters.

12. The method of claim 9, wherein to generate the reconstructed prediction reference picture further comprises generating and applying quality restoration in-loop filtering parameters to the reconstructed prediction reference picture, wherein the motion compensation comprises generating adaptive precision filtering parameters and performing the motion compensation based at least in part on an adaptive precision filtering using the adaptive precision filtering parameters.

13. The method of claim 9, further comprising:
generating enhanced prediction parameters and an enhanced predicted partition based at least in part on the enhanced prediction parameters and the second predicted partition;
determining whether to use the enhanced predicted partition or the second predicted partition as a selected predicted partition for the second prediction partition; and
wherein the selected predicted partition comprises the enhanced predicted partition coding the enhanced prediction parameters into a bitstream, wherein to generate the reconstructed prediction reference picture further comprises generating and applying quality restoration in-loop filtering parameters to the reconstructed prediction reference picture.

14. The method of claim 9, further comprising
assembling the second predicted partition and a third predicted partition to generate at least a portion of an assembled picture; and
generating fusion filtering parameters and a fusion filtered portion of the assembled picture an enhanced predicted partition based at least in part on the fusion filtering parameters, wherein to generate the reconstructed prediction reference picture further comprises generating and applying quality restoration in-loop filtering parameters to the reconstructed prediction reference picture.

15. The method of claim 9, further comprising:
generating enhanced prediction parameters and an enhanced predicted partition based at least in part on the enhanced prediction parameters and the second predicted partition;
determining whether to use the enhanced predicted partition or the second predicted partition as a selected predicted partition for the second prediction partition; and
wherein the selected predicted partition comprises the enhanced predicted partition coding the enhanced prediction parameters into a bitstream, wherein the motion compensation comprises generating adaptive precision filtering parameters and performing the motion compensation based at least in part on an adaptive precision filtering using the adaptive precision filtering parameters, and wherein to generate the reconstructed prediction reference picture further comprises generating and applying quality restoration in-loop filtering parameters to the reconstructed prediction reference picture.

16. The method of claim 9, further comprising
assembling the second predicted partition and a third predicted partition to generate at least a portion of an assembled picture; and
generating fusion filtering parameters and a fusion filtered portion of the assembled picture an enhanced predicted partition based at least in part on the fusion filtering parameters, wherein the motion compensation comprises generating adaptive precision filtering parameters and performing the motion compensation based at least in part on an adaptive precision filtering using the adaptive precision filtering parameters, and wherein to generate the reconstructed prediction reference picture further comprises generating and applying quality restoration in-loop filtering parameters to the reconstructed prediction reference picture.

17. A video encoder comprising:
an image buffer;
a graphics processing unit communicatively coupled to the image buffer and configured to:
partition a plurality of tiles or super-fragments of a video frame to generate a plurality of prediction partitions;
difference a plurality of predicted partitions associated with the plurality of prediction partitions to generate a corresponding plurality of prediction error data partitions;
partition at least a portion of the prediction error data partitions to generate a plurality of coding partitions;
perform one or more transforms on the plurality of coding partitions to generate transform coefficients, wherein the one or more transforms comprise at least one content adaptive transform;
quantize the transform coefficients to generate quantized transform coefficients;
perform an inverse quantization on the quantized transform coefficients to generate reconstructed transform coefficients;
perform one or more inverse transforms on the reconstructed transform coefficients to generate a plurality of reconstructed coding partitions;
assemble the plurality of reconstructed coding partitions to generate a plurality of reconstructed prediction error data partitions;
add the plurality of predicted partitions to the plurality of reconstructed prediction error data partitions to generate at least one reconstructed tile or super-fragment;
generate deblock filtering parameters and a first final reconstructed tile or super-fragment based at least in part on the at least one reconstructed tile or super-fragment and the deblock filtering parameters;
assemble the first final reconstructed tile or super-fragment and a second final reconstructed tile or super-fragment to generate a reconstructed picture; and
generate quality restoration in-loop filtering parameters and a reconstructed prediction reference picture based at least in part on the reconstructed picture and the quality restoration in-loop filtering parameters.

18. The video encoder of claim 17, the graphics processing unit further configured to:
generate motion data associated with a second prediction partition based at least in part on the reconstructed prediction reference picture; and
perform motion compensation based on the motion data and the reconstructed prediction reference picture to generate a second predicted partition, wherein the motion compensation comprises the graphics processing unit further being configured to generate adaptive precision filtering parameters and performing the motion compensation based at least in part on an adaptive precision filtering using the adaptive precision filtering parameters.

19. The video encoder of claim 17, the graphics processing unit further configured to:
generate motion data associated with a second prediction partition based at least in part on the reconstructed prediction reference picture;
perform motion compensation based on the motion data and the reconstructed prediction reference picture to generate a second predicted partition;
generate enhanced prediction parameters and an enhanced predicted partition based at least in part on the enhanced prediction parameters and the predicted partition;
determine whether to use the enhanced predicted partition or the second predicted partition as a selected predicted partition for the second prediction partition; and
wherein the selected predicted partition comprises the enhanced predicted partition coding the enhanced prediction parameters into a bitstream.

20. The video encoder of claim 17, the graphics processing unit further configured to:
generate motion data associated with a second prediction partition based at least in part on the reconstructed prediction reference picture;
perform motion compensation based on the motion data and the reconstructed prediction reference picture to generate a second predicted partition;
assemble the second predicted partition and a third predicted partition to generate at least a portion of an assembled picture; and
generate fusion filtering parameters and a fusion filtered portion of the assembled picture and an enhanced predicted partition based at least in part on the fusion filtering parameters.

21. The video encoder of claim 17, the graphics processing unit further configured to:
generate morphing characteristic parameters and a morphed prediction reference picture based at least in part on the morphing characteristic parameters and the reconstructed prediction reference picture;
generate motion data associated with a second prediction partition based at least in part on the morphed prediction reference picture; and
perform motion compensation based on the motion data and the morphed prediction reference picture to generate a second predicted partition.

22. The video encoder of claim 17, the graphics processing unit further configured to:
generate synthesizing characteristic parameters and a synthesized prediction reference picture based at least in part on the synthesizing characteristic parameters and the reconstructed prediction reference picture;
generate motion data associated with a second prediction partition based at least in part on the morphed prediction reference picture; and perform motion compensation based on the motion data and the synthesized prediction reference picture to generate a second predicted partition.

23. At least one non-transitory machine readable medium comprising a plurality of instructions that in response to being executed on a computing device, cause the computing device to:
partition a plurality of tiles or super-fragments of a video frame to generate a plurality of prediction partitions;
difference a plurality of predicted partitions associated with the plurality of prediction partitions to generate a corresponding plurality of prediction error data partitions;
partition at least a portion of the prediction error data partitions to generate a plurality of coding partitions;
perform one or more transforms on the plurality of coding partitions to generate transform coefficients, wherein the one or more transforms comprise at least one content adaptive transform;
quantize the transform coefficients to generate quantized transform coefficients;
perform an inverse quantization on the quantized transform coefficients to generate reconstructed transform coefficients;
perform one or more inverse transforms on the reconstructed transform coefficients to generate a plurality of reconstructed coding partitions;
assemble the plurality of reconstructed coding partitions to generate a plurality of reconstructed prediction error data partitions;
add the plurality of predicted partitions to the plurality of reconstructed prediction error data partitions to generate at least one reconstructed tile or super-fragment;
generate deblock filtering parameters and a first final reconstructed tile or super-fragment based at least in part on the at least one reconstructed tile or super-fragment and the deblock filtering parameters;
assemble the first final reconstructed tile or super-fragment and a second final reconstructed tile or super-fragment to generate a reconstructed picture; and
generate quality restoration in-loop filtering parameters and a reconstructed prediction reference picture based at least in part on the reconstructed picture and the quality restoration in-loop filtering parameters.

24. The non-transitory machine readable medium of claim 23, further comprising instructions that in response to being executed on the computing device, cause the computing device to:
generate morphing characteristic parameters and a morphed prediction reference picture based at least in part on the morphing characteristic parameters and the reconstructed prediction reference picture;
generate motion data associated with a second prediction partition based at least in part on the morphed prediction reference picture;
perform motion compensation based on the motion data and the morphed prediction reference picture to generate a second predicted partition;
generate synthesizing characteristic parameters and a synthesized prediction reference picture based at least in part on synthesizing morphing characteristic parameters and a second reconstructed prediction reference picture;
generate motion data associated with the second prediction partition based at least in part on the synthesized prediction reference picture;
perform motion compensation based on the motion data and the synthesized prediction reference picture to generate a third predicted partition;
generate motion data associated with the second prediction partition based at least in part on a second reconstructed prediction reference picture;
perform motion compensation based on the motion data and the morphed prediction reference picture to generate a fourth predicted partition;
combine the second predicted partition and the third predicted partition to generate a fifth predicted partition, wherein the combining comprises a weighted average;
select between the fifth predicted partition and the fourth predicted partition to generate a selected prediction partition; and
generate enhanced prediction parameters and an enhanced predicted partition based at least in part on the enhanced prediction parameters and the selected predicted partition.

* * * * *